US008827818B2

(12) United States Patent
Ashida et al.

(10) Patent No.: US 8,827,818 B2
(45) Date of Patent: Sep. 9, 2014

(54) CONTROLLER DEVICE AND INFORMATION PROCESSING DEVICE

(75) Inventors: Kenichiro Ashida, Kyoto (JP); Yositomo Goto, Kyoto (JP); Takanori Okamura, Kyoto (JP); Junji Takamoto, Kyoto (JP); Masato Ibuki, Kyoto (JP); Shinji Yamamoto, Kyoto (JP); Hitoshi Tsuchiya, Kyoto (JP); Fumiyoshi Suetake, Kyoto (JP); Akiko Suga, Kyoto (JP); Naoya Yamamoto, Kyoto (JP); Daisuke Kumazaki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 504 days.

(21) Appl. No.: 13/206,059

(22) Filed: Aug. 9, 2011

(65) Prior Publication Data
US 2012/0106041 A1     May 3, 2012

(30) Foreign Application Priority Data

| Nov. 1, 2010 | (JP) | 2010-245298 |
| Nov. 1, 2010 | (JP) | 2010-245299 |
| Apr. 18, 2011 | (JP) | 2011-92506 |
| Apr. 19, 2011 | (JP) | 2011-92612 |
| May 2, 2011 | (JP) | 2011-102834 |
| May 6, 2011 | (JP) | 2011-103704 |
| May 6, 2011 | (JP) | 2011-103705 |
| May 6, 2011 | (JP) | 2011-103706 |
| May 26, 2011 | (JP) | 2011-118488 |

(51) Int. Cl.
*H05K 7/00* (2006.01)
*A63F 13/02* (2006.01)
*A63F 13/06* (2006.01)

(52) U.S. Cl.
CPC ............... *A63F 13/06* (2013.01); *A63F 13/02* (2013.01); *A63F 2300/1043* (2013.01); *A63F 2300/1075* (2013.01); *A63F 2300/105* (2013.01)
USPC ........................................ 463/46; 361/679.01

(58) Field of Classification Search
CPC . A63F 13/02; A63F 13/06; A63F 2300/1043; A63F 2300/1075
USPC ............... D14/400, 401; 463/46; 361/679.01
See application file for complete search history.

(56) References Cited

U.S. PATENT DOCUMENTS

| 4,210,329 A | 7/1980 | Steiger et al. |
| 5,009,501 A | 4/1991 | Fenner et al. |

(Continued)

FOREIGN PATENT DOCUMENTS

| CN | 1593709 | 3/2005 |
| CN | 1868244 | 11/2006 |

(Continued)

OTHER PUBLICATIONS

Apple Support, "iPhone—Technical Specifications", http://support.apple.com/kb/SP2, Feb. 19, 2010, two pages.

(Continued)

*Primary Examiner* — Michael Cuff
(74) *Attorney, Agent, or Firm* — Nixon & Vanderhye, P.C.

(57) ABSTRACT

An example terminal device includes a generally plate-shaped housing, an LCD, and a projecting portion (an eaves portion). The LCD is provided on the front side of the housing. The projecting portion is provided so as to project at least at left and right positions on a back side of the housing above the center of the housing.

35 Claims, 28 Drawing Sheets

(56) References Cited

U.S. PATENT DOCUMENTS

| | | |
|---|---|---|
| 5,440,326 A | 8/1995 | Quinn |
| 5,452,104 A | 9/1995 | Lee |
| 5,602,566 A | 2/1997 | Motosyuku et al. |
| 5,608,449 A | 3/1997 | Swafford, Jr. et al. |
| 5,619,397 A | 4/1997 | Honda et al. |
| 5,820,462 A * | 10/1998 | Yokoi et al. .................. 463/37 |
| 5,825,350 A | 10/1998 | Case, Jr. et al. |
| 5,825,352 A | 10/1998 | Bisset et al. |
| D411,530 S * | 6/1999 | Carter et al. .................. D14/400 |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 | 12/2002 | Sasaki et al. |
| 6,500,070 B1 | 12/2002 | Tomizawa et al. |
| 6,509,896 B1 | 1/2003 | Saikawa et al. |
| 6,538,636 B1 * | 3/2003 | Harrison ....................... 345/156 |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 * | 5/2003 | Allport ......................... 725/110 |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 * | 4/2004 | Eck et al. ......................... 463/45 |
| 6,798,429 B2 | 9/2004 | Bradski |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,908,386 B2 * | 6/2005 | Suzuki et al. .................. 463/30 |
| 6,921,336 B1 | 7/2005 | Best |
| 6,930,661 B2 | 8/2005 | Uchida et al. |
| 6,933,923 B2 | 8/2005 | Feinstein |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| D519,118 S * | 4/2006 | Woodward .................. D14/401 |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| D568,882 S * | 5/2008 | Ashida et al. ................ D14/400 |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| D599,352 S * | 9/2009 | Takamoto et al. ........... D14/400 |
| 7,607,111 B2 | 10/2009 | Vaananen et al. |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |
| 7,730,402 B2 | 6/2010 | Song |
| 7,736,230 B2 | 6/2010 | Argentar |
| 7,762,891 B2 | 7/2010 | Miyamoto et al. |
| D620,939 S * | 8/2010 | Suetake et al. .............. D14/401 |
| 7,782,297 B2 | 8/2010 | Zalewski |
| 7,791,808 B2 | 9/2010 | French et al. |
| 7,827,698 B2 | 11/2010 | Jaiswal et al. |
| D636,773 S * | 4/2011 | Lin ............................... D14/401 |
| 7,934,995 B2 | 5/2011 | Suzuki |
| D641,022 S * | 7/2011 | Dodo et al. .................. D14/401 |
| 8,038,533 B2 | 10/2011 | Tsuchiyama et al. |
| 8,105,169 B2 | 1/2012 | Ogasawara et al. |

(56) References Cited

U.S. PATENT DOCUMENTS

| | | | |
|---|---|---|---|
| D666,250 S * | 8/2012 | Fulghum et al. ............ D21/333 |
| 8,246,460 B2 | 8/2012 | Kitahara |
| 8,256,730 B2 | 9/2012 | Tseng |
| 8,317,615 B2 | 11/2012 | Takeda et al. |
| 8,337,308 B2 | 12/2012 | Ito et al. |
| 8,339,364 B2 | 12/2012 | Takeda et al. |
| 8,529,352 B2 | 9/2013 | Mae et al. |
| 8,567,599 B2 * | 10/2013 | Beatty et al. ............... 206/320 |
| 8,613,672 B2 | 12/2013 | Mae et al. |
| 8,684,842 B2 | 4/2014 | Takeda et al. |
| 8,690,675 B2 | 4/2014 | Ito et al. |
| 8,702,514 B2 | 4/2014 | Ashida et al. |
| 2001/0019363 A1 | 9/2001 | Katta et al. |
| 2002/0103026 A1 | 8/2002 | Himoto et al. |
| 2002/0103610 A1 | 8/2002 | Bachmann et al. |
| 2002/0107071 A1 | 8/2002 | Himoto et al. |
| 2002/0165028 A1 | 11/2002 | Miyamoto et al. |
| 2003/0027517 A1 | 2/2003 | Callway et al. |
| 2003/0207704 A1 | 11/2003 | Takahashi et al. |
| 2003/0216179 A1 | 11/2003 | Suzuki et al. |
| 2004/0023719 A1 | 2/2004 | Hussaini et al. |
| 2004/0092309 A1 | 5/2004 | Suzuki |
| 2004/0229687 A1 | 11/2004 | Miyamoto et al. |
| 2004/0266529 A1 | 12/2004 | Chatani |
| 2005/0176502 A1 | 8/2005 | Nishimura et al. |
| 2005/0181756 A1 | 8/2005 | Lin |
| 2005/0253806 A1 | 11/2005 | Liberty et al. |
| 2006/0012564 A1 | 1/2006 | Shiozawa et al. |
| 2006/0015808 A1 | 1/2006 | Shiozawa et al. |
| 2006/0015826 A1 | 1/2006 | Shiozawa et al. |
| 2006/0038914 A1 | 2/2006 | Hanada et al. |
| 2006/0077165 A1 | 4/2006 | Jang |
| 2006/0094502 A1 | 5/2006 | Katayama et al. |
| 2006/0174026 A1 | 8/2006 | Robinson et al. |
| 2006/0250764 A1 | 11/2006 | Howarth et al. |
| 2006/0252537 A1 | 11/2006 | Wu |
| 2006/0252541 A1 | 11/2006 | Zalewski et al. |
| 2006/0267928 A1 * | 11/2006 | Kawanobe et al. ........... 345/156 |
| 2007/0021216 A1 | 1/2007 | Guruparan |
| 2007/0049374 A1 | 3/2007 | Ikeda et al. |
| 2007/0060383 A1 | 3/2007 | Dohta |
| 2007/0202956 A1 | 8/2007 | Ogasawara et al. |
| 2007/0252901 A1 | 11/2007 | Yokonuma et al. |
| 2007/0265085 A1 | 11/2007 | Miyamoto et al. |
| 2008/0015017 A1 * | 1/2008 | Ashida et al. ............... 463/37 |
| 2008/0024435 A1 | 1/2008 | Dohta |
| 2008/0030458 A1 | 2/2008 | Helbing et al. |
| 2008/0039202 A1 | 2/2008 | Sawano et al. |
| 2008/0100995 A1 | 5/2008 | Ryder et al. |
| 2008/0150911 A1 | 6/2008 | Harrison |
| 2008/0220867 A1 | 9/2008 | Zalewski et al. |
| 2008/0300055 A1 | 12/2008 | Lutnick et al. |
| 2009/0082107 A1 | 3/2009 | Tahara et al. |
| 2009/0143140 A1 * | 6/2009 | Kitahara .................. 463/37 |
| 2009/0183193 A1 | 7/2009 | Miller, IV |
| 2009/0219677 A1 * | 9/2009 | Mori et al. ............... 361/679.03 |
| 2009/0225159 A1 * | 9/2009 | Schneider et al. ............ 348/82 |
| 2009/0254953 A1 | 10/2009 | Lin |
| 2009/0256809 A1 | 10/2009 | Minor |
| 2009/0280910 A1 * | 11/2009 | Gagner et al. ............... 463/42 |
| 2009/0322671 A1 * | 12/2009 | Scott et al. ............... 345/156 |
| 2009/0322679 A1 | 12/2009 | Sato et al. |
| 2010/0007926 A1 * | 1/2010 | Imaizumi et al. ............ 358/434 |
| 2010/0009746 A1 | 1/2010 | Raymond et al. |
| 2010/0009760 A1 | 1/2010 | Shimamura et al. |
| 2010/0045666 A1 | 2/2010 | Kornmann et al. |
| 2010/0083341 A1 | 4/2010 | Gonzalez |
| 2010/0149095 A1 | 6/2010 | Hwang |
| 2010/0156824 A1 | 6/2010 | Paleczny et al. |
| 2011/0021274 A1 | 1/2011 | Sato et al. |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0195785 A1 | 8/2011 | Ashida et al. |
| 2011/0228457 A1 * | 9/2011 | Moon et al. ............... 361/679.01 |
| 2011/0285704 A1 | 11/2011 | Takeda et al. |
| 2011/0287842 A1 | 11/2011 | Yamada et al. |
| 2011/0295553 A1 | 12/2011 | Sato |
| 2012/0001048 A1 | 1/2012 | Takahashi et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0062445 A1 | 3/2012 | Haddick et al. |
| 2012/0068927 A1 | 3/2012 | Poston et al. |
| 2012/0086631 A1 * | 4/2012 | Osman et al. ................. 345/156 |
| 2012/0087069 A1 * | 4/2012 | Fu et al. .................... 361/679.01 |
| 2012/0088580 A1 | 4/2012 | Takeda et al. |
| 2012/0106041 A1 | 5/2012 | Ashida et al. |
| 2012/0106042 A1 | 5/2012 | Ashida et al. |
| 2012/0108329 A1 | 5/2012 | Ashida et al. |
| 2012/0108340 A1 | 5/2012 | Ashida et al. |
| 2012/0119992 A1 | 5/2012 | Nishida et al. |
| 2012/0258796 A1 | 10/2012 | Ohta et al. |
| 2012/0270651 A1 | 10/2012 | Takeda et al. |
| 2013/0063350 A1 | 3/2013 | Takeda et al. |
| 2013/0109477 A1 | 5/2013 | Ito et al. |

FOREIGN PATENT DOCUMENTS

| | | |
|---|---|---|
| CN | 202270340 U | 6/2012 |
| CN | 202355827   | 8/2012 |
| CN | 202355828 U | 8/2012 |
| CN | 202355829 U | 8/2012 |
| EP | 0 710 017   | 5/1996 |
| EP | 0 835 676   | 4/1998 |
| EP | 1 469 382   | 10/2004 |
| EP | 1 723 992   | 11/2006 |
| EP | 2 158 947   | 3/2010 |
| FR | 2 932 998   | 1/2010 |
| JP | 09-294260   | 11/1997 |
| JP | 10-341388   | 12/1998 |
| JP | 2000-222185 | 8/2000 |
| JP | 2002-248267 | 9/2002 |
| JP | 2004-32548  | 1/2004 |
| JP | 2005-269399 | 9/2005 |
| JP | 3703473     | 10/2005 |
| JP | 3770499     | 4/2006 |
| JP | 3797608     | 7/2006 |
| JP | 2006-350986 | 12/2006 |
| JP | 2007-061271 | 3/2007 |
| JP | 2007-075353 | 3/2007 |
| JP | 2007-075751 | 3/2007 |
| JP | 2007-289413 | 11/2007 |
| JP | 2008-264402 | 11/2008 |
| JP | 2009-178363 | 8/2009 |
| JP | 2009-247763 | 10/2009 |
| JP | 2010-17412  | 1/2010 |
| JP | 4601925     | 12/2010 |
| TW | M278452     | 10/2005 |
| TW | 419388      | 1/2011 |
| WO | 03/007117   | 1/2003 |
| WO | 03/083822   | 10/2003 |
| WO | 2007/128949 | 11/2007 |
| WO | 2007/143632 | 12/2007 |
| WO | 2008-136064 | 11/2008 |
| WO | 2009-038596 | 3/2009 |

OTHER PUBLICATIONS

Mar. 16, 2012 Office Action for U.S. Appl. No. 13/019,924, 14 pages.
Apr. 26, 2012 Office Action for U.S. Appl. No. 13/019,928, 18 pages.
English-language machine translation for JP 09-294260.
English-language machine translation for JP 4601925.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.

(56) References Cited

OTHER PUBLICATIONS

Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," 11th IEEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
Office Action dated Sep. 18, 2012 in Australian Application No. 2011213764.
Office Action dated Sep. 10, 2012 in Australian Application No. 2011213765.
English-language machine translation for JP 2002-248267.
English-language machine translation for JP 2007-075751.
English-language machine translation for JP 2008-264402.
Patent Examination Report dated Jun. 25, 2013 in counterpart Australian Application No. 2011213764.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action mailed Oct. 7, 2013.
Ito et al., U.S. Appl. No. 13/208,719, filed Aug. 12, 2011—now USP 8,337,308.
Ohta et al., U.S. Appl. No. 13/209,756, filed Aug. 15, 2011—awaiting USPTO action.
Nishida et al., U.S. Appl. No. 13/211,679, filed Aug. 17, 2011—final office action mailed Oct. 15, 2013.
Nishida et al., U.S. Appl. No. 13/212,648, filed Aug. 18, 2011—final office action mailed Dec. 2, 2013.
Takeda et al., U.S. Appl. No. 13/244,685, filed Sep. 26, 2011—now USP 8,339,364.
Takeda et al., U.S. Appl. No. 13/244,710, filed Sep. 26, 2011—non-final office action mailed Sep. 24, 2013.
Ohta et al., U.S. Appl. No. 13/354,000, filed Jan. 19, 2012—non-final office action mailed Nov. 8, 2013.
Takeda et al., U.S. Appl. No. 13/541,282, filed Jul. 3, 2012—non-final office action mailed Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.
Xbox 360 Controller, Wikipedia, page as revised on Feb. 2, 2010 (6 pages).
Ashida et al., U.S. Appl. No. 13/206,767, filed Aug. 10, 2011—response to office action filed Dec. 11, 2013.
Ashida et al., U.S. Appl. No. 13/207,867, filed Aug. 11, 2011—response to office action filed Jan. 6, 2014.
Ohta et al., U.S. Appl. No. 13/209,756, filed Aug. 15, 2011—non-final office action mailed Dec. 30, 2013.
Nishida et al., U.S. Appl. No. 13/211,679, filed Aug. 17, 2011—notice of appeal filed Jan. 15, 2014.
Nishida et al., U.S. Appl. No. 13/212,648, filed Aug. 18, 2011—final office action mailed Dec. 4, 2013.
Takeda et al., U.S. Appl. No. 13/244,710, filed Sep. 26, 2011—response to office action filed Dec. 24, 2013.
Takeda et al., U.S. Appl. No. 13/541,282, filed Jul. 3, 2012—response to office action filed Dec. 13, 2013.
Takeda et al., U.S. Appl. No. 13/672,862, filed Nov. 9, 2012—non-final office action mailed Dec. 24, 2013.
European Search Report (8 pgs.) dated May 10, 2012 issued in corresponding European Application No. 11739553.3.
Apple Support: "iPhone—Technical Specifications", Apple, Aug. 22, 2008, XP002673788, retrieved from the internet: URL: http://support.apple.com/kb/SP495 [retrieved on Apr. 13, 2012].
Takeda et al., U.S. Appl. No. 13/019,924, filed Feb. 2, 2011—response to office action filed Feb. 10, 2014.
Takeda et al., U.S. Appl. No. 13/145,690, filed Dec. 19, 2011—now USP 8,684,842.
Taekda et al., U.S. Appl. No. 13/153,106, filed Jun. 3, 2011—final office action filed Feb. 4, 2014.
Ashida et al., U.S. Appl. No. 13/206,767, filed Aug. 10, 2011—allowed.
Ashida et al., U.S. Appl. No. 13/206,914, filed Aug. 10, 2011—now USP 8,702,514.
Ashida et al., U.S. Appl. No. 13/207,867, filed Aug. 11, 2011—allowed.
Ohta et al., U.S. Appl. No. 13/209,756, filed Aug. 15, 2011—response to office action filed Mar. 31, 2014.
Nishida et al., U.S. Appl. No. 13/211,679, filed Aug. 17, 2011—RCE filed Apr. 28, 2014.
Nishida et al., U.S. Appl. No. 13/212,648, filed Aug. 18, 2011—RCE filed May 7, 2014.
Ohta et al., U.S. Appl. No. 13/354,000, filed Jan. 19, 2012—allowed.
Takeda et al., U.S. Appl. No. 13/541,282, filed Jul. 3, 2012—allowed.
Takeda et al., U.S. Appl. No. 13/672,862, filed Nov. 9, 2012—allowed.
Ito et al., U.S. Appl. No. 13/687,057, filed Nov. 28, 2012—now USP 8,690,675.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Partial English-language translation of TWM278452, (Oct. 2005).
Mae et al., U.S. Appl. No. 13/017,381, filed Jan. 31, 2011—now USP 8,613,672.
Mae et al., U.S. Appl. No. 13/017,527, filed Jan. 31, 2011—now USP 8,529,352.
Takeda et al., U.S. Appl. No. 13/019,924, filed Feb. 2, 2011—non-final office action mailed Oct. 8, 2013.
Takeda et al., U.S. Appl. No. 13/019,928, filed Feb. 2, 2011—now USP 8,317,615.
Takeda et al., U.S. Appl. No. 13/145,690, filed Dec. 19, 2011—allowed.
Taekda et al., U.S. Appl. No. 13/153,106, filed Jun. 3, 2011—non-final office action mailed Oct. 10, 2013.
Ito et al., U.S. Appl. No. 13/198,251, filed Aug. 4, 2011—awaiting USPTO action.
PersonalApplets: "Gyro Tennis App for iPhone 4 and iPod Touch 4th gen" YouTube, Aug. 9, 2010, Hyyp://www.youtube.com/watch?v=c7PRFbqWKIs, 2 pages.
Jhrogersii, "Review: Gyro Tennis for iPhone", iSource, Sep. 17, 2010, http://isource.com/2010/09/17/review-gyro-tennis-for-phone/, 10 pages.
English-language machine translation for JP 2009-178363.
English-language machine translation for JP 2009-247763.
English-language machine translation for JP 09-294260 (printed Apr. 4, 2011).

(56) References Cited

OTHER PUBLICATIONS

English-language machine translation for JP 2004-032548.
English-language machine translation for JP 4601925, (Jul. 19, 2011).
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,767, filed Aug. 10, 2011.

* cited by examiner

CONTROLLER DEVICE AND INFORMATION PROCESSING DEVICE

CROSS REFERENCE TO RELATED APPLICATIONS

This application claims the benefit under 35 U.S.C. Section 119 of Japanese Patent Application No. 2010-245298 filed on Nov. 1, 2010, Japanese Patent Application No. 2010-245299 filed on Nov. 1, 2010, Japanese Patent Application No. 2011-092506 filed on Apr. 18, 2011, Japanese Patent Application No. 2011-092612 filed on Apr. 19, 2011, Japanese Patent Application No. 2011-102834 filed on May 2, 2011, Japanese Patent Application No. 2011-103704 filed on May 6, 2011, Japanese Patent Application No. 2011-103705 filed on May 6, 2011, Japanese Patent Application No. 2011-103706 filed on May 6, 2011, and Japanese Patent Application No. 2011-118488 filed on May 26, 2011. The entire contents of each of these applications are incorporated herein by reference.

BACKGROUND AND SUMMARY

This application describes a controller device which can be held and operated by a player.

There are conventional controller devices which players hold in hand. For example, a portable game device described in Japanese Patent No. 3703473 is of a foldable type, and includes operation buttons provided on a lower housing. With this game device, a user can perform game operations using operation buttons provided on opposite sides of the screen while looking at the screen, and a user can easily perform game operations while holding the game device.

In recent years, more portable terminal devices (controller devices) have larger screens, etc., and the devices themselves are also larger. If the device itself which is used by a user while being held in hand becomes bigger, it may become less easy to hold the device.

It is therefore an object of the present invention to provide a controller device that can easily be held by a user.

The present invention employs the following configurations (1) to (18) to attain the object mentioned above.

(1)

An example of the present invention is a controller device to be operated by a user. The controller device includes a generally plate-shaped housing, a display section, and a projecting portion. The display section is provided on a front side of the housing. The projecting portion is provided so as to project at least at left and right positions on a back side of the housing above a center of the housing.

The term "operation section" as used herein may be any operation device which can be operated by the user, e.g., a stick (analog stick), a key (button), a touch panel, a touch pad, etc., as shown in the embodiment to be discussed below.

The term "at left and right positions" as used herein means that projecting portions are provided on the left side and on the right side of the center of the housing with respect to the left/right direction. The projecting portions may be provided at the left and right opposing end portions, or the projecting portions may be provided at positions closer to the center than the left and right end portions.

With the configuration (1) above, since the projecting portion is provided on the back side of the housing, when the user holds left and right sides of the display section of the housing, the user can easily hold the controller device by holding it so as to allow the projecting portion to rest on the fingers. Moreover, since the projecting portion is provided in the upper portion of the housing, the user can support the housing with the palms (see FIGS. 10 and 11) when holding the housing with the index fingers, the middle fingers or the ring fingers abutting against the bottom surface of the projecting portion, making it possible to firmly hold the controller device. Therefore, with the configuration (1) above, it is possible to provide a controller device that is easy to hold for the user.

(2)

2. The controller device may further include a first operation section and a second operation section provided respectively on a left side and a right side of the display section above a center of the housing.

With the configuration (2) above, since the operation sections are provided on the left and right sides of the display section, when the user holds the left and right sides of the display section of the housing, the user can easily operate the operation sections with the thumbs, for example. Therefore, with the configuration (2) above, it is possible to provide a controller device that can be easily held and easily operated by the user.

(3)

Another example of the present invention is a controller device including a generally plate-shaped housing, a display section, a first operation section, a second operation section, and a projecting portion. The display section is provided on a front side of the housing. The first operation section and the second operation section are provided respectively on a left side and a right side of the display section. The projecting portion is provided on a back side of the housing at a position at which the projecting portion can rest on any fingers other than thumbs while a user is holding the housing in such a manner that the user can operate the first operation section and the second operation section with the thumbs of both hands.

With the configuration (3) above, since the projecting portion is provided on the back side of the housing, when the user holds the left and right sides of the display section of the housing, the user can easily hold the controller device so as to allow the projecting portion to rest on fingers other than the thumbs (see FIGS. 10 and 11). Since the operation sections are provided on the left and right sides of the display section, when the user holds the left and right sides of the display section of the housing, the user can easily operate the operation sections with the thumbs. Therefore, with the configuration (3) above, it is possible to provide a controller device that can be easily held and easily operated by the user.

(4)

The projecting portion may be provided so as to extend across an area on the back side including positions corresponding to the first operation section and the second operation section on the front side.

The term "to generally correspond" as used herein is not limited to the positions of the operation sections and the projecting portion strictly coinciding with each other on opposite sides of the housing, but encompasses such configurations in which the area where the operation sections are provided on the front side of the housing, as projected onto the back side of the housing, overlaps with the area where the projecting portion is provided on the back side of the housing.

With the configuration (4) above, when the user operates the operation sections, the user can hold the terminal device 7 so as to support the eaves portion 59 with the index fingers, the middle fingers or the ring fingers (see FIGS. 10 and 11). Thus, the user can more easily hold the terminal device 7, and can more easily operate the operation sections.

(5)

The controller device may further include a third operation section and a fourth operation section provided respectively in left and right portions of the housing on an upper surface of the projecting portion.

With the configuration (5) above, the user can operate the third and fourth operation sections with the index fingers or the middle fingers, for example, while the user holds the left and right sides of the display section of the housing. That is, it is possible to provide a controller device with a good controllability with which more operations can be performed in such a state as described above. Since the user can hold the controller device so as to sandwich the projecting portion from the upper and lower sides, the controller device is easier to hold.

(6)

The projecting portion may have an eaves-like shape extending in a left/right direction.

With the configuration (6) above, the user can hold the controller device with the finger for supporting the projecting portion placed along the bottom surface of the projecting portion, making it easier to hold the controller device. Since the projecting portion extends in the left/right direction, if the user holds the controller device so that the projecting portion is in a vertical direction, the user can abut fingers other than the thumbs against the projecting portion, irrespective of the position along the side of the controller device at which the user holds the controller device. Therefore, also when the controller device is held so that the projecting portion lies in the vertical direction, the user can firmly hold the controller device.

(7)

A first engagement hole which can engage with an additional device separate from the controller device may be provided on a bottom surface of the projecting portion.

With the configuration (7) above, the controller device and the additional device can be securely connected to each other using the first engagement hole. In a case in which the configuration (6) above and the configuration (7) above are used in combination with each other, the first engagement hole can be provided near the center of the controller device with respect to the left/right direction, and it is therefore possible to stably connect the additional device while evenly maintaining the left-right balance.

(8)

A second engagement hole which can engage with the additional device may be provided on a lower surface of the housing.

With the configuration (8) above, the controller device and the additional device are connected to each other using the first engagement hole and the second engagement hole which are provided at different positions, thereby making the connection more secure.

(9)

The controller device may further include protruding portions having a protruding cross section and provided in left and right portions on a back surface of the housing below the projecting portion.

With the configuration (9) above, the user can hold the housing with fingers (e.g., the ring fingers or the little fingers) resting on the protruding portion, and it is therefore possible to more firmly hold the controller device.

(10)

The projecting portion and the protruding portions may be spaced apart from each other.

With the configuration (10) above, the user can support the projecting portion with the middle fingers, the ring fingers, etc., without being interfered by the protruding portions, and can hold the controller device with other fingers resting on the protruding portions. Then, it is easier to hold the controller device.

(11)

The controller device may further include grip portions provided in left and right portions on a back surface of the housing.

With the configuration (11) above, the user can hold the housing with fingers (e.g., the ring fingers or the little fingers) resting on the grip portions, and it is therefore possible to more firmly hold the controller device.

(12)

The controller device further includes a fifth operation section and a sixth operation section. The fifth operation section is provided below the first operation section on a front side surface of the housing. The sixth operation section is provided below the second operation section on a front side surface of the housing.

With the configuration (12) above, a wider variety of operations can be done using the controller device. The user can firmly hold the controller device also when operating the fifth operation section and the sixth operation section, and it is therefore possible to provide a controller device with a good controllability.

(13)

Another example of the present invention is a controller device including a generally plate-shaped housing, a display section, a projecting portion, and an operation section. The display section is provided on a front side of a housing. The projecting portion is provided so as to project at least at left and right positions on the back side of the housing. The operation section is provided on an upper surface of the projecting portion.

With the configuration (13) above, since the projecting portion is provided on the back side of the housing, when the user holds the left and right sides of the display section of the housing, the user can easily hold the controller device so as to allow the projecting portion to rest on fingers (see FIGS. 10 and 11). Since the operation section is provided on the upper surface of the projecting portion, it is possible to easily operate the operation section when holding the controller device so as to allow the projecting portion to rest on fingers. Then, since the user can hold the controller device so as to sandwich the projecting portion the upper and lower sides, the controller device is easier to hold. As described above, with the configuration (6) above, it is possible to provide a controller device which is easy to hold and easy to operate for the user.

(14)

Another example of the present invention is a controller device to be operated by a user. The controller device includes a generally plate-shaped housing, a display section, and a grip portion. The display section is provided on a front side of the housing. The grip portion is provided in left and right portions of the housing on a back side of the housing so as to extend in an up/down direction, wherein the grip portion has a protruding cross section.

With the configuration (14) above, the user can hold the housing with fingers (e.g., the ring fingers or the little fingers) resting on the grip portion, and it is therefore possible to firmly hold the controller device. Therefore, with the configuration (14) above, it is possible to provide a controller device that is easy to hold for the user.

(15)

The controller device may further include a projecting portion provided so as to project at least at left and right positions on a back side of the housing above the grip portion.

With the configuration (15) above, since the projecting portion is provided on the back side of the housing, when the user holds the left and right sides of the display section of the housing, the user can easily hold the controller device so as to allow the projecting portion to rest on fingers, and it is possible to more firmly hold the controller device.

(16)

The controller device may further include a seventh operation section and an eighth operation section provided in left and right portions on an upper surface of the housing.

With the configuration (16) above, a wider variety of operations can be done using the controller device. Since operation sections are provided on the upper surface of the housing, the user can firmly hold the controller device as if to wrap around the housing from the front side, the upper side and the back side of the housing.

(17)

The controller device may further include a touch panel provided on a screen of the display section.

With the configuration (17) above, the user can intuitively and easily perform an operation on the image displayed on the display section using the touch panel. If the controller device is put down with the display section facing up, the controller device is slightly inclined due to the projecting portion. Therefore, with the controller device put down, it is possible to more easily perform an operation on the touch panel.

(18)

The controller device may further include an inertia sensor inside the housing.

With the configuration (18) above, it is possible to perform operations such as shaking or moving the controller device itself, allowing the user to perform intuitive and easy operations using the controller device. Then, since the controller device is expected to be moved around, if the additional device is connected to the controller device, it is important to securely connect the controller device and the additional device to each other. Therefore, with the configuration (18) above, it is particularly advantageous to employ the configuration (7) or (8) above to thereby securely connect the controller device and the additional device to each other.

(19)

The controller device may further include a communication section and a display control section. The communication section wirelessly transmits operation data representing an operation performed on the controller device itself to a game device, and receives image data transmitted from the game device. The display control section displays the received image data on the display section.

With the configuration (19) above, the user can perform game operations using a controller device which can be easily held and which has a good controllability. Since an image transmitted from the game device is displayed on the display section, the user can perform game operations while looking at the image displayed on the display section of the controller device.

(20)

The controller device may further include a game process section and a display control section. The game process section performs a game process based on an operation performed on the controller device itself. The display control section produces a game image based on the game process and displays the game image on the display section.

With the configuration (20) above, it is possible to provide a portable game device which can be easily held and which has a good controllability.

(21)

The display section may include a screen of 5 inches or larger.

With the configuration (21) above, it is possible to use a large screen to display images that are easy to view and appealing. In a case in which a display section of such a large screen as that of the configuration (21) above is used, the size of the controller device itself is also inevitably large. Therefore, it is particularly advantageous to employ the configurations (1) to (20) above which allow the user to easily hold the controller device.

In another example of the present invention, the present invention may be provided as a tablet-type information processing device including various elements (the housing, the display section, the projecting portion, etc.) of the configurations (1) to (21) above.

According to the present invention, a display section is provided on the front side of a housing, and a projecting portion is provided on the back side of the housing so as to project at least at left and right positions above the center of the housing, thus allowing the user to easily hold the controller device.

These and other features, aspects and advantages will become more apparent from the following detailed description of the present invention when taken in conjunction with the accompanying drawings.

DETAILED DESCRIPTION

[1. General Configuration of Game System]

Figure 1:
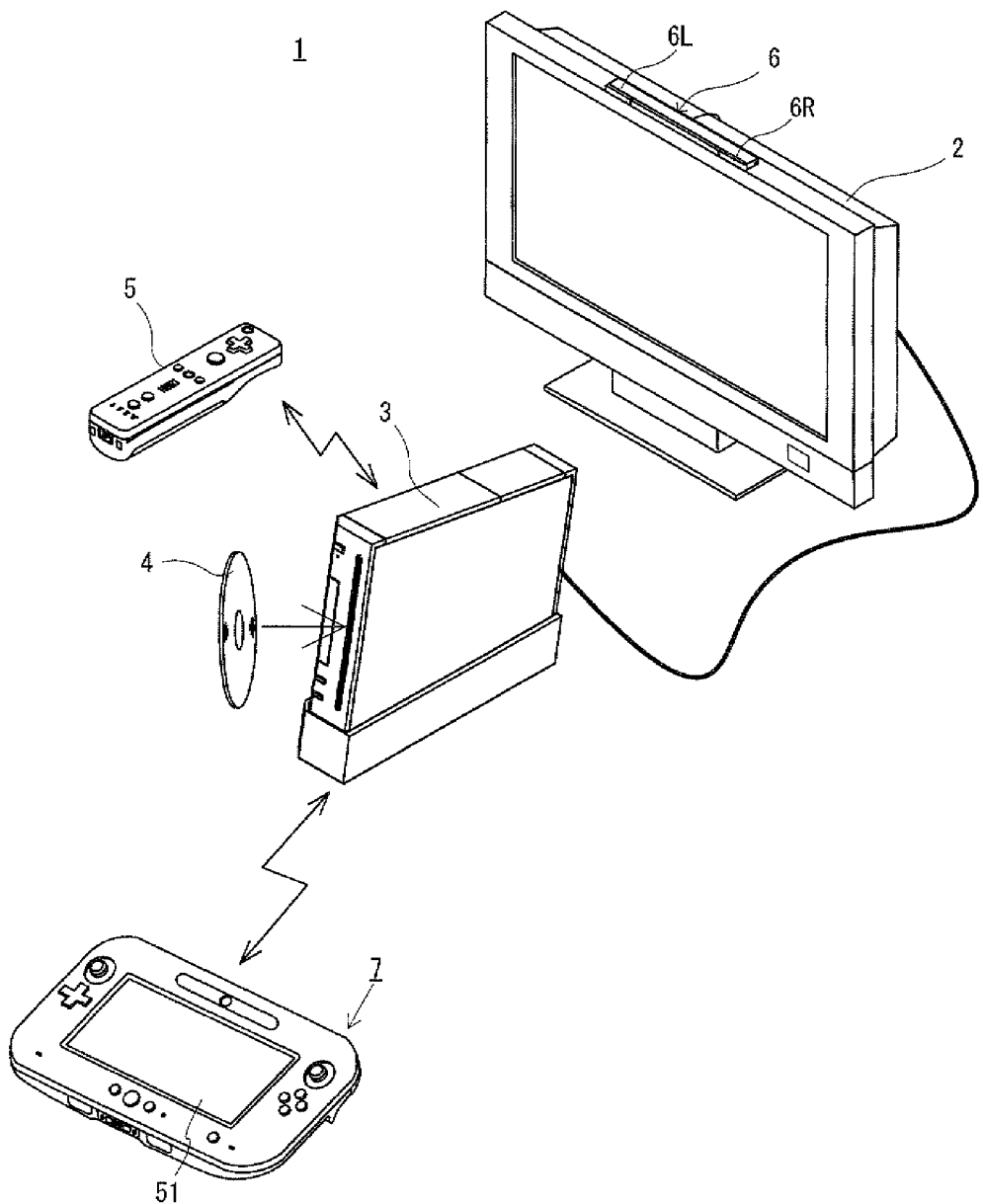
FIG. 1 is an external of a game system 1.

A game system 1 will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs game processes based on game operations performed using the controller 5, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3 (by a wired or wireless connection), and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, the controller 5 and the game device 3 may be connected by a wired connection. While only one controller is included in the game system 1 in the present embodiment, the game device 3 can communicate with a plurality of controllers, and a game can be played by multiple players by using a predetermined number of controllers (e.g., up to four) at the same time. The detailed configuration of the controller 5 will be described below.

The terminal device 7 is sized so that it can be held in one or both of the user's hands, and the user can hold and move the terminal device 7, or can use a terminal device 7 placed at an arbitrary position. The terminal device 7, whose detailed configuration will be described below, includes an LCD (Liquid Crystal Display) 51 as a display, input mechanisms (e.g., a touch panel 52), a gyrosensor 74, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, the terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
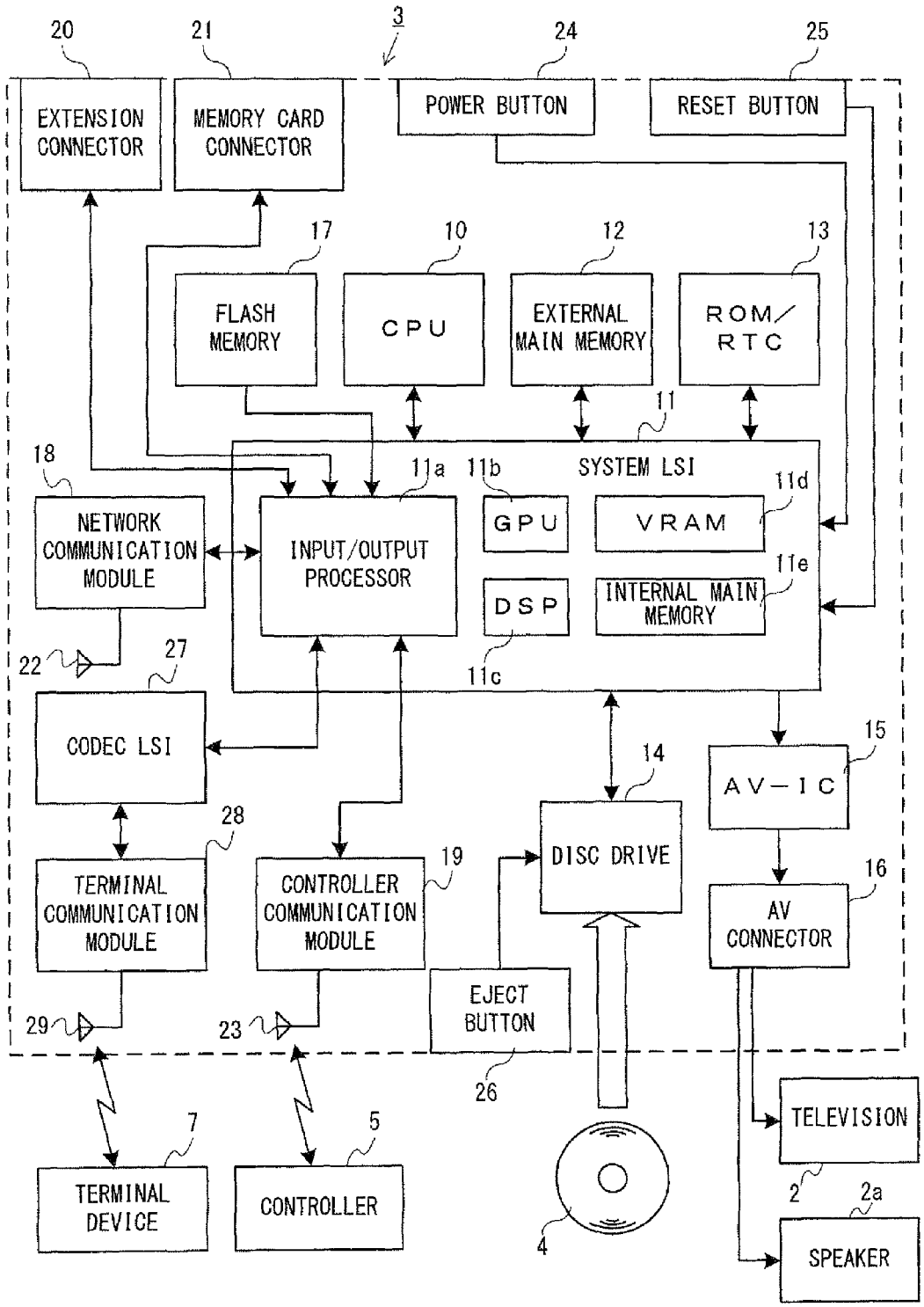
FIG. 2 is a block diagram showing an internal configuration of a game device 3.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc (drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) necessary for the GPU 11b to execute the graphics commands. When images are generated, the GPU 11b generates image data using data stored in the VRAM 11d. In the present embodiment, the game device 3 generates both game images displayed on the television 2 and game images displayed on the terminal device 7. Hereinafter, the game images displayed on the television 2 may be referred to as the "television game images", and the game images displayed on the terminal device 7 may be referred to as the "terminal game images".

The DSP 11c, functioning as an audio processor, generates sound data using sound data and sound waveform (e.g., tone quality) data stored in one or both of the internal main memory 11e and the external main memory 12. In the present embodiment, game sounds are outputted from the speaker of the television 2 and game sounds are outputted from the speaker of the terminal device 7. Hereinafter, the game sounds outputted from the television 2 may be referred to as a "television game sounds", and the game sounds outputted from the terminal device 7 may be referred to as a "terminal game sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11e is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a can be connected to a network such as the Internet via the network communication module 18 and the antenna 22 to communicate with an external information processing device(s) connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11e receives operation data transmitted from the controller 5 via the antenna and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11e outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, it is preferred to eliminate delay as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it is preferably a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker section (a marker section 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11e stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
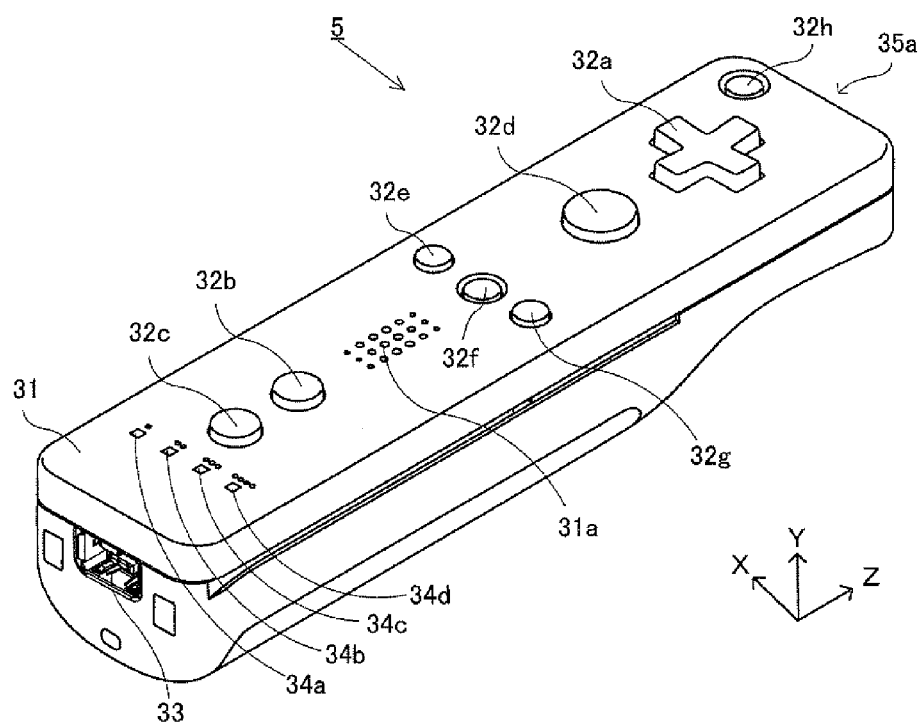
FIG. 3 is a perspective view showing an external configuration of a controller 5.
Figure 4:
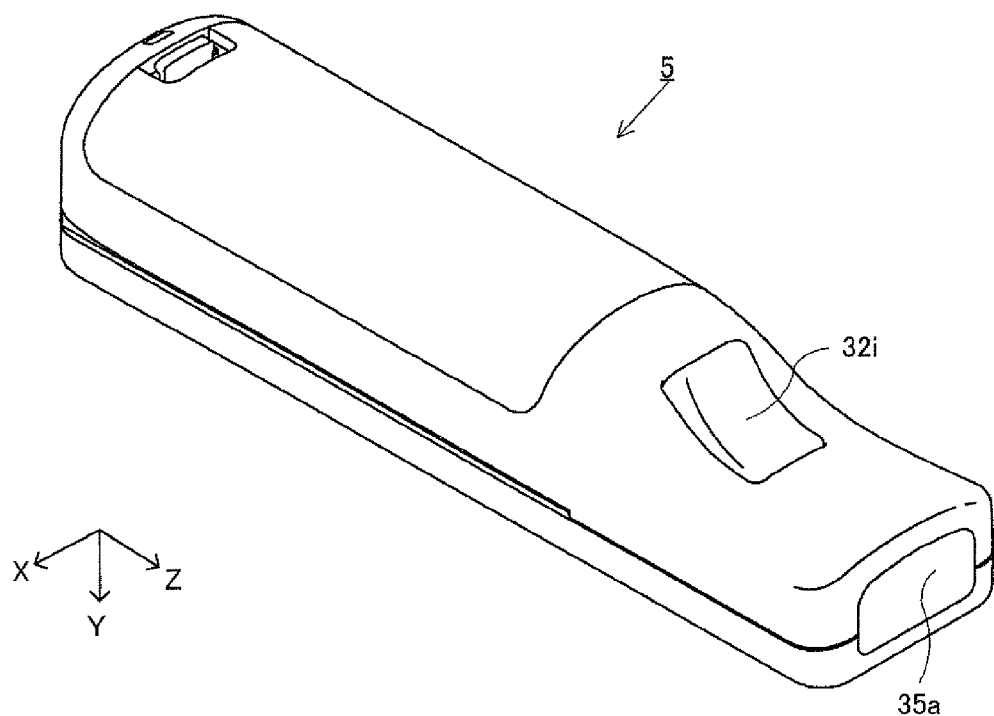
FIG. 4 is a perspective view showing an external configuration of the controller 5.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32*f* and the power button 32*h* being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33*a* (see FIG. 6) for preventing easy inadvertent disengagement of a device connected to the controller 5 as described above.

In the rear-side portion of the top surface of the housing 31, a plurality (four in FIG. 3) of LEDs 34*a* to 34*d* are provided. The controller 5 is assigned a controller type (number) so as to be distinguishable from other controllers. The LEDs 34*a* to 34*d* are each used for informing the user of the controller type which is currently set for the controller 5, and for informing the user of the battery level of the controller 5, for example. Specifically, when game operations are performed using the controller 5, one of the plurality of LEDs 34*a* to 34*d* corresponding to the controller type is lit up.

The controller 5 has an image capturing/processing section 35 (FIG. 6), and a light incident surface 35*a* of an image capturing/processing section 35 is provided on the front surface of the housing 31, as shown in FIG. 4. The light incident surface 35*a* is made of a material transmitting therethrough at least infrared light from the markers 6R and 6L.

On the top surface of the housing 31, sound holes 31*a* for externally outputting a sound from a speaker 49 (see FIG. 5) provided in the controller 5 are provided between the first button 32*b* and the home button 32*f*.

Figure 5:
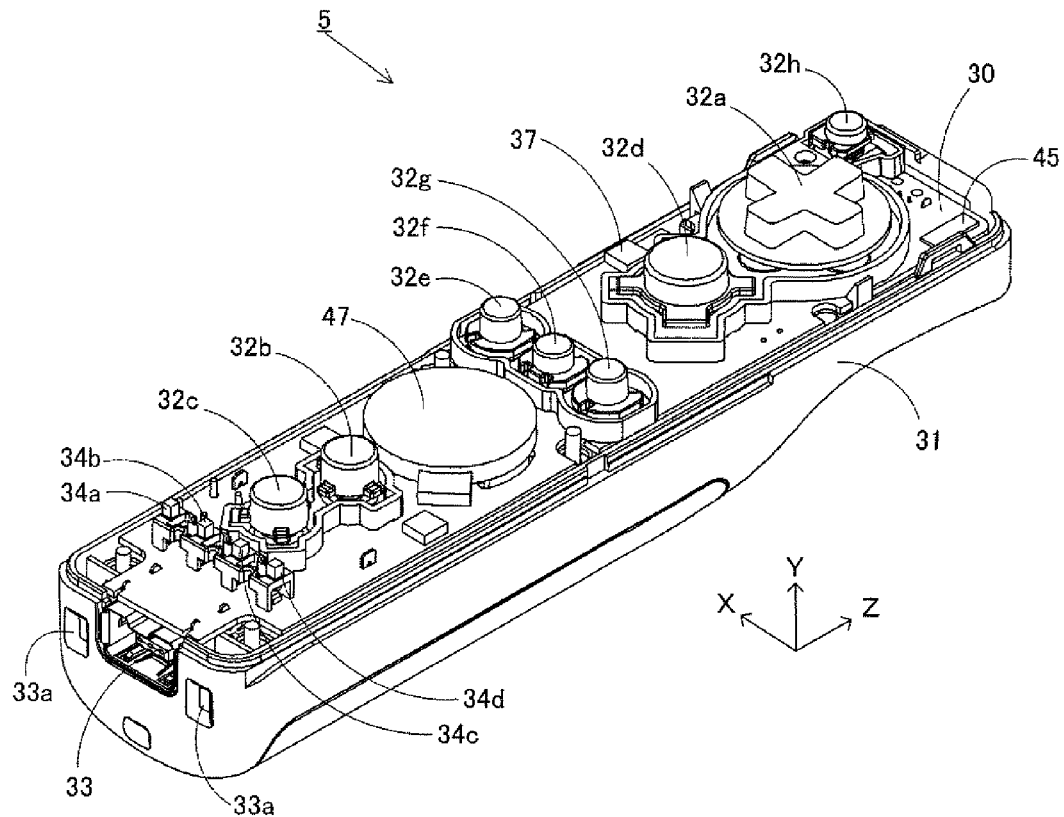
FIG. 5 is a diagram showing an internal configuration of the controller 5.
Figure 6:
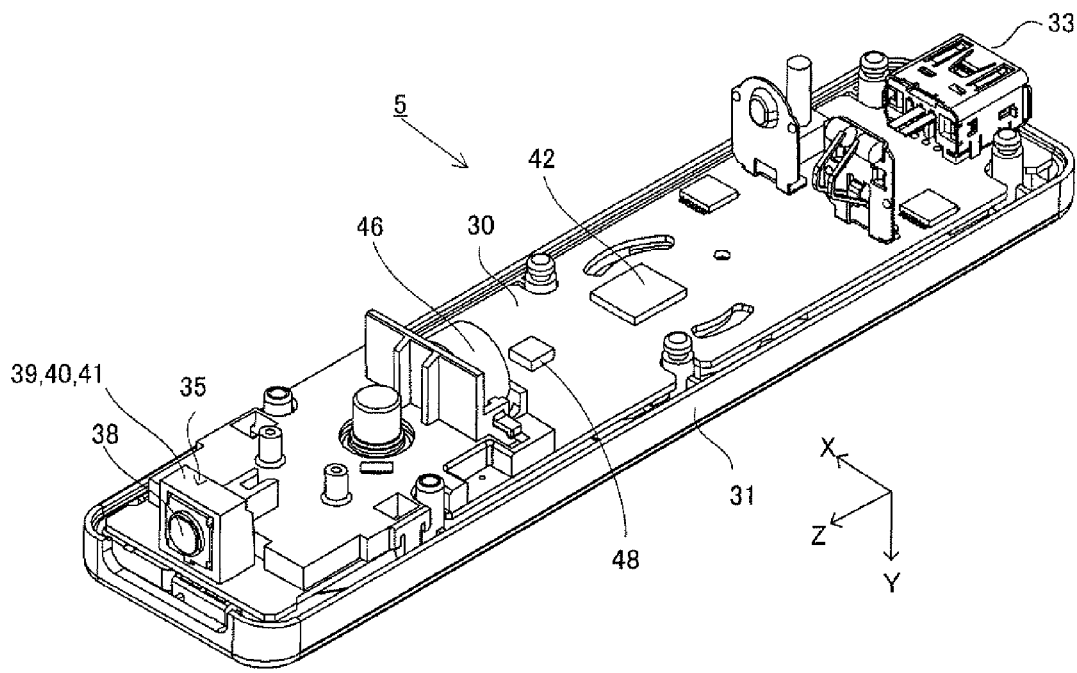
FIG. 6 is a diagram showing an internal configuration of the controller 5.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32*a* to 32*h*, the LEDs 34*a* to 34*d*, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the present invention can be realized with controllers having other shapes, numbers, and positions. Further, although in the present embodiment the image-capturing direction of the image-capturing section is the Z-axis positive direction, the image-capturing direction may be any direction. That is, the position of the image capturing/processing section 35 (the light incident surface 35*a* of the image capturing/processing section 35) in the controller 5 may not be on the front surface of the housing 31, but may be on any other surface on which light can be received from the outside of the housing 31.

Figure 7:
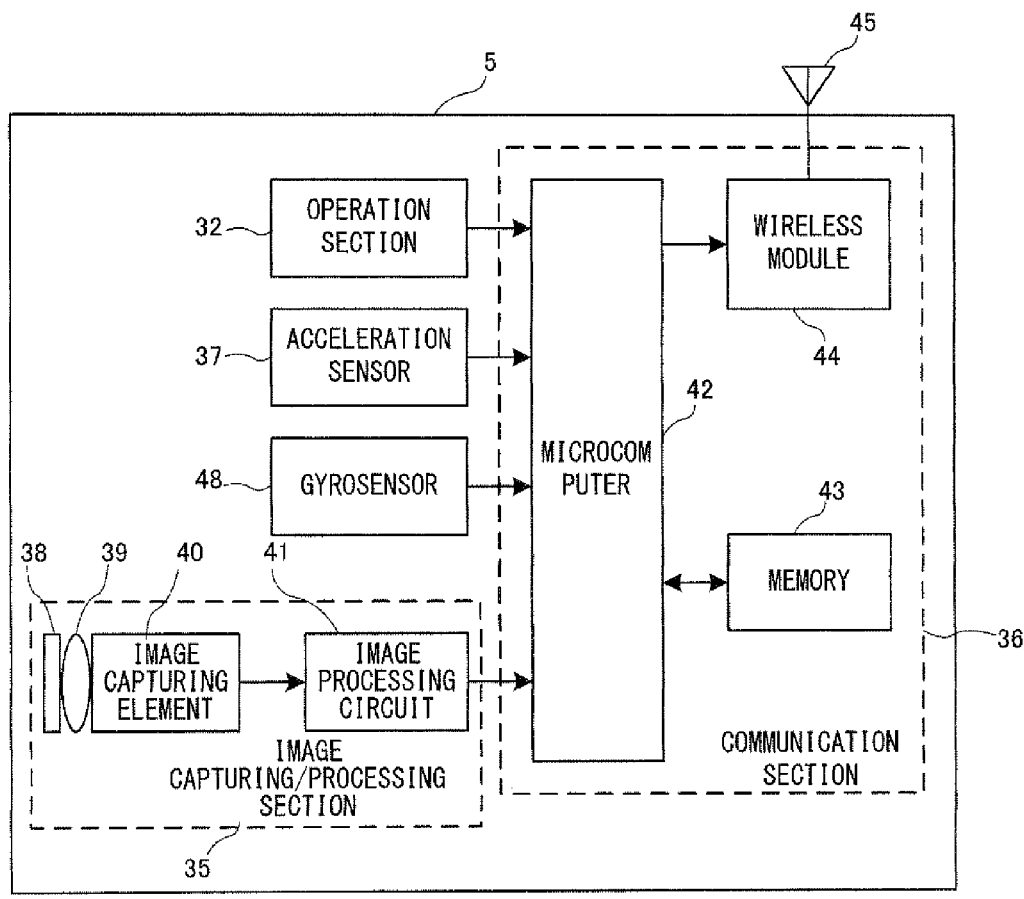
FIG. 7 is a block diagram showing a configuration of the controller 5.

FIG. 7 is a block diagram illustrating a configuration of the controller 5. The controller 5 includes an operation section 32 (the operation buttons 32*a* to 32*i*), the image capturing/processing section 35, a communication section 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation section 32 includes the operation buttons 32*a* to 32*i* described above, and outputs, to the microcomputer 42 of the communication section 36, operation button data indicating the input status of the operation buttons 32*a* to 32*i* (e.g., whether or not the operation buttons 32*a* to 32*i* are pressed).

The image capturing/processing section 35 is a system for analyzing image data captured by the image-capturing element and calculating the centroid, the size, etc., of an area (s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light.

Therefore, the provision of the infrared filter 38 enables the image capturing element 40 to receive only the infrared light transmitted through the infrared filter 38 and generate image data, so that an image of the image-capturing object (e.g., the markers of a marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electra Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 73 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angles) (or another preferred parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication section 36 to the controller communication module 19 is sequentially performed with a predetermined cycle, since the game process is generally performed with a cycle of 1/60 sec (as one frame period), the transmission is preferably performed with a cycle less than or equal to this period. The communication section 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

[4. Configuration of Terminal Device 7]

Figure 8:
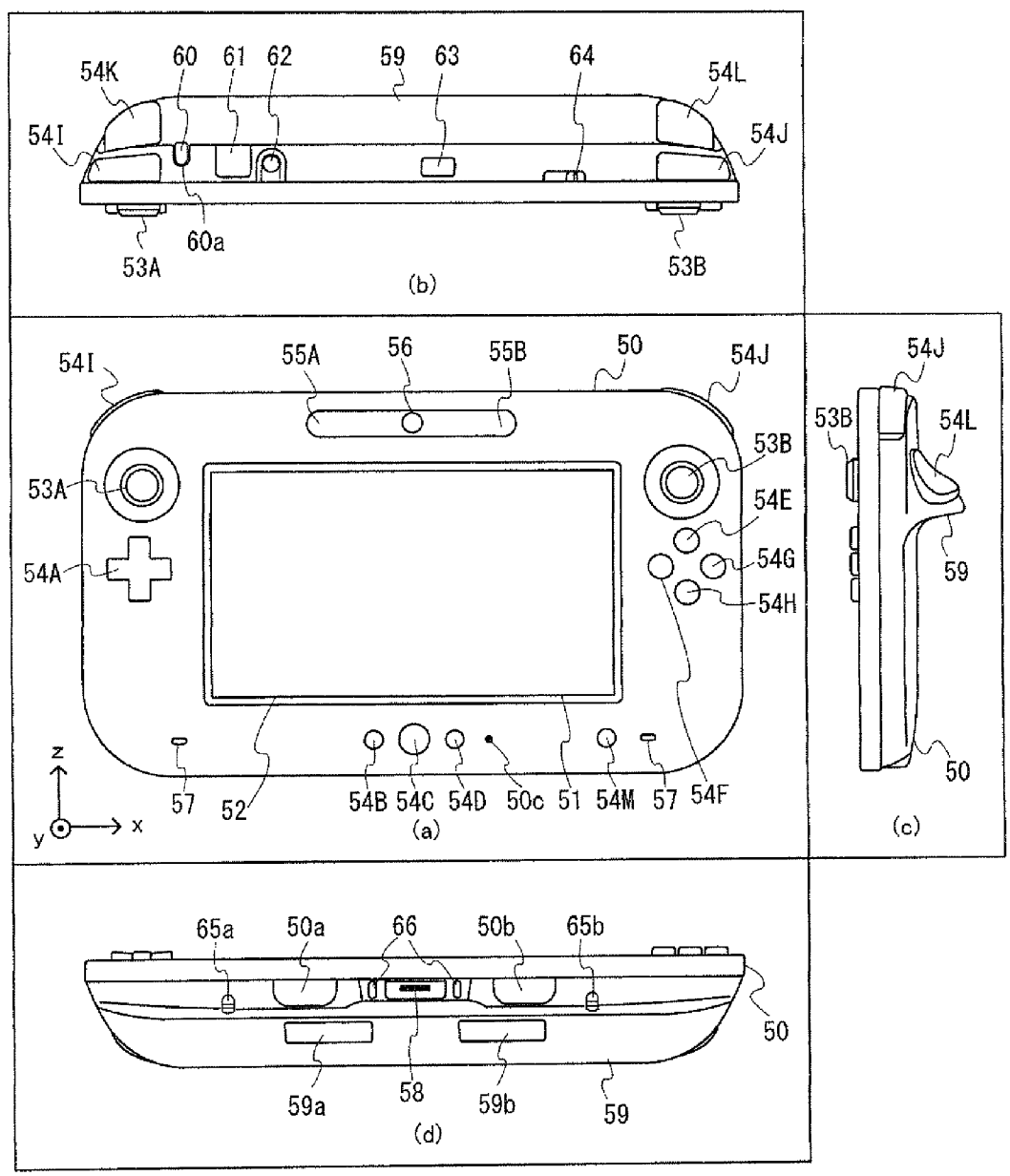
FIG. 8 is a diagram showing an external configuration of the terminal device 7.
Figure 9:
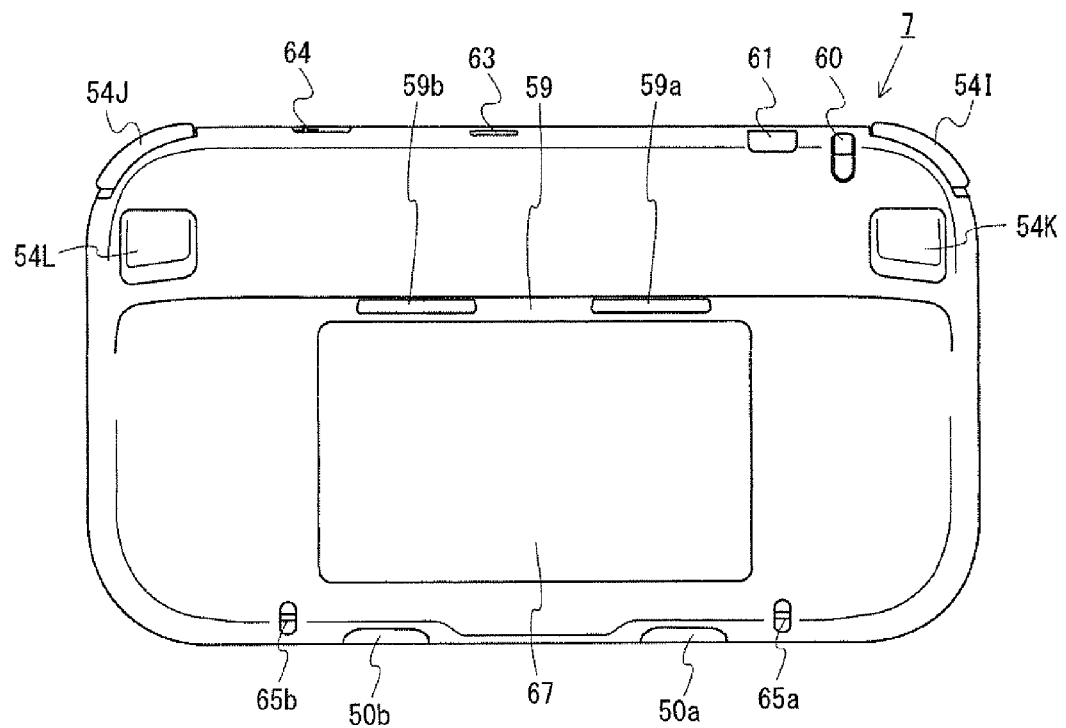
FIG. 9 is a diagram showing an external configuration of the terminal device 7.
Figure 10:
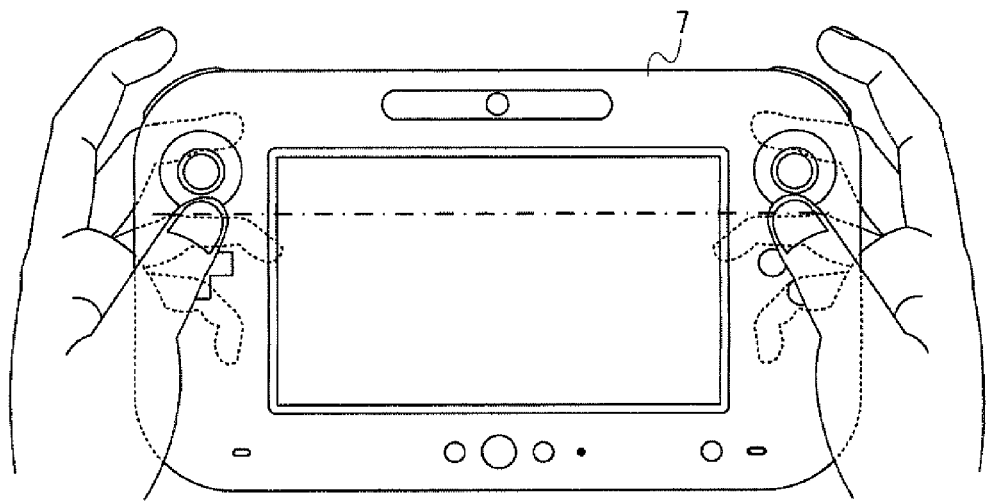
FIG. 10 is a diagram showing a user holding the terminal device 7 in a landscape position.
Figure 11:
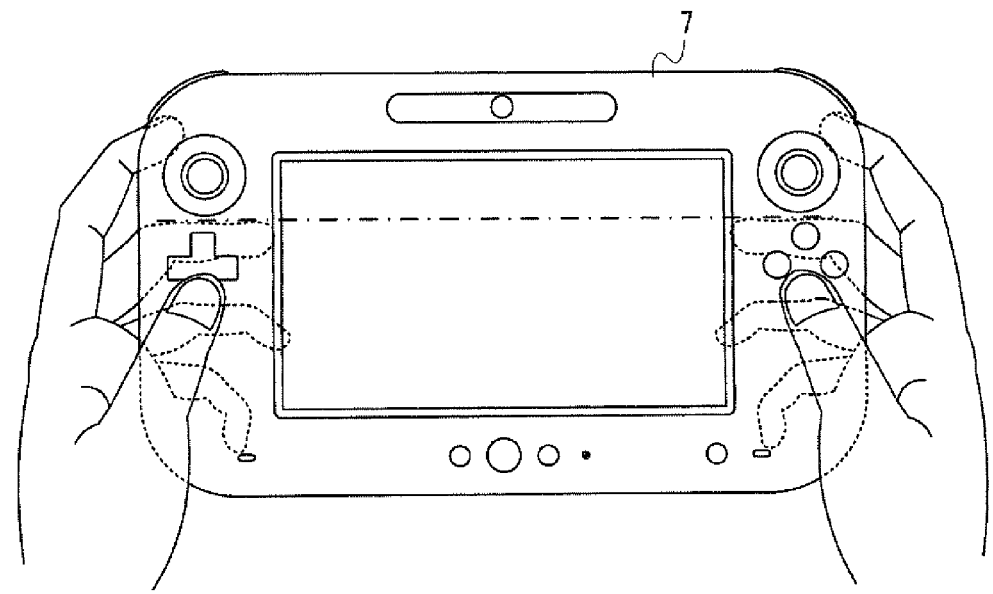
FIG. 11 is a diagram showing a user holding the terminal device 7 in a landscape position.
Figure 12:
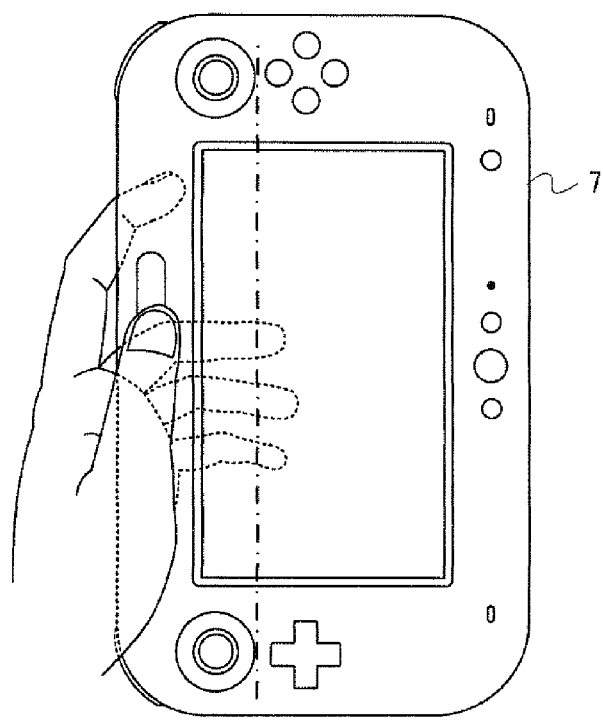
FIG. 12 is a diagram showing a user holding the terminal device 7 in a portrait position.
Figure 13:
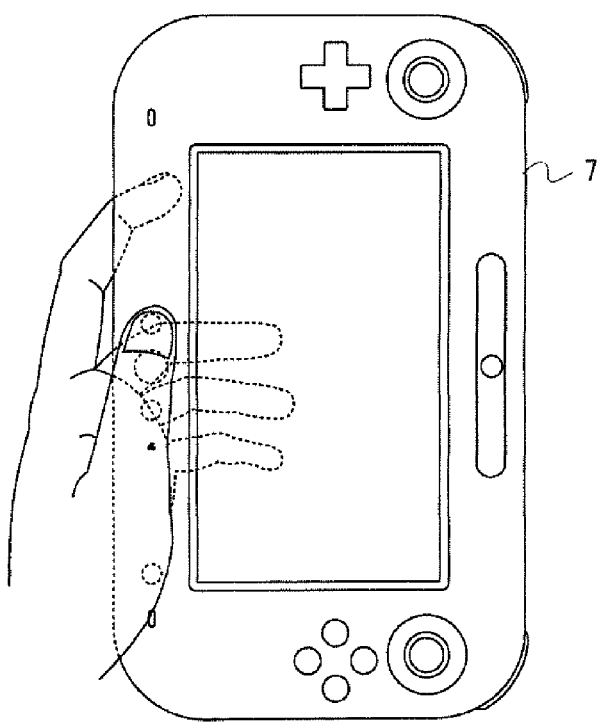
FIG. 13 is a diagram showing a user holding the terminal device 7 in a portrait position.

Next, a configuration of a terminal device 7 will be described with reference to FIGS. 8 to 13. FIG. 8 is a plan view showing an external configuration of the terminal device 7. FIG. 8(*a*) is a front view of the terminal device 7, FIG. 8(*b*) is a top view thereof, FIG. 8(*c*) is a right side view thereof, and FIG. 8(*d*) is a bottom view thereof. FIG. 9 is a back view of the terminal device 7. FIGS. 10 and 11 are diagrams showing a user holding the terminal device 7 in a landscape position. FIGS. 12 and 13 are diagrams showing a user holding the terminal device 7 in a portrait position.

As shown in FIG. 8, the terminal device 7 includes a housing 50 generally in a horizontally-elongated rectangular plate shape. That is, it can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. The longitudinal (z-axis direction) length of the terminal device 7 is preferably 100 to 150 [mm], and is 133.5 [mm] in the present embodiment. The widthwise (x-axis direction) length of the terminal device 7 is preferably 200 to 250 [mm], and is 228.26 [mm] in the present embodiment. The thickness (the length in the y-axis direction) of the terminal device 7 is preferably about 15 to about 30 [mm] in a plate-shaped portion and about 30 to about 50 [mm] including the thickest part, and is 23.6 (40.26 in the thickest part) [mm] in the present embodiment. The weight of the terminal device 7 is about 400 to about 600 [g], and is 530 [g] in the present embodiment. Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The size of the screen of the LCD 51 is preferably 5 inches or larger, and is herein 6.2 inches. The controller device 7 of the present embodiment has such a configuration that it is easily held and operated, and it is therefore easy to operate even if a large LCD is provided. In other embodiments, the controller device 7 may be of a relatively small size with the provision of a smaller LCD 51. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIGS. 10 and 11. While FIGS. 10 and 11 show an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction) as shown in FIGS. 12 and 13.

As shown in FIG. 8(*a*), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, the present invention is not limited to using the touch pen 60, and an input may be made on the touch panel 52 with a finger of the user. The housing 50 is provided with a hole 60*a* for accommodating the touch pen 60 used for performing operations on the touch panel 52 (see FIG. 8(*b*)). While the hole 60*a* is provided on the upper surface of the housing 50 so that the touch pen 60 does not fall, it may be provided on the side surface or the bottom surface. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 533 and a plurality of buttons (keys) 54A to 54M, as operation mechanisms (operation sections). The analog sticks 53A and 533 are each a direction-specifying device. The analog sticks 53A and 53B are each configured so that the movable member (stick portion) operated with a finger of the user can be slid in any direction (at any angle in the up, down, left, right and diagonal directions) with respect to the surface of the housing 50. That is, it is a direction input device which is also called a slide pad. The movable member of each of the analog sticks 53A and 533 may be of such a type that it is tilted in any direction with respect to the surface of the housing 50. Since the present embodiment use analog sticks of such a type that the movable members slide, the user can operate the analog sticks 53A and 535 without significantly moving the thumbs, and therefore operations can be made while the housing 50 is held more firmly. When analog sticks of such a type that the movable members tilt are used as the analog sticks 53A and 53B, the degree of input (the degree of tilt) is better perceived by the user, thus allowing the user to more easily perform precise operations.

The left analog stick 53A is provided on the left side of the screen of the LCD 51, and the right analog stick 535 is provided on the right side of the screen of the LCD 51. Therefore, the user can make a direction-specifying input by using an analog stick with either the left or the right hand. As shown in FIGS. 10 and 11, the analog sticks 53A and 53B are provided at such positions that the user can operate them while holding the left and right portions of the terminal device 7 (the left and right opposing end portions with respect to the LCD 51), and therefore the user can easily operate the analog sticks 53A and 53B even when holding and moving the terminal device 7.

The buttons 54A to 54L are operation mechanisms (operation sections) for making predetermined inputs, and are keys that can be pressed. As will be discussed below, the buttons 54A to 54L are provided at such positions that the user can operate them while holding the left and right portions of the terminal device 7 (see FIGS. 10 and 11). Therefore, the user can easily operate these operation mechanisms even when holding and moving the terminal device 7.

As shown in FIG. 8(a), the cross button (direction-input button) 54A and the buttons 54B to 54H and 54M, of the operation buttons 54A to 54L, are provided on the front surface of the housing 50. That is, these buttons 54A to 54H and 54M are provided at positions at which they can be operated by the thumbs of the user (see FIGS. 10 and 11).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game device 3 can be remotely turned ON/OFF by operating the power button 54M. The power button 54M is provided on the lower side of the LCD 51 as are the buttons 54B to 54D. The power button 54M is provided on the right side of the buttons 54B to 54D. Thus, the power button 54M is provided at a position at which it can be operated (easily operated) with the right hand. The four buttons 54E to 54H are provided on the right side of the LCD 51 and under the right analog stick 538. That is, the four buttons 54E to 54H are provided at positions at which they can be operated with the right hand of the user. Moreover, the four buttons 548 to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, the analog sticks 53A and 538 are provided above the cross button 54A and the buttons 548 to 54H. Here, the analog sticks 53A and 533 protrude beyond the cross button 54A and the buttons 54E to 54H in the thickness direction (the y-axis direction). Therefore, if the positions of the analog stick 53A and the cross button 54A are reversed, the thumb of the user may inadvertently touch the analog stick 53A when the user is operating the cross button 54A with the thumb. A similar problem occurs also when the positions of the analog stick 53B and the buttons 54E to 54H are reversed. In contrast, in the present embodiment, since the analog sticks 53A and 53B are provided above the cross button 54A and the buttons 54E to 54H, the possibility that a finger may inadvertently touch the cross button 54A and the buttons 54E to 54H when the user is operating the analog sticks 53A and 53B is smaller as compared with the above cases. Thus, in the present embodiment, the possibility of erroneous operations can be reduced, and it is possible to improve the controllability of the terminal device 7. Note however that in other embodiments, the positions of the analog stick 53A and the cross button 54A may be reversed and the positions of the analog stick 53B and the buttons 54E to 54H may be reversed as necessary.

Here, in the present embodiment, some operation sections (the analog sticks 53A and 53B, the cross button 54A, and the three buttons 54E to 54G) are provided on the left and right opposing sides of the display section (the LCD 51) and above the center of the housing 50 in the up/down direction (y-axis direction). When operating these operation sections, the user primarily holds a portion of the terminal device 7 that is above the center thereof in the up/down direction. If the user holds the lower portion of the housing 50 (particularly if the terminal device 7 has a relatively large size as in the present embodiment), the terminal device 7 to be held becomes unstable, making it more difficult for the user to hold the terminal device 7. In contrast, in the present embodiment, when operating the operation section, the user primarily holds a portion of the terminal device 7 that is above the center thereof in the up/down direction, and the housing 50 can be supported from the sides by the palms. Therefore, the user can stably hold the housing 50 and it is made easier to hold the terminal device 7, thus making it easier to operate the operation section. In other embodiments, operation sections are provided, at least one on the left and one on the right of the display section, above the center of the housing 50. For example, only the analog sticks 53A and 53B may be provided above the center of the housing 50. For example, in a case in which the cross button 54A is provided above the left analog stick 53A and the four buttons 54E to 54H are provided above the right analog stick 53B, the cross button 54A and the four buttons 54E to 54H may be provided above the center of the housing 50.

In the present embodiment, a projecting portion (an eaves portion 59) is provided on the back side of the housing 50 (the side opposite to the front surface where the LCD 51 is provided) (see FIGS. 8(*c*) and 9). As shown in FIG. 8(*c*), the eaves portion 59 is a mountain-shaped member which is projecting from the back surface of the generally plate-shaped housing 50. The projecting portion has such a height (thickness) that it can rest on fingers of the user holding the back surface of the housing 50. The height of the projecting portion is preferably 10 to 25 [mm], and is 16.66 [mm] in the present embodiment. The bottom surface of the projecting portion preferably has an inclination of 45° or more (more preferably 60° or more) with respect to the back surface of the housing 50 so that the projecting portion easily rests on fingers of the user. As shown in FIG. 8(*c*), the bottom surface of the projecting portion may have a larger inclination angle than the upper surface. As shown in FIGS. 10 and 11, the user can hold the terminal device 7 stably without getting tired even if the terminal device 7 has a relatively large size by holding the terminal device 7 while resting fingers on the eaves portion 59 (placing the eaves portion 59 on the fingers). That is, the eaves portion 59 can be referred to as a supporting member by means of which the housing 50 is supported by fingers, and can be referred to also as a finger-resting portion.

The eaves portion 59 is provided above the center of the housing 50 with respect to the up/down direction. The eaves portion 59 is provided on the reverse side so as to generally correspond to the operation sections (the analog sticks 53A and 53B) which are provided on the front surface of the housing 50. That is, the projecting portion is provided so as to extend across an area on the reverse side including positions corresponding to the operation sections which are provided respectively on the left side and on the right side of the display section. Therefore, when operating the operation section, the user can hold the terminal device 7 so as to support the eaves portion 59 with the middle fingers or the ring fingers (see FIGS. 10 and 11). Then, it is easier to hold the terminal device 7, and it is easier to operate the operation sections. In the present embodiment, since the projecting portion has an eaves-like shape extending in the left/right direction, the user can hold the terminal device 7 with the middle fingers or the ring fingers placed along the bottom surface of the projecting portion, making it easier to hold the terminal device 7. The eaves portion 59 is not limited to the shape extending in the horizontal direction as shown in FIG. 9, as long as it is formed so that it (i.e., a portion thereof that is projecting) extends in the left/right direction. In other embodiments, the eaves portion 59 may extend in a direction that is slightly inclined from the horizontal direction. For example, the eaves portion 59 may be provided so as to be inclined upwardly (or downwardly) from the left and right opposing end portions toward the center.

The present embodiment employs the eaves portion 59 having a shape of an eaves as the projecting portion formed on the back surface of the housing for the purpose of providing engagement holes to be described below in the eaves portion 59, but the projecting portion may have any other suitable shape. For example, in other embodiments, two projecting portions may be provided in the left and right opposing portions (with no projecting portion in the center of the left/right direction) on the back side of the housing 50 (see FIG. 32). In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eaves portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 preferably includes a down-facing surface (the bottom surface of the projecting portion) formed in the left and right opposing portions of the back surface. Then, the user can easily hold the controller device with fingers abutting against this surface. While the "down-facing surface" may be provided at any position on the back surface of the housing 50, it is preferably located above the center of the housing 50.

As shown in FIGS. 8(*a*), 8(*b*) and 8(*c*), a first L button 54I and a first R button 54J are provided respectively in the right and left opposing portions on the upper surface of the housing 50. In the present embodiment, the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface (in other words, it is exposed on both the upper and left side surfaces). The first R button 54J is provided at the right end of the upper side surface of the housing 50, and is exposed on the upper right side surface (in other words, it is exposed on both the upper and right side surfaces). Thus, the first L button 54I is provided at such a position that it can be operated with the left index finger of the user, and the first R button 54J is provided at such a position that it can be operated with the right index finger of the user (see FIG. 10). In other embodiments, the operation sections provided respectively in the left and right portions of the upper surface of the housing 50 do not have to be provided at the left end and the right end, and may be provided at positions other than the end portions. The operation sections may be provided respectively on the left and right side surfaces of the housing 50.

As shown in FIGS. 8(*c*) and 9, a second L button 54K and a second R button 54L are provided on the projecting portion (the eaves portion 59). The second L button 54K is provided near the left end of the eaves portion 59. The second R button 54L is provided near the right end of the eaves portion 59. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to (generally) correspond to the left analog stick 53A provided on the front surface, and the second R button 54L is provided on the reverse side so as to (generally) correspond to the right analog stick 53B provided on the front surface. Thus, the second L button 54K is provided at a position at which it can be operated with the left middle finger or left index finger of the user, and the second R button 54L is provided at a position at which it can be operated with the right middle finger or right index finger of the user (see FIGS. 10 and 11). The second L button 54K and the second R button 54L are provided on the upper surface of the eaves portion 59 as shown in FIG. 8(*c*). Therefore, the second L button 54K and the second R button 54L have upwardly-facing (diagonally-upwardly-facing) button surfaces. It is believed that the middle fingers or the index fingers will generally move in the up/down direction when the user holds the terminal device 7, and it will be easier for the user to press the second L button 54K and the second R button 54L if the button surfaces are facing upward.

As described above, in the present embodiment, operation sections (the analog sticks 53A and 533) are provided respectively on the left side and the right side of the display section (the LCD 51) above the center of the housing 50, and other operation sections (the second L button 54K and the second R button 54L) are provided on the back side of the housing 50 so as to generally correspond respectively to the operation sections. Thus, since the operation sections and the other operation sections are provided on the front side and on the back side of the housing 50 so as to generally correspond to each other, the user can hold the housing 50 so as to sandwich the housing 50 from the front side and from the back side when operating these operation sections. When operating these operation sections, the user holds a portion of the housing 50 that is above the center thereof in the up/down direction, and therefore the terminal device 7 can be held in the upper portion thereof and the terminal device 7 can be supported by the palms (see FIGS. 10 and 11). Thus, the user can stably hold the housing 50 in a state in which the user can operate at least four operation sections, and it is therefore possible to provide a controller device (the terminal device 7) which can be easily held by the user and which has a good controllability.

As described above, in the present embodiment, the user can easily hold the terminal device 7 by holding the terminal device 7 with fingers abutting against the bottom surface of the projecting portion (the eaves portion 59). Since the second L button 54K and the second R button 54L are provided on the upper surface of the projecting portion, the user can easily operate these buttons in such a state as described above. The user can easily hold the terminal device 7 in the following manner, for example.

That is, as shown in FIG. 10, the user can hold the terminal device 7 with the ring fingers abutting against the bottom surface of the eaves portion 59 (the one-dot-chain line shown in FIG. 10) (so as to support the eaves portion 59 with the ring fingers). Then, the user can operate the four buttons (the first L button 54I, the first R button 54J, the second L button 54K and the second R button 54L) with the index fingers and the middle fingers. For example, in a case in which required game operations are relatively complicated and many buttons are to be used, it is possible to easily operate many buttons by holding the terminal device 7 as shown in FIG. 10. Since the analog sticks 53A and 53B are provided above the cross button 54A and the buttons 54E to 54H, the user can advantageously operate the analog sticks 53A and 53B with the thumbs when relatively complicated operations are required. In FIG. 10, the user holds the terminal device 7 with the thumbs abutting against the front surface of the housing 50, the index fingers against the upper surface of the housing 50, the middle fingers against the upper surface of the eaves portion 59 on the back surface of the housing 50, the ring fingers against the bottom surface of the eaves portion 59, and the little fingers against the back surface of the housing 50. Thus, the user can firmly hold the terminal device 7 as if to wrap around the housing 50 from four directions.

As shown in FIG. 11, the user can also hold the terminal device 7 with the middle fingers abutting against the bottom surface of the eaves portion 59 (the one-dot-chain line shown in FIG. 11). Then, the user can easily operate two buttons (the second L button 54K and the second R button 54L) with the index fingers. For example, in a case in which required game operations are relatively simple and only a few buttons are to be used, the terminal device 7 may be held as shown in FIG. 11. In FIG. 11, since the user can hold the lower side of the housing 50 with two fingers (the ring finger and the little finger), it is possible to firmly hold the terminal device 7.

In the present embodiment, the eaves portion 59 is provided so that the bottom surface thereof is located between the analog sticks 53A and 53B and the cross button 54A and the four buttons 54E to 54H (so that it is located on the lower side of the analog sticks 53A and 53B and above the cross button 54A and the four buttons 54E to 54H). Therefore, in a case in which the terminal device 7 is held with the ring fingers abutting against the eaves portion 59 (FIG. 10), the analog sticks 53A and 53B can be easily operated with the thumbs, and in a case in which the terminal device 7 is held with the middle fingers abutting against the eaves portion 59 (FIG. 11), the cross button 54A and the four buttons 54E to 54H can be easily operated with the thumbs. That is, in either of the two cases, the user can make a direction input operation while firmly holding the terminal device 7.

As described above, the user can also hold the terminal device 7 in a portrait position. That is, as shown in FIG. 12, the user can hold the terminal device 7 in a portrait position by holding the top side of the terminal device 7 with the left hand. As shown in FIG. 13, the user can hold the terminal device 7 in a portrait position by holding the bottom side of the terminal device 7 with the left hand. While FIGS. 12 and 13 show the case in which the terminal device 7 is held with the left hand, it may be held with the right hand. Thus, since the user can hold the terminal device 7 with one hand, it is possible to for example perform an operation in which the terminal device 7 is held with one hand while an input is made to the touch panel 52 with the other hand.

In a case in which the terminal device 7 is held in a manner shown in FIG. 12, the user can firmly hold the terminal device 7 by having fingers other than the thumbs (the middle fingers, the ring fingers and the little fingers in FIG. 12) abutting against the bottom surface of the eaves portion 59 (the one-dot-chain line shown in FIG. 12). Particularly, in the present embodiment, since the eaves portion 59 extends in the left/right direction (in the up/down direction in FIG. 12), the user can abut fingers other than the thumbs against the eaves portion 59 and firmly hold the terminal device 7, irrespective of the position along the top side of the terminal device 7 at which the user holds the terminal device 7. That is, in a case in which the terminal device 7 is used in a portrait position, the eaves portion 59 can be used as a grip. On the other hand, in a case in which the terminal device 7 is held in a manner shown in FIG. 13, the user can operate the buttons 54B to 54D with the left hand. Therefore, it is possible for example to operate the buttons 54B to 54D with the hand with which the terminal device 7 is held while making inputs to the touch panel 52 with the other hand, thereby allowing for more operations.

With the terminal device 7 of the present embodiment, since the projecting portion (the eaves portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eaves portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eaves portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54S to 54E may be used for OK button operations, cancel button operations, etc. The terminal device 7 may include a button for turning ON/OFF the power of the LCD 51, and a button for performing a connection setting (pairing) with the game device 3.

As shown in FIG. 8(*a*), the terminal device 7 includes the marker section 55 including a marker 55A and a marker 55S on the front surface of the housing 50. The marker section 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 69 as a sound input mechanism. A microphone hole 50*c* is provided on the front surface of the housing 50. The microphone 69 is provided inside the housing 50 behind the microphone hole 50*c*. The microphone 69 detects sounds around the terminal device 7 such as the voice of the user.

The terminal device 7 includes a speaker 77 as a sound output mechanism. As shown in FIG. 8(*d*), speaker holes 57 are provided in a lower portion of the front surface of the housing 50. The output sounds from the speaker 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speaker 77. The terminal device 7 includes a sound output terminal 62 for receiving a sound output section such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing 50 so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. In the present embodiment, the extension connector 58 is provided on the lower side surface of the housing 50 as shown in FIG. 8(*d*). The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a stand 210 to be described below, power is supplied from the stand 210 to the terminal device 7. In the present embodiment, the charging terminal 66 is provided on the lower side surface of the housing 50. Therefore, when the terminal device 7 and an additional device (e.g., an input device 200 shown in FIG. 15 or an input device 220 shown in FIG. 17) are connected to each other, it is possible to supply power from one to the other, in addition to exchanging information therebetween, via the extension connector 58. Thus, with the provision of the charging terminal 66 around (on the left and right opposing sides of) the extension connector 58, it is possible to supply power, as well as exchange information, when the terminal device 7 and an additional device are connected to each other. The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger. Although the charging connector (the cover portion 61) is provided on the upper side surface of the housing 50 in view of the fact that an additional device is connected to the lower side surface of the housing in the present embodiment, it may be provided on the left and right side surfaces or the lower side surface.

The terminal device 7 includes a battery cover 67 which can be attached to and removed from the housing 50. A battery (a battery 85 shown in FIG. 14) is placed inside the battery cover 67. In the present embodiment, the battery cover 67 is provided on the back side of the housing 50, below the projecting portion (the eaves portion 59).

The housing 50 of the terminal device 7 includes holes 65*a* and 65*b* through which a strap cord can be tied to the terminal device 7. As shown in FIG. 8(*d*), the holes 65*a* and 65*b* are provided on the bottom surface of the housing 50 in the present embodiment. Two holes 65*a* and 65*b* are provided in the present embodiment, one in the left portion and another in the right portion of the housing 50. Specifically, the hole 65*a* is provided on the left side of the center of the bottom surface of the housing 50, and the hole 65*b* is provided on the right side of the center of the bottom surface of the housing 50. The user can tie a strap to one of the holes 65*a* and 65*b*, and fasten the strap to the wrist of the user. Then, even if the user drops the terminal device 7 or if the terminal device 7 comes off the hand, the terminal device 7 is prevented from falling or hitting other objects. In the present embodiment, since the holes are provided both in the left and right portions, the user can conveniently fasten a strap to either hand.

With the terminal device 7 shown in FIGS. 8 to 13, the shape of each operation button, the shape of the housing 50, the number and the positions of the components, etc., are merely illustrative, and the present invention can be realized with other shapes, numbers, and positions.

Figure 14:
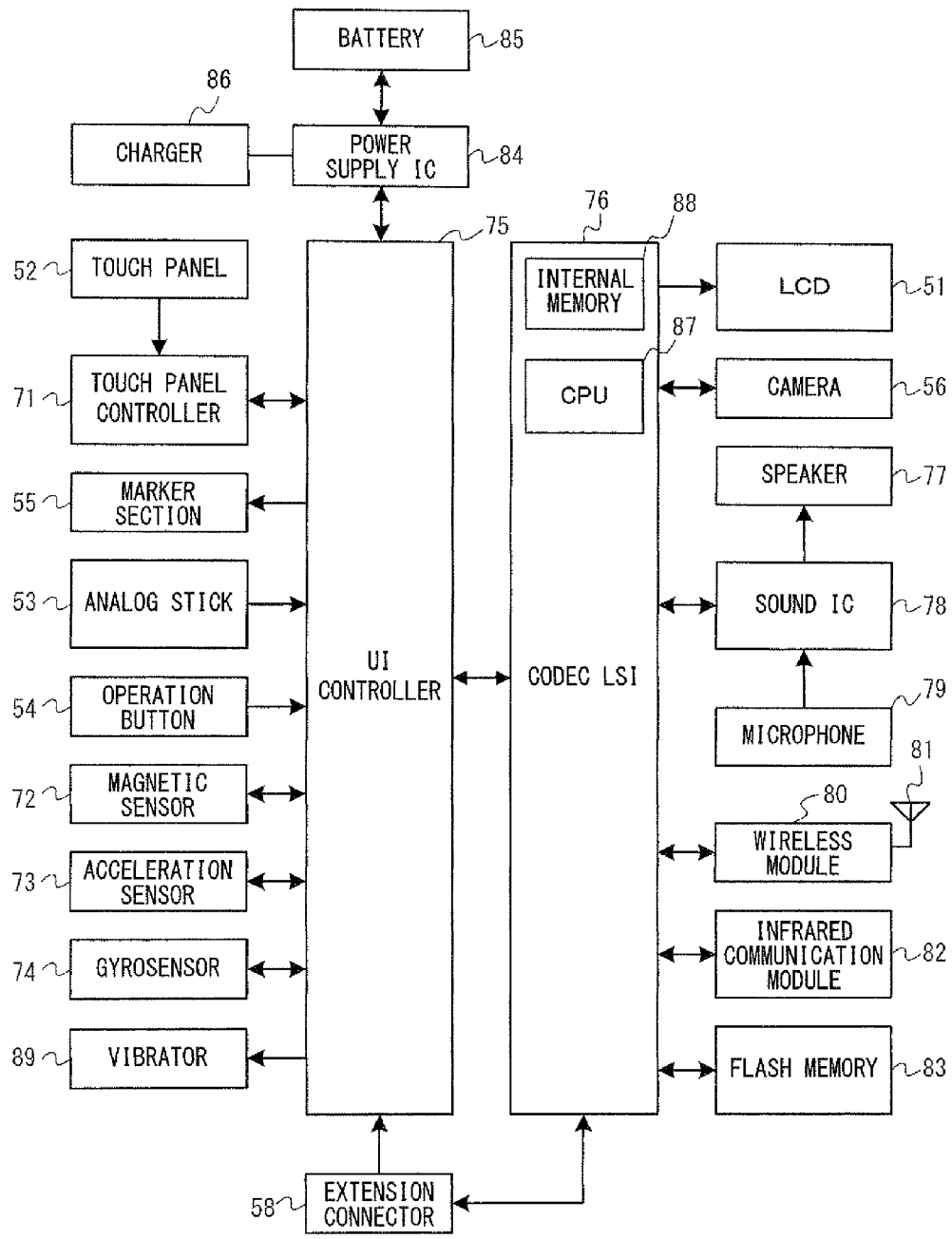
FIG. 14 is a block diagram showing an internal configuration of the terminal device 7.

Next, an internal configuration of the terminal device 7 will be described with reference to FIG. 14. FIG. 14 is a block diagram showing an internal configuration of the terminal device 7. As shown in FIG. 14, in addition to the configuration shown in FIG. 8, the terminal device 7 includes a touch panel controller 71, a magnetic sensor 72, the acceleration sensor 73, the gyrosensor 74, a user interface controller (UI controller) 75, a codec LSI 76, the speaker 77, a sound IC 78, the microphone 79, a wireless module 80, an antenna 81, an infrared communication module 82, a flash memory 83, a power supply IC 84, a battery 85, and a vibrator 89. These electronic components are mounted on an electronic circuit board and accommodated in the housing 50.

The UI controller 75 is a circuit for controlling the input/output of data to/from various types of input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, the gyrosensor 74, and the vibrator 89. The UI controller 75 is connected to the codec LSI 76 and the extension connector 58. The power supply IC 84 is connected to the UI controller 75, and power is supplied to various sections via the UT controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function. That is, although not shown in the drawings, a cradle (the stand 210 shown in FIG. 20) with which power can be obtained from an external power supply can be connected to the power supply IC 84 via the charging terminal 66, and the terminal device 7 can receive power supply from or be charged by an external power supply using the cradle.

The touch panel controller 71 is a circuit connected to the touch panel 52 for controlling the touch panel 52. The touch panel controller 71 generates touch position data of a predetermined format based on signals from the touch panel 52, and outputs it to the UI controller 75. The touch position data represents, for example, the coordinates of a position on the input surface of the touch panel 52 at which an input is made. The touch panel controller 71 reads a signal from the touch panel 52 and generates touch position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects the azimuthal direction by sensing the size and direction of the magnetic field. Azimuthal direction data representing the detected azimuthal direction is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 8(*a*)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyrosensor 74 is provided inside the housing 50 for detecting angular velocities about the three axes, i.e., the x-axis, the y-axis and the z-axis. Angular velocity data representing the detected angular velocities is outputted to the UI controller 75. Control instructions for a gyrosensor 74 are outputted from the UI controller 75 to the gyrosensor 74. The number and combination of gyrosensors used for detecting angular velocities about three axes may be any number and combination, and the gyrosensor 74 may be formed by a 2-axis gyrosensor and a 1-axis gyrosensor, as is the gyrosensor 48. The gyrosensor 74 may be a gyrosensor for 1-axis or 2-axis detection.

The vibrator 89 is, for example, a vibration motor or a solenoid, and is connected to the UI controller 75. The terminal device 7 is vibrated by actuation of the vibrator 89 based on a command from the UI controller 75. Therefore, the vibration is conveyed to the player's hand holding the terminal device 7, and thus a so-called vibration-feedback game is realized.

The UI controller 75 outputs, to the codec LSI 76, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 76 is a circuit for performing a compression process on data to be transmitted to the game device 3, and an expansion process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88.

While the terminal device 7 does not itself perform game processes, the terminal device 7 needs to execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speaker 77 and the microphone 79 for controlling input/output of sound data to/from the speaker 77 and the microphone 79. That is, when sound data is received from the codec LSI 76, the sound IC 78 outputs sound signals obtained by performing D/A conversion on the sound data to the speaker 77 so that sound is outputted from the speaker 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The codec LSI 76 transmits, as terminal operation data, image data from the camera 56, sound data from the microphone 79 and operation data from the UI controller 75 to the game device 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 82 establishes infrared communication in conformity with the IRDA standard, for example, with the other device. The codec LSI 76 may transmit, to the game device 3, data received via infrared communication while it is included in the transmit data as necessary.

As described above, compressed image data and sound data are transmitted from the game device 3 to the terminal device 7. These data are received by the codec LSI 76 via the antenna 81 and the wireless module 80. The codec LSI 76 expands the received image data and sound data. The expanded image data is outputted to the LCD 51, and images are displayed on the LCD 51. That is, the codec LSI 76 (the CPU 87) displays the received image data on the display section. The expanded sound data is outputted to the sound IC 78, and the sound IC 78 outputs sounds from the speaker 77.

In a case in which control data is included in data received from the game device 3, the codec LSI 76 and the UI controller 75 give control instructions to various sections in accordance with the control data. As described above, the control data is data representing control instructions for the components of the terminal device 7 (the camera 56, the touch panel controller 71, the marker section 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyrosensor 74 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

(Configuration of Additional Device)

Next, an example of an additional device that can be attached (connected) to the terminal device 7 will be described with reference to FIGS. 15 to 20. The additional device may have any function. For example, the additional device may be an additional controller device attached to the terminal device 7 for predetermined operations, a charger for supplying power to the terminal device 7, or a stand for holding the terminal device 7 so that the terminal device 7 stands in a predetermined attitude.

As shown in FIGS. 8(*d*) and 9, engagement holes 59*a* and 59*b* with which tab portions of an additional device can engage are provided on the bottom surface of the projecting portion (the eaves portion 59). The engagement holes 59*a* and 59*b* are used when connecting an additional device to the terminal device 7. That is, the additional device includes tab portions which can engage with the engagement holes 59*a* and 59*b*, and when connecting the additional device to the terminal device 7, the tab portions are engaged with the engagement holes 59a and 59b, thereby securing the terminal device 7 and the additional device with each other. Threaded holes may be further provided inside the engagement holes 59a and 59b so that the additional device can be securely fixed by screws. The projecting portion provided on the back surface of the terminal device 7 is herein the eaves portion 59 having an eaves-like shape. That is, the eaves portion 59 is provided so as to extend in the left/right direction. As shown in FIG. 9, the engagement holes 59a and 59b are provided near the center (with respect to the left/right direction) of the bottom surface of the eaves portion 59. While the number of the engagement holes 59a and 59b provided on the bottom surface of the eaves portion 59 is not limited to any particular number, if there is one engagement hole, it is preferably provided at the center of the eaves portion 59, and if there are a plurality of engagement holes, they are preferably provided in left-right symmetry. Then, the additional device can be stably connected while evenly maintaining the left-right balance. In a case in which the engagement holes are provided near the center, the size of the additional device can be reduced as compared with a case in which they are provided at the left and right opposing ends. Thus, the eaves portion 59 can be used as a member for engaging the additional device.

In the present embodiment, engagement holes 50a and 50b are provided on the bottom surface of the housing 50 as shown in FIG. 8(d). Therefore, in a case in which the additional device is connected to the terminal device 7, four tab portions are respectively engaged with four engagement holes, thereby securing the terminal device 7 and the additional device with each other. Thus, the additional device can be more securely connected to the terminal device 7. Threaded holes may be provided also inside the engagement holes 50a and 50b so that the additional device can be screwed thereto. In other embodiments, the engagement holes provided in the housing may be in any arrangement.

Figure 15:
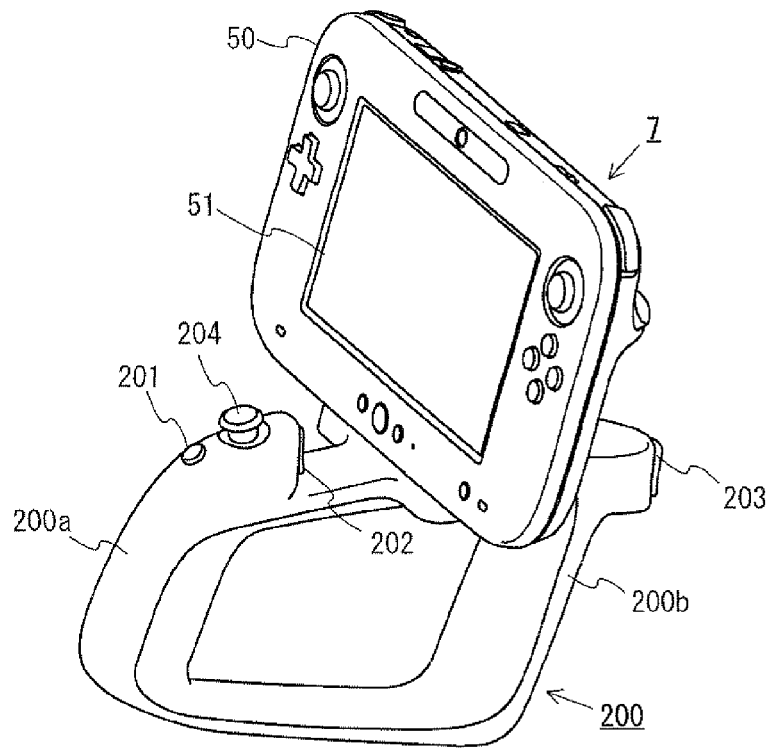
FIG. 15 is a diagram showing an example in which an additional device (an input device 200) is attached to the terminal device 7.
Figure 16:
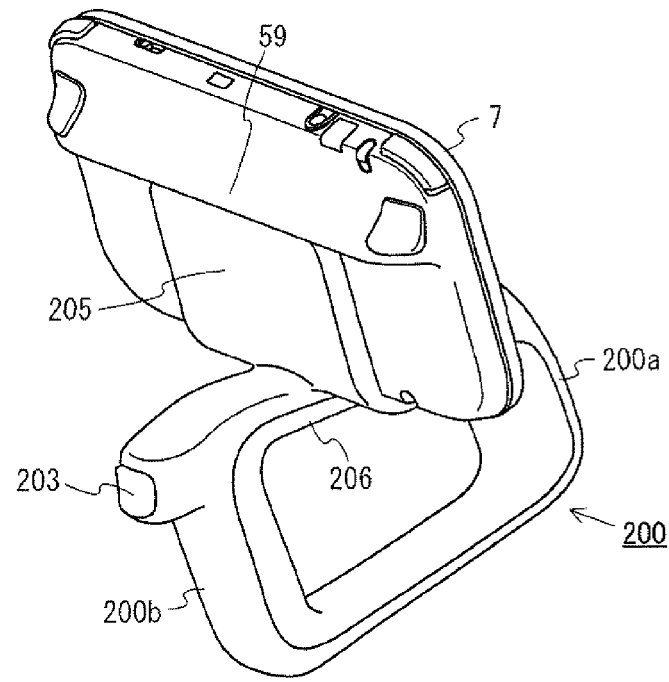
FIG. 16 is a diagram showing an example in which an additional device (the input device 200) is attached to the terminal device 7.

FIGS. 15 and 16 are diagrams showing an example in which the additional device is attached to the terminal device 7. FIG. 15 is a diagram showing the terminal device 7 and an input device 200 as seen from the front surface side of the terminal device 7, and FIG. 16 is a diagram showing the terminal device 7 and the input device 200 as seen from the back surface side of the terminal device 7. In FIGS. 15 and 16, the input device 200, which is an example of the additional device, is attached to the terminal device 7.

The input device 200 includes a first grip portion 200a and a second grip portion 200b. Each of the grip portions 200a and 200b has a bar-like (pillar-like) shape, and can be held by one hand of the user. The user can use the input device 200 (and the terminal device 7) by holding only one of the grip portions 200a and 200b, or use the input device 200 by holding both. The input device 200 may include only one grip portion. The input device 200 includes a support portion 205. In the present embodiment, the support portion 205 supports the reverse surface (back surface) of the terminal device 7. Specifically, the support portion 205 includes four tab portions (protruding portions), and the four tab portions can be engaged with the engagement holes 50a, 50b, 59a and 59b, respectively.

In a case in which the input device 200 is connected to the terminal device 7 as shown in FIG. 15, the four tab portions are engaged with the four engagement holes 50a, 50b, 59a and 59b, respectively, thereby securing the terminal device 7 and the additional device with each other. Thus, the input device 200 can be securely fixed to the terminal device 7. In other embodiments, the input device 200 may be more securely fixed to the terminal device 7 by screwing together the input device 200 and the terminal device 7, in addition to (or instead of) the engagement between the tab portions and the engagement holes. While screwing may be done at any position, the support portion 205 of the input device 200, which lies against the reverse surface of the housing 50, and the eaves portion 59 may be screwed together, for example.

As described above, in the present embodiment, the additional device can be firmly fixed to the terminal device 7 by the engagement holes 59a and 59b. Since the terminal device 7 includes sensors (the magnetic sensor 72, the acceleration sensor 73, and the gyrosensor 74) for detecting the movement and the inclination of the terminal device 7, the terminal device 7 itself can be moved around during use. For example, in a case in which the input device 200 is connected to the terminal device 7 shown in FIGS. 15 and 16, the user may move the input device 200 as if it were a gun while holding the grip portion 200a and/or the grip portion 200b of the input device 200. In a case in which the terminal device 7 itself is expected to be moved around as in the present embodiment, it is particularly advantageous to firmly fix the additional device by means of the engagement holes 59a and 59b.

In the present embodiment, the support portion 205 detachably supports the terminal device 7 so that the screen of the LCD 51 is in a generally vertical direction when the first grip portion 200a (or the second grip portion 200b) is in the vertical direction. The grip portions 200a and 200b are formed so as to extend generally parallel to the display section of the terminal device 7 connected to the input device 200 (the front surface of the housing 50). In other words, the grip portions 200a and 200b are formed so as to extend in the up/down direction of the display section of the terminal device 7 connected to the input device 200. Thus, the input device 200 is connected to the terminal device 7 in such an attitude that the display section of the terminal device 7 faces toward the user (when the user holds the input device 200). Since the user can have the screen of the display section facing toward the user by holding (at least one of) the grip portions 200a and 200b so that they extend in a generally vertical direction, the user can make operations using the input device 200 while looking at the screen of the display section. Although the second grip portion 200b is in a direction generally parallel to the first grip portion 200a in the present embodiment, at least one grip portion may be formed to be in a direction generally parallel to the screen of the LCD 51 in other embodiments. Then, by holding that grip portion, the user can easily hold the input device 200 (and the terminal device 7) so that the LCD 51 faces toward the user.

In the above embodiment, the support portion 205 is provided on a connection member 206 which connects the first grip portion 200a and the second grip portion 200b to each other. That is, since the support portion 205 is provided between the two grip portions 200a and 200b, the terminal device 7 connected to the input device 200 is provided between the two grip portions 200a and 200b. Then, since the center of gravity of the controller device (controller system) including the terminal device 7 and the input device 200 lies between the two grip portions 200a and 200b, the user can easily hold the controller device by gripping the two grip portions 200a and 200b. In the above embodiment, one grip portion (the first grip portion 200a) is provided at a position on the front side of the screen of the terminal device 7 attached to the input device 200, and the other grip portion (the second grip portion 200b) is provided at a position on the back side of the screen. Therefore, the user can easily hold the controller device by holding the two grips as if to hold a gun with one hand on the front side of the screen and the other on the back side of the screen. Therefore, the controller device is particularly suitable for a shooting game, or the like, in which game operations are performed while assuming that the controller device is a gun, for example.

The input device 200 includes a first button 201, a second button 202, a third button 203, and a stick 204 as operation sections. Each of the buttons 201 to 203 is a button (key) that can be pressed by the user. The stick 204 is a direction-specifying device. The operation sections are preferably provided at positions where they can be operated with fingers of the hand of the user holding a grip portion. In the present embodiment, the first button 201, the second button 202 and the stick 204 are provided at positions where they can be operated with the thumb or the index finger of the hand holding the first grip portion 200a. The third button 203 is provided at a position where it can be operated with the index finger of the hand holding the second grip portion 200b.

The input device 200 may include an image-capturing device (image-capturing section). For example, the input device 200 may have a configuration similar to that of the image capturing/processing section 35 of the controller 5. Then, the image-capturing element of the image capturing/processing section may be provided in a direction for capturing an image in the forward direction of the input device 200 (in the backward direction of the screen of the terminal device 7). For example, an infrared filter may be provided at a position of the third button 203 instead of the third button 203, and an image-capturing element may be provided behind the infrared filter. Then, if the user holds the input device 200 so that the front side thereof faces toward the television 2 (the marker device 6), the game device 3 can calculate the direction and the position of the input device 200. Thus, the user can perform operations of directing the input device 200 in an intended direction, and the user can perform intuitive and easy operations using the input device 200. The input device 200 may include a camera similar to the camera 56, instead of the image capturing/processing section. Then, as with the image-capturing element, the camera may be provided in a direction for capturing an image in the forward direction of the input device 200. Then, if the user holds the input device 200 so that the front side thereof faces toward the television 2 (the marker device 6), it is possible to capture an image in the opposite image-capturing direction to that with the camera 56 of the terminal device 7.

The input device 200 includes a connector (not shown), and the connector is connected to the extension connector 58 of the terminal device 7 when the terminal device 7 is attached to the input device 200. Thus, it is possible to exchange data between the input device 200 and the terminal device 7. For example, data representing operations performed on the input device 200 and data representing image-capturing results obtained by the image-capturing device may be transmitted to the terminal device 7. Then, the terminal device 7 may wirelessly transmit, to the game device 3, operation data representing operations performed on the terminal device 7 and data transmitted from the input device. The input device 200 may include a charging terminal which is connected to the charging terminal 66 of the terminal device 7 when the terminal device 7 is attached to the input device 200. Then, when the terminal device 7 is attached to the input device 200, power can be supplied from one device to the other. For example, the input device 200 may be connected to the charger, and the terminal device 7 may be charged by obtaining power from the charger via the input device 200.

Figure 17:
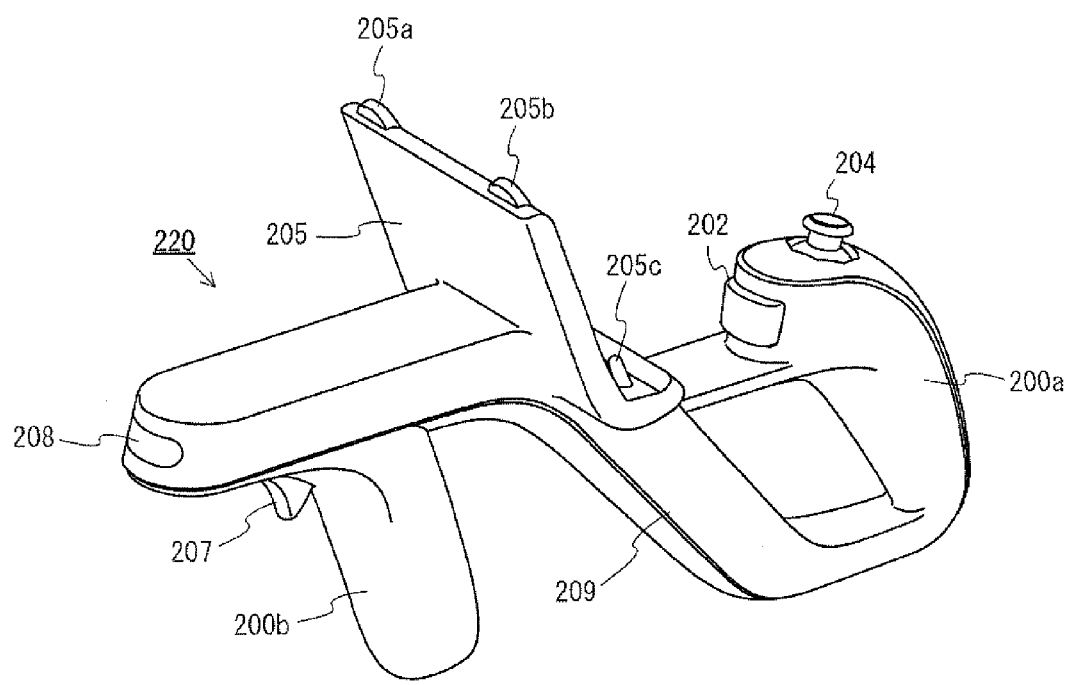
FIG. 17 is a diagram showing another example of an input device.
Figure 18:
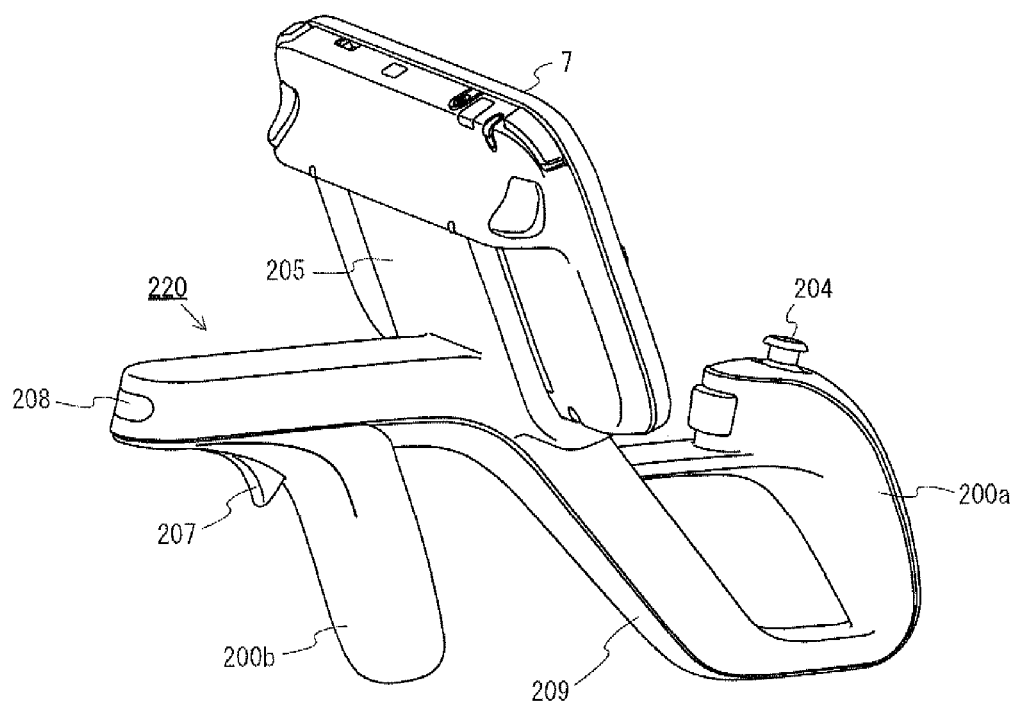
FIG. 18 is a diagram showing an input device 220 shown in FIG. 17 attached to the terminal device 7.
Figure 19:
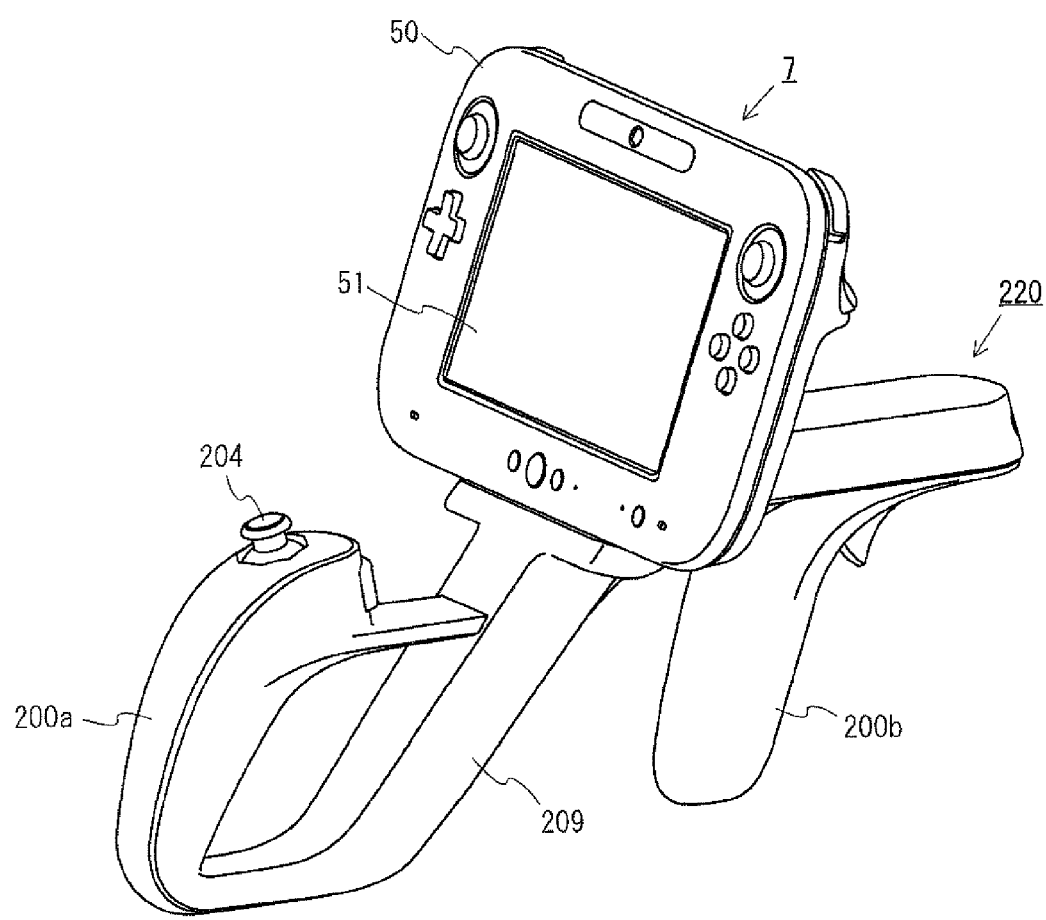
FIG. 19 is a diagram showing the input device 220 shown in FIG. 17 attached to the terminal device 7.

The input device 200 may have a configuration as follows, for example. FIG. 17 is a diagram showing another example of an input device. FIGS. 18 and 19 are diagram showing an input device 220 shown in FIG. 17 attached to the terminal device 7. FIG. 18 is a diagram showing the terminal device 7 and the input device 220 as seen from the back surface side of the terminal device 7, and FIG. 19 is a diagram showing the terminal device 7 and the input device 220 as seen from the front surface side of the terminal device 7. For example, the input device 220 shown in FIG. 17 may be attached to the terminal device 7. The input device 220 will now be described. In FIGS. 17 to 20, like elements to those of the input device 200 shown in FIGS. 15 and 16 will be denoted by like reference numerals to those used in FIGS. 15 and 16 and will not be further described below.

As shown in FIG. 17, the input device 220 includes the first grip portion 200a and the second grip portion 200b similar to those of the input device 200. Therefore, the user can use the input device 220 (and the terminal device 7) by holding only one of the grip portions 200a and 200b, or use the input device 220 by holding both.

The input device 220 includes the support portion 205 similar to that of the input device 200. The support portion 205 includes four tab portions (only three tab portions 205a to 205c are shown in FIG. 17) as does the support portion of the input device 200. The upper two tab portions 205a and 205b, of the four tabs, can be engaged with the engagement holes 59a and 59b, respectively, of the terminal device 7. The remaining two lower tab portions can be engaged with the engagement holes 50a and 50b, respectively, of the terminal device 7. The tab portion not shown is provided in symmetry with the tab portion 205c with respect to the left/right direction (the left/right direction of the terminal device 7 attached to the support portion 205).

In a case in which the input device 220 is connected to the terminal device 7 as shown in FIGS. 18 and 19, the four tab portions are engaged with the four engagement holes 50a, 50b, 59a and 59b, respectively, thereby securing the terminal device 7 and the input device 220 with each other. Thus, the input device 220 can be securely fixed to the terminal device 7. In other embodiments, the input device 220 may be more securely fixed to the terminal device 7 by screwing together the input device 220 and the terminal device 7, in addition to (or instead of) the engagement between the tab portions and the engagement holes. For example, threaded holes may be provided inside the engagement holes 50a and 50b, and the two lower tab portions may be screwed to the engagement holes 50a and 50b. Screwing may be done at any position.

As with the input device 200, the input device 220 can also be firmly fixed to the terminal device 7 as described above.

As with the input device 200, the support portion 205 of the input device 220 detachably supports the terminal device 7 so that the screen of the LCD 51 is in a generally vertical direction when the first grip portion 200a (or the second grip portion 200b) is in the vertical direction. The grip portions 200a and 200b are formed so as to extend generally parallel to the display section of the terminal device 7 connected to the input device 220 (the front surface of the housing 50). Therefore, since the user can have the screen of the display section facing toward the user by holding (at least one of) the grip portions 200a and 200b so that they extend in a generally vertical direction, the user can make operations using the input device 220 while looking at the screen of the display section. As with the input device 200, the support portion 205 of the input device 220 supports the terminal device 7 above the grip portions, and therefore the screen will be arranged so that it is easy for the user to view as the user holds the grip portions. In other embodiments, at least one grip portion may be formed in a direction generally parallel to the screen of the LCD 51.

The shape of the connecting portion of the input device 220 is different from that of the input device 200. A connecting portion 209 shown in FIG. 17 is connected to two, upper and lower, positions of the first grip portion 200*a* and is also connected to an upper portion (upper end) of the second grip portion 200*b*. As with the input device 200, the connecting portion 209 of the input device 220 is formed so as to protrude forward from the second grip portion 200*b*. As with the input device 200, the support portion 205 of the input device 220 is also provided on a connection member 209 which connects the first grip portion 200*a* and the second grip portion 200*b* to each other. Therefore, the user can easily hold the controller device by gripping the two grip portions 200*a* and 200*b*.

The connecting portion 209 includes a member which extends downwardly from the connecting portion with the support portion 205. This member extends in a generally vertical direction when the screen of the LCD 51 of the terminal device 7 connected to the support portion 205 is in a generally vertical direction. That is, this member is generally parallel to the grip portions 200*a* and 200*b*. Therefore, also when this member is held as a grip portion, the user can make operations using the input device 200 while looking at the screen of the LCD 51 by holding this member in a generally vertical direction. Since this member is provided below the support portion 205, the screen will be arranged so that it is easy for the user to view as the user holds this member.

Also with the input device 220, as with the input device 200, one grip portion (the first grip portion 200*a*) is provided at a position on the front side of the screen of the terminal device 7 attached to the input device 220 while the other grip portion (the second grip portion 200*b*) is provided at a position on the back side of the screen. Therefore, as with the input device 200, one can easily hold the input device 220 as if to hold a gun, and the controller device is particularly suitable for a shooting game, or the like, in which game operations are performed while assuming that the controller device is a gun.

The input device 220 includes, as an operation section, a fourth button 207, in addition to the second button 202 and the stick 204 which are similar to those of the input device 200. As with the input device 200, the second button 202 and the stick 204 are provided above the first grip portion 200*a*. The fourth button 207 is a button (key) that can be pressed by the user. The fourth button 207 is provided above the second grip portion 200*b*. That is, the fourth button 207 is provided at a position where it can be operated with the index finger, or the like, of the hand holding the second grip portion 200*b*.

The input device 220 includes an image-capturing element (image-capturing device). Here, the input device 220 has a similar configuration to that of the image capturing/processing section 35 of the controller 5. The image-capturing element of the image capturing/processing section is provided in such a direction as to capture an image in the forward direction of the input device 220 (in the backward direction of the screen of the terminal device 7). Specifically, a window portion (infrared filter) 208 is provided in the front end portion of the input device 220 (the front end portion of a connecting portion 206), and the image-capturing element is provided behind the window portion 208 in such a direction as to capture an image in the forward direction of the window portion 208. As described above, if the user holds the input device 220 so that the front side thereof faces toward the television 2 (the marker device 6), the game device 3 can calculate the direction and the position of the input device 220. Thus, the user can perform operations of directing the input device 220 in an intended direction, and the user can perform intuitive and easy operations using the input device 220.

The input device 220 may include a camera similar to the camera 56, instead of the image capturing/processing section. Then, if the user holds the input device 220 so that the front side thereof faces toward the television 2 (the marker device 6), it is possible to capture an image in the opposite image-capturing direction to that with the camera 56 of the terminal device 7.

As with the input device 200, the input device 220 includes a connector (not shown), and the connector is connected to the extension connector 58 of the terminal device 7 when the terminal device 7 is attached to the input device 220. Thus, it is possible to exchange data between the input device 220 and the terminal device 7. Therefore, data representing operations performed on the input device 220 and data representing image-capturing results obtained by the image-capturing device may be transmitted to the game device 3 via the terminal device 7. In other embodiments, the input device 220 may communicate directly with the game device 3. That is, data representing operations performed on the input device 220 may be transmitted directly from the input device 220 to the game device 3 using a technique such as Bluetooth (registered trademark), as with the wireless communication between the controller 5 and the game device 3, for example. Then, the operation data representing operations performed on the terminal device 7 is transmitted from the terminal device 7 to the game device 3. As with the input device 200, the input device 220 may include a charging terminal to be connected to the charging terminal 66 of the terminal device 7 when the terminal device 7 is attached to the input device 220.

In other embodiments, a controller device may be the terminal device 7 and the input device 200 (or the input device 220) provided as a single unit. In this case, mechanisms for detachably connecting the terminal device 7 and the input device 200 with each other, such as the engagement holes 50*a*, 50*b*, 59*a* and 59*b* of the terminal device 7 and the tab portions of the input device 200, are not needed.

Figure 20:
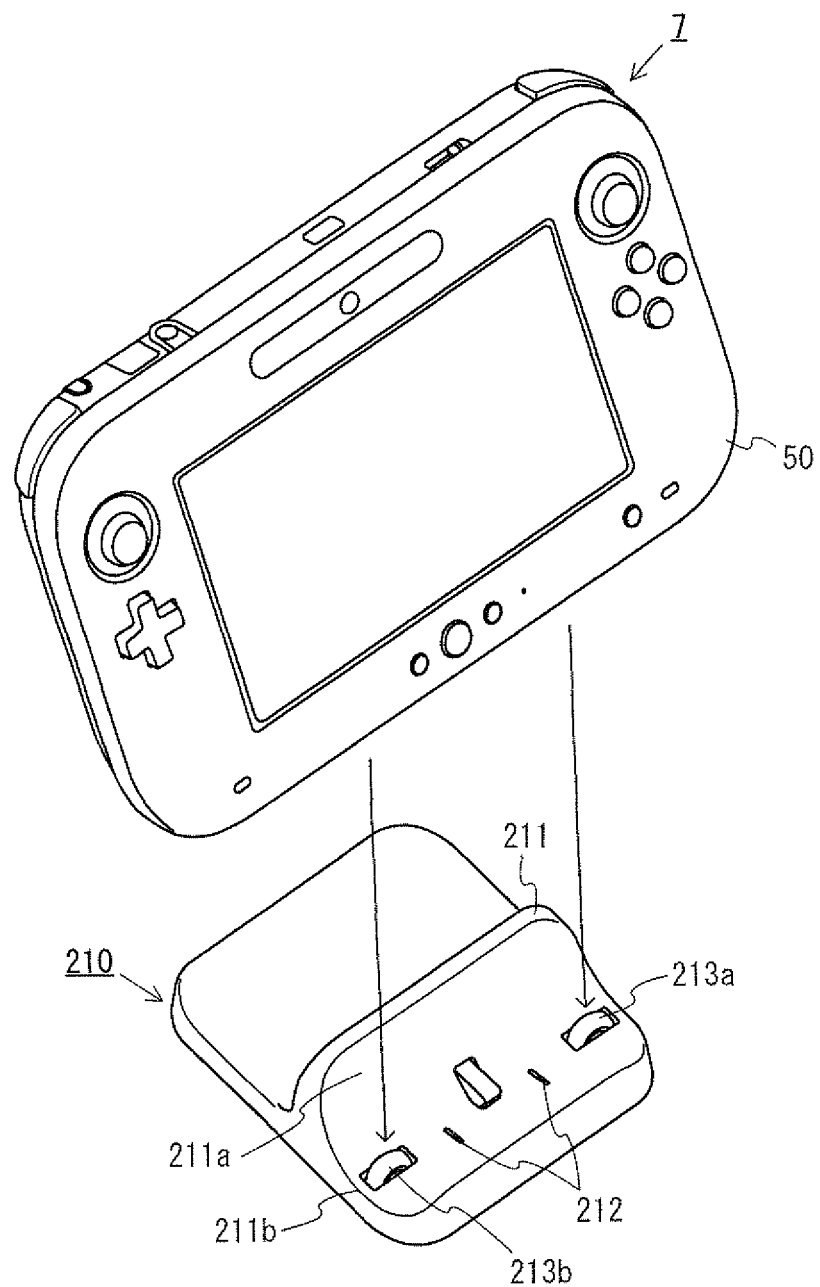
FIG. 20 is a diagram showing another example in which an additional device (a stand 210) is attached to the terminal device 7.

FIG. 20 is a diagram showing another example in which an additional device is connected to the terminal device 7. In FIG. 20, the terminal device 7 is connected (attached) to the stand 210 which is an example of an additional device. The stand 210 is a support device for holding (supporting) the terminal device 7 so that the terminal device 7 stands at a predetermined angle. The stand 210 includes a support member 211, a charging terminal 212, and guide members 213*a* and 213*b*.

In the present embodiment, the stand 210 also serves as a charger, and includes the charging terminal 212. The charging terminal 212 is a terminal that can be connected to the charging terminal 66 of the terminal device 7. While the charging terminals 66 and 212 are metal terminals in the present embodiment, they may be connectors shaped so that one can be connected to the other. When the terminal device 7 is connected to the stand 210, the charging terminal 212 of the stand 210 and the charging terminal 66 of the terminal device 7 are brought into contact with each other, thereby supplying power from the stand 210 to the terminal device 7 and charging the terminal device 7.

The support member 211 is for supporting the back surface of the terminal device 7 at a predetermined angle. The support member 211 supports a predetermined surface (herein the back surface) of the housing 50 when the terminal of the terminal device 7 (the charging terminal 66) and the terminal of the stand 210 (the charging terminal 212) are connected to each other. As shown in FIG. 20, the support member 211 includes a wall portion 211*a* and a groove portion 211*b*. The support member 211 supports the housing 50 on the wall portion 211a so that the back surface of the housing 50 is placed along a predetermined support surface (herein the surface formed by the wall portion 211a). The groove portion 211b is a portion into which a portion (lower portion) of the housing 50 is inserted when the terminal device 7 and the stand 210 are connected to each other. Therefore, the groove portion 211b is formed so as to generally conform to the shape of that portion of the housing 50. The groove portion 211b extends in a direction parallel to the support surface.

The guide members 213a and 213b are members which can be inserted into the second engagement holes 50a and 50b of the terminal device 7 for positioning the terminal device 7 with respect to the stand 210. The guide members 213a and 213b are provided at positions corresponding to the engagement holes 50a and 50b of the terminal device 7. That is, the guide members 213a and 213b are provided at positions such that they are inserted into the engagement holes 50a and 50b when the terminal device 7 and the stand 210 are properly connected to each other. The terminal device 7 and the stand 210 being properly connected to each other means that the charging terminal 212 of the stand 210 and the charging terminal 66 of the terminal device 7 are connected to each other. The guide members 213a and 213b are provided so that portions thereof project from the bottom surface of the groove portion 211b. That is, the guide members 213a and 213b are provided so that portions thereof project upwardly from the surface of the support member 211. When the terminal device 7 is connected to the stand 210, portions of the guide members 213a and 213b are inserted respectively into the engagement holes 50a and 50b.

In the present embodiment, the guide members 213a and 213b are wheel members (roller portions) which can rotate. The guide members 213a and 213b can rotate in a predetermined direction. Herein, the predetermined direction is a direction (which is a horizontal direction) parallel to the support surface, and in other words is the left/right direction of the terminal device 7 when the terminal device 7 is connected to the stand 210. The guide member may be any member as long as it is a rotating member which can rotate at least in a predetermined direction. For example, in other embodiments, the guide member may be a sphere which is rotatably supported by a concave portion of the sphere. Although the number of guide members is two in the present embodiment, a number of guide members that corresponds to the number of engagement holes provided on the bottom surface of the terminal device 7 may be provided, or the stand 210 may include only one guide member or three or more guide members.

When the terminal device 7 is connected to the stand 210, the terminal device 7 is placed on the stand 210 at a predetermined angle with the back surface of the terminal device 7 lying against the support member 211. That is, the terminal device 7 is placed on the stand 210 at predetermined angle with a lower portion of the housing 50 inserted into the groove portion 211b and with the wall portion 211a supporting the back surface of the housing 50. Therefore, in the present embodiment, the terminal device 7 is properly positioned by the support member 211 with respect to the direction perpendicular to the predetermined direction.

Herein, if the terminal device 7 and the stand 210 are not in a proper positional relationship with each other when the terminal device 7 is connected to the stand 210, the position of the terminal device 7 is corrected by the guide members 213a and 213b for proper connection. Specifically, if the engagement holes 50a and 50b are misaligned with the guide members 213a and 213b in the predetermined direction, the guide members 213a and 213b come into contact with peripheral portions of the engagement holes 50a and 50b of the housing 50. Then, the guide members 213a and 213b rotate, thus sliding the terminal device 7 in the predetermined direction. In the present embodiment, since the two guide members 213a and 213b are provided side by side with each other in the predetermined direction, the bottom surface of the terminal device 7 can be in contact only with the guide members 213a and 213b, thus allowing for smoother movement of the terminal device 7. The terminal device 7 can be moved more smoothly if peripheral portions of the engagement holes 50a and 50b are sloped (concavely sloped). As a result of the sliding of the terminal device 7 described above, portions of the guide members 213a and 213b are inserted into the engagement holes 50a and 50b. Thus, the charging terminal 212 of the stand 210 and the charging terminal 66 of the terminal device 7 come into contact with each other, thereby ensuring the charging.

As described above, the user can easily connect the terminal device 7 to the stand 210 even if the terminal device 7 is not accurately placed in position. According to the present embodiment, the positioning of the terminal device 7 with respect to the stand 210 can be done by a simple configuration including the engagement holes of the terminal device 7 and the guide members of the stand 210, thereby realizing the stand 210 with a small and simple configuration. Although the terminal device 7 is a relatively large portable device in the present embodiment, the stand 210 itself can be realized with such a small configuration as shown in FIG. 20 even with such a large portable device. Since terminal devices of various shapes and sizes can be connected to the stand 210, it is possible to provide a versatile support device.

In the present embodiment, the engagement holes 50a and 50b are used as holes for engaging with tab portions of an additional device, and also as holes into which guide members are inserted. Thus, it is possible to reduce the number of holes provided in the housing 50 of the terminal device 7, thereby simplifying the shape of the housing 50.

While the holes into which the guide members of the stand 210 are inserted are provided on the lower side surface of the housing 50 (the engagement holes 50a and 50b) in the above embodiment, holes may be provided at any positions. For example, holes may be provided on other side surfaces of the housing 50, or holes may be provided on the front surface or the back surface of the housing 50. The guide portions need to be provided at positions in accordance with the positions of the holes. Therefore, if holes are provided on the front surface or the back surface of the housing 50, the guide portions of the stand 210 may be provided at positions on the wall portion 211a, for example. Holes may be provided on a plurality of surfaces of the housing 50, and then the terminal device 7 can be placed on the stand 210 in any of various directions.

[5. Game Process]

Figure 21:
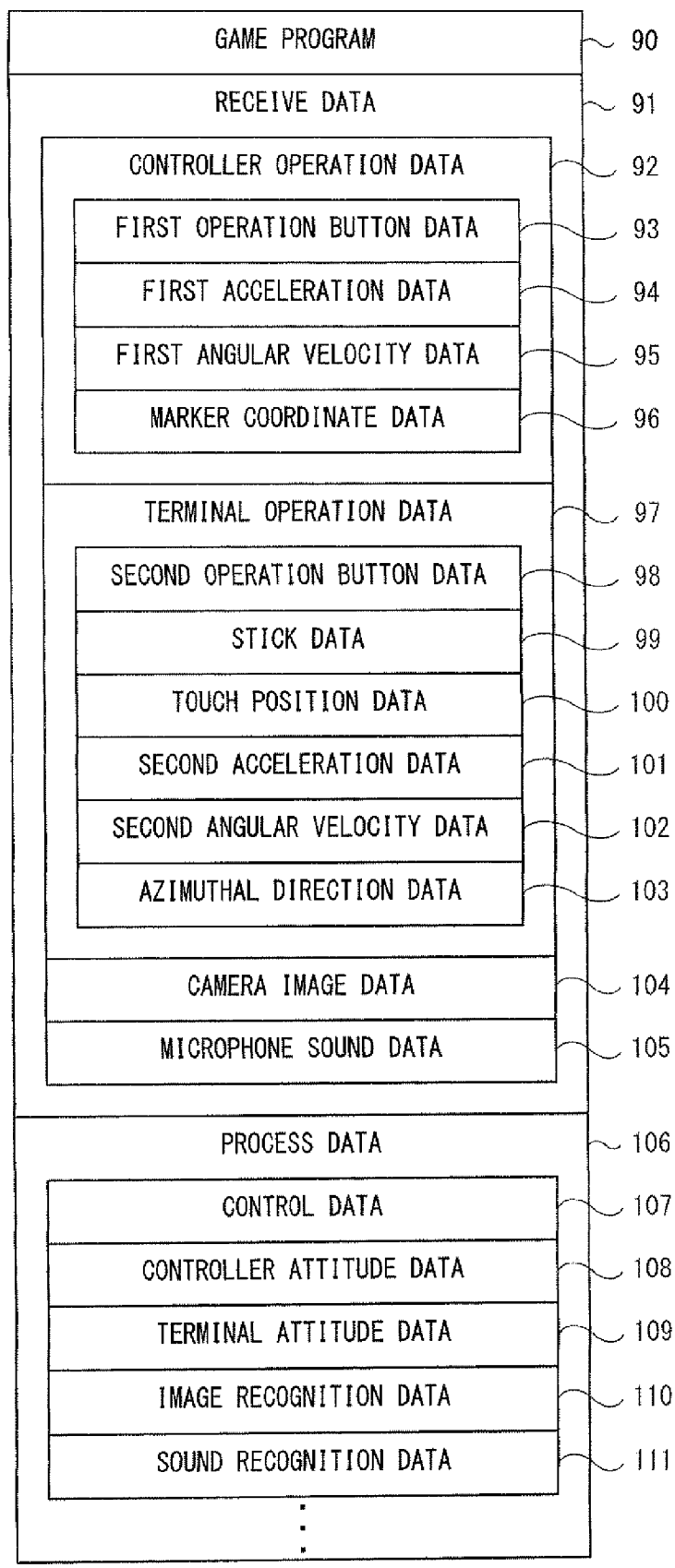
FIG. 21 is a diagram showing various data used in game processes.

Next, the details of the game processes performed in the present game system will be described. First, various data used in the game processes will be described. FIG. 21 is a table showing various data used in the game processes. FIG. 21 is a table showing primary data to be stored in the main memory (the external main memory 12 or the internal main memory 11e) of the game device 3. As shown in FIG. 21, the main memory of the game device 3 stores a game program 90, receive data 91, and process data 106. In addition to those shown in FIG. 21, the main memory also stores other data necessary for the game, such as image data of various objects appearing in the game, and sound data used in the game, etc.

At an appropriate point in time after the power of the game device 3 is turned ON, a part or whole of the game program 90 is loaded from the optical disc 4 and stored in the main memory. The game program 90 may be obtained from the flash memory 17 or an external device of the game device 3 (e.g., via the Internet), instead of from the optical disc 4. A part of the game program 90 (e.g., a program for calculating the attitude of the controller 5 and/or the terminal device 7) may be pre-stored in the game device 3.

The receive data 91 are various data received from the controller 5 and the terminal device 7. The receive data 91 includes controller operation data 92, terminal operation data 97, camera image data 104, and microphone sound data 105. If a plurality of controllers 5 are connected, there is a plurality of controller operation data 92. If a plurality of terminal devices 7 are connected, there area plurality of terminal operation data 97, a plurality of camera image data 104, and a plurality of microphone sound data 105.

The controller operation data 92 is data representing operations performed by the user (player) on the controller 5. The controller operation data 92 is transmitted from the controller to the game device 3 and stored in the main memory. The controller operation data 92 includes first operation button data 93, first acceleration data 94, first angular velocity data 95, and marker coordinate data 96. The main memory may store a predetermined number of latest (most recently obtained) sets of controller operation data.

The first operation button data 93 is data representing the input status of the operation buttons 32*a* to 32*i* provided on the controller 5. Specifically, the first operation button data 93 represents whether each of the operation buttons 32*a* to 32*i* is pressed.

The first acceleration data 94 is data representing the acceleration (acceleration vector) detected by the acceleration sensor 37 of the controller 5. While the first acceleration data 94 herein represents three-dimensional acceleration of which each component is the acceleration for one of the three axes of X, Y and Z shown in FIG. 3, it may represent acceleration for any one or more directions in other embodiments.

The first angular velocity data 95 is data representing the angular velocity detected by the gyrosensor 48 in the controller 5. While the first angular velocity data 95 herein represents angular velocity about each of the three axes of X, Y and Z shown in FIG. 3, it may represent angular velocity about any one or more axes in other embodiments.

The marker coordinate data 96 is data representing coordinates calculated by the image processing circuit 41 of the image capturing/processing section 35, i.e., the marker coordinates described above. The marker coordinates are expressed in a two-dimensional coordinate system for representing a position on a plane corresponding to the captured image, and the marker coordinate data 96 represents coordinate values in the two-dimensional coordinate system.

The controller operation data 92 may be data representing operations by the user operating the controller 5, and may be data including only some of the data 93 to 96. In a case in which the controller 5 includes other input mechanisms (e.g., a touch panel or an analog stick, etc.), the controller operation data 92 may include data representing operations performed on the other input mechanisms. In a case in which the movement of the controller 5 itself is used as a game operation as in the present embodiment, the controller operation data 92 includes data whose value changes in accordance with the movement of the controller 5 itself, as is the first acceleration data 94, the first angular velocity data 95 or the marker coordinate data 96.

The terminal operation data 97 is data representing operations performed by the user on the terminal device 7. The terminal operation data 97 is transmitted from the terminal device 7 and obtained by the game device 3 to be stored in the main memory. The terminal operation data 97 includes second operation button data 98, stick data 99, touch position data 100, second acceleration data 101, second angular velocity data 102, and azimuthal direction data. The main memory may store a predetermined number of latest (most recently obtained) sets of terminal operation data.

The second operation button data 98 is data representing the input status of the operation buttons 54A to 54L provided on the terminal device 7. Specifically, the second operation button data 98 represents whether each of the operation buttons 54A to 54L is pressed.

The stick data 99 is data representing the direction and the amount of slide (or tilt) of the stick portion of the analog stick 53 (the analog sticks 53A and 53B). The direction and the amount may be represented as two-dimensional coordinates or a two-dimensional vector, for example.

The touch position data 100 is data representing the position (touch position) on the input surface of the touch panel 52 at which an input is made. In the present embodiment, the touch position data 100 represents coordinate values in a two-dimensional coordinate system for representing a position on the input surface. In a case in which the touch panel 52 is of a multi-touch type, the touch position data 100 may represent a plurality of touch positions.

The second acceleration data 101 is data representing the acceleration (acceleration vector) detected by the acceleration sensor 73. While the second acceleration data 101 represents three-dimensional acceleration of which each component is the acceleration for one of the three axes of x, y and z shown in FIG. 8 in the present embodiment, it may represent acceleration for any one or more directions in other embodiments.

The second angular velocity data 102 is data representing the angular velocity detected by the gyrosensor 74. While the second angular velocity data 102 represents angular velocity about each of the three axes of x, y and z shown in FIG. 8 in the present embodiment, it may represent angular velocity about any one or more axes in other embodiments.

Azimuthal direction data 103 is data representing the azimuthal direction detected by the magnetic sensor 72. In the present embodiment, the azimuthal direction data 103 represents the direction of a predetermined azimuthal direction (e.g., north) with respect to the terminal device 7. However, in a place where there is a magnetic field other than the geomagnetic field, the azimuthal direction data 103 does not strictly represent the absolute azimuthal direction (e.g., north). Nevertheless, it represents a relative direction of the terminal device 7 with respect to the direction of the (local) magnetic field in that place, and it is therefore possible to calculate the change in the attitude of the terminal device 7 even in such cases.

The terminal operation data 97 may be data representing operations performed by the user on the terminal device 7, and may be data including only one of the data 98 to 103 described above. In a case in which the terminal device 7 includes other input mechanisms (e.g., a touch pad, image-capturing section of the controller 5, etc.), the terminal operation data 97 may include data representing operations performed on the other input mechanisms. In a case in which the movement of the terminal device 7 itself is used as a game operation as in the present embodiment, the terminal operation data 97 includes data whose value changes in accordance with the movement of the terminal device 7 itself, as is the second acceleration data 101, the second angular velocity data 102 or the azimuthal direction data 103.

The camera image data 104 is data representing images (camera images) captured by the camera 56 of the terminal device 7. The camera image data 104 is image data obtained by the codec LSI 27 expanding the compressed image data from the terminal device 7, and the data is stored in the main memory by the input/output processor 11a. The main memory may store a predetermined number of latest (most recently obtained) sets of camera image data.

The microphone sound data 105 is data representing sounds (microphone sounds) detected by the microphone 79 of the terminal device 7. The microphone sound data 105 is sound data obtained by the codec LSI 27 expanding the compressed sound data transmitted from the terminal device 7, and the data is stored in the main memory by the input/output processor 11a.

The process data 106 is data used in the game processes (FIG. 22) to be described later. The process data 106 includes control data 107, controller attitude data 108, terminal attitude data 109, image recognition data 110, and sound recognition data 111. In addition to those shown in FIG. 21, the process data 106 also includes various data used in the game processes, such as data representing various parameters set for various objects appearing in the game.

The control data 107 is data representing control instructions for the components of the terminal device 7. For example, the control data 107 represents an instruction for controlling the lighting of the marker section 55, an instruction for controlling the image-capturing operation of the camera 56, etc. The control data 107 is transmitted to the terminal device 7 at an appropriate point in time.

The controller attitude data 108 is data representing the attitude of the controller 5. In the present embodiment, the controller attitude data 108 is calculated based on the first acceleration data 94, the first angular velocity data 95 and the marker coordinate data 96 included in the controller operation data 92. The method for calculating the controller attitude data 108 will be described below in step S23.

The terminal attitude data 109 is data representing the attitude of the terminal device 7. In the present embodiment, the terminal attitude data 109 is calculated based on the second acceleration data 101, the second angular velocity data 102 and the azimuthal direction data 103 included in the terminal operation data 97. The method for calculating the terminal attitude data 109 will be described below in step S24.

The image recognition data 110 is data representing the results of a predetermined image recognition process for the camera image. The image recognition process may be any process as long as it detects any feature of the camera image to output the results of the detection, and may be, for example, a process of extracting a predetermined object (e.g., the face of the user, a marker, etc.) from the camera image and calculating information regarding the extracted object.

The sound recognition data 111 is data representing the results of a predetermined sound recognition process for the microphone sounds. The sound recognition process may be any process as long as it detects any feature from the microphone sounds to output the results of the detection, and may be, for example, a process of detecting words of the user or a process of simply outputting the sound volume.

Figure 22:
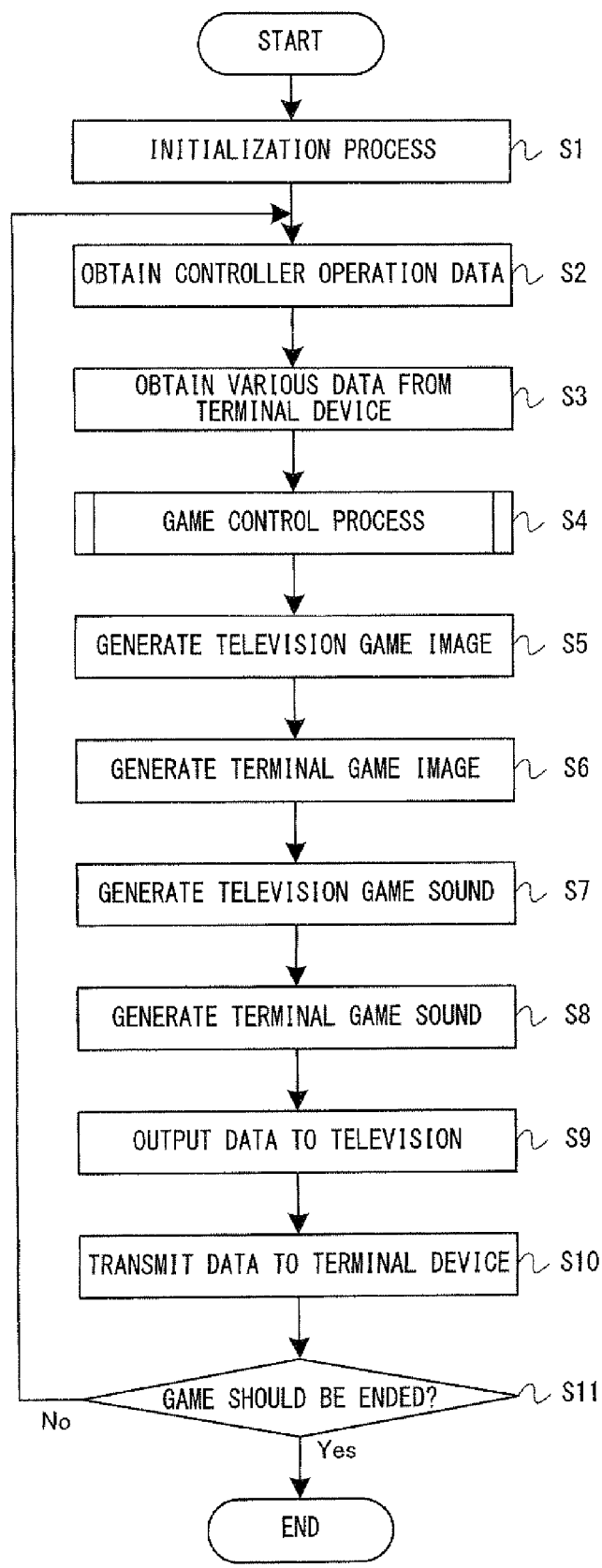
FIG. 22 is a main flow chart showing a flow of game processes performed by the game device 3.

Next, with reference to FIG. 22, the details of the game process performed by the game device 3 will be described. FIG. 22 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program stored in the optical disc 4 immediately after power-up, or it may be configured so that a built-in program is executed after power-up for displaying a predetermined menu screen first, and then the game program stored in the optical disc 4 is executed when the start of the game is instructed by the user by a menu selection, for example. The flow chart of FIG. 22 is a flow chart showing the process to be performed after processes described above are completed.

The process of the steps of the flow chart shown in FIG. 22 is merely illustrative, and the order of steps to be performed may be switched around as long as similar results are obtained. The values of the variables, and the threshold values used in determination steps are also merely illustrative, and other values may be used as necessary. While the present embodiment is described while assuming that the processes of the steps of the flow chart are performed by the CPU 10, processes of some of the steps may be performed by a processor or a dedicated circuit other than the CPU 10.

First, in step S1, the CPU 10 performs an initialization process. The initialization process is, for example, a process of constructing a virtual game space, placing objects appearing in the game space at their initial positions, and setting initial values of various parameters used in the game processes.

In the present embodiment, in the initialization process, the CPU 10 controls the lighting of the marker device 6 and the marker section 55 based on the type of the game program. Here, the game system 1 has two image-capturing objects for the image-capturing section of the controller 5 (the image capturing/processing section 35), i.e., the marker device 6 and the marker section 55 of the terminal device 7. Either or both of the marker device 6 and the marker section 55 may be used, depending on the content of the game (the type of the game program). The game program 90 includes data indicating whether each of the marker device 6 and the marker section 55 should be lit. The CPU 10 reads out this data to determine whether or not to light them. When lighting the marker device 6 and/or the marker section 55, the following process is performed.

That is, when lighting the marker device 6, the CPU 10 transmits, to the marker device 6, a control signal for lighting the infrared LEDs of the marker device 6. The transmission of the control signal may be simply supplying the power. In response to this, the infrared LEDs of the marker device 6 are lit. On the other hand, when lighting the marker section 55, the CPU 10 generates control data for lighting the marker section 55 and stores the data in the main memory. The generated control data is transmitted to the terminal device 7 in step S10 to be described later. The control data received by the wireless module 70 of the terminal device 7 is sent to the UI controller 75 via the codec LSI 76, and the UI controller 75 gives a lighting instruction to the marker section 55. This lights the infrared LEDs of the marker section 55. While a case in which the marker device 6 and the marker section 55 are lit has been described above, the marker device 6 and the marker section 55 can be turned off through a similar process to the process of lighting them.

The process of step S2 is performed, following step S1 described above. Thereafter, the process loop including a series of processes of steps S2 to S11 is repeatedly performed at a rate of once per a predetermined amount of time (e.g., one frame period).

In step S2, the CPU 10 obtains controller operation data transmitted from the controller 5. Since the controller 5 repeatedly transmits the controller operation data to the game device 3, the controller operation data is successively received by the controller communication module 19 in the game device 3, and the received controller operation data is successively stored in the main memory by the input/output processor 11a. The transmission/reception interval is preferably shorter than the game process time, and is, for example, 1/200 sec. In step S2, the CPU 10 reads out the latest (most recently received) controller operation data 92 from the main memory. The process of step S3 is performed, following step S2.

In step S3, the CPU 10 obtains various data transmitted from the terminal device 7. Since the terminal device 7 repeatedly transmits the terminal operation data, the camera image data and the microphone sound data to the game device 3, the game device 3 successively receives these data. In the game device 3, the terminal communication module 28 successively receives these data, and the camera image data and the microphone sound data are successively expanded by the codec LSI 27. Then, the input/output processor 11a successively stores the terminal operation data, the camera image data and the microphone sound data in the main memory. In step S3, the CPU 10 reads out the latest (most recently received) terminal operation data 97 from the main memory. The process of step S4 is performed, following step S3.

In step S4, the CPU 10 performs the game control process. The game control process is a process for allowing the game to progress by, for example, performing processes such as controlling the action of an object in the game space in accordance with the game operation by the user. In the present embodiment, the user can play various games by using the controller 5 and/or the terminal device 7. Now, with reference to FIG. 23, the game control process will be described.

Figure 23:
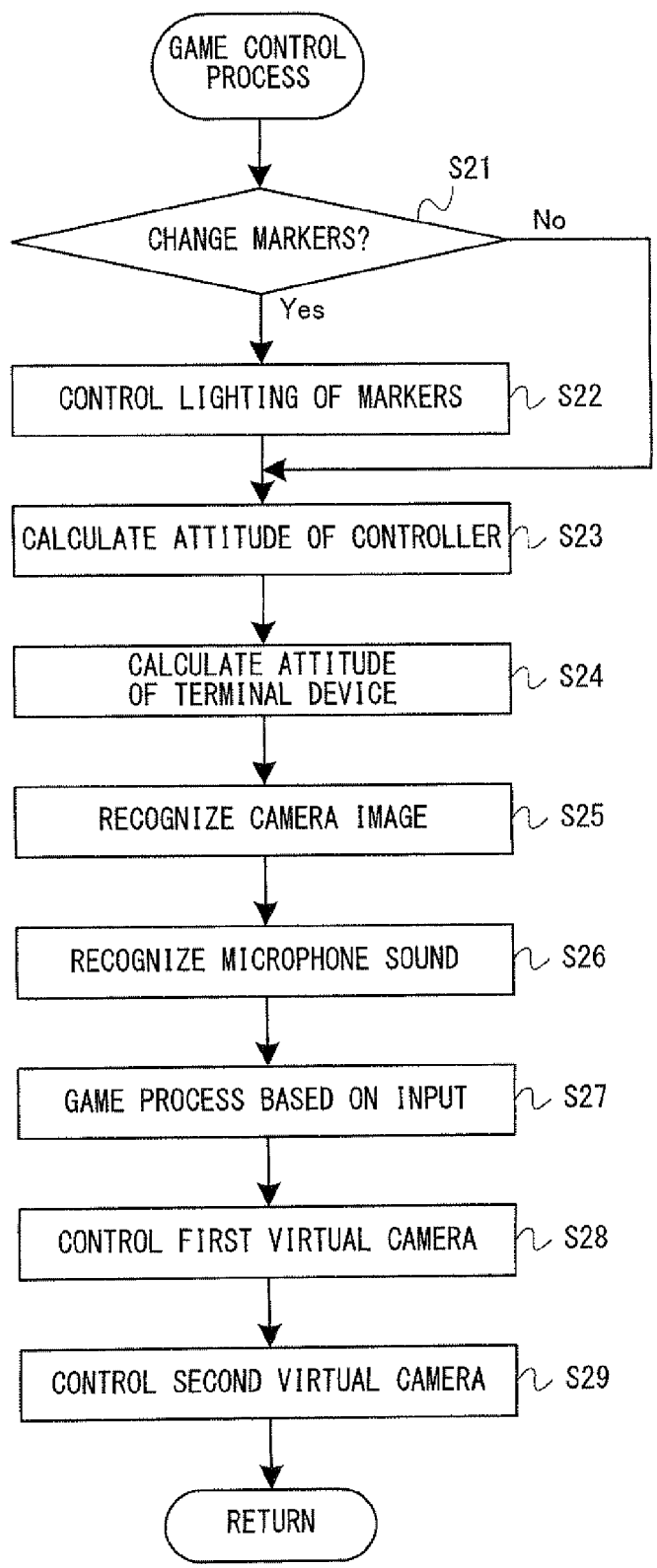
FIG. 23 is a flow chart showing a detailed flow of game control processes.

FIG. 23 is a flow chart showing the detailed flow of a game control process. While the series of processes shown in FIG. 23 are various processes that can be performed in a case in which the controller 5 and the terminal device 7 are used as controller devices, it is not necessary to perform all of the processes, and only some of the processes may be performed depending on the type and content of the game.

In the game control process, first, in step S21, the CPU 10 determines whether or not to change the marker to be used. In the present embodiment, the process of controlling the lighting of the marker device 6 and the marker section 55 is performed at the start of the game process (step S1), as described above. Here, depending on the game, a marker or markers to be used (lit) among the marker device 6 and the marker section 55 may be changed in the middle of the game. It may be possible to use both the marker device 6 and the marker section 55 depending on the game, but if they are both lit, one of the markers may be erroneously detected for the other marker. Therefore, there are cases in which it is preferred to switch between the markers during the game so that only one of them is lit. In view of such cases, the process of step S21 is a process of determining whether the marker to be lit is changed in the middle of the game.

The determination of step S21 can be made by the following method, for example. That is, the CPU 10 can make the determination based on whether the game status (the stage of the game, the object to be controlled, etc.) has changed. When the game status changes, the control method may be switched between a control method in which the controller 5 is controlled facing the marker device 6, and a control method in which the controller 5 is controlled facing the marker section 55. The CPU 10 can make the determination based, for example, on the attitude of the controller 5. That is, the determination can be made based on whether the controller 5 is facing the marker device 6 or facing the marker section 55. The attitude of the controller 5 can be calculated based on the detection results of the acceleration sensor 37 and the gyrosensor 48, for example (see step S23 to be described later). The CPU 10 can make the determination based on whether there has been an instruction of change from the user.

If the determination result of step S21 is affirmative, the process of step S22 is performed. On the other hand, if the determination result of step S21 is negative, the process of step S22 is skipped and the process of step S23 is performed.

In step S22, the CPU 10 controls the lighting of the marker device 6 and the marker section 55. That is, it changes the lighting status of the marker device 6 and/or the marker section 55. The specific process of lighting or turning off the marker device 6 and/or the marker section 55 can be performed in a similar manner to that of step S1. The process of step S23 is performed, following step S22.

As described above, according to the present embodiment, the light emission (lighting) of the marker device 6 and the marker section 55 can be controlled depending on the type of the game program through the process of step S1, and the light emission (lighting) of the marker device 6 and the marker section 55 can be controlled in accordance with the game status through the process of steps S21 and S22.

In step S23, the CPU 10 calculates the attitude of the controller 5. In the present embodiment, the attitude of the controller 5 is calculated based on the first acceleration data 94, the first angular velocity data 95 and the marker coordinate data 96. The method for calculating the attitude of the controller 5 will now be described.

First, the CPU 10 calculates the attitude of the controller 5 based on the first angular velocity data 95 stored in the main memory. While the method for calculating the attitude of the controller 5 from the angular velocity may be any method, the attitude is calculated using the previous attitude (the attitude calculated in a previous iteration) and the current angular velocity (the angular velocity obtained in step S2 in a current iteration of the process loop). Specifically, the CPU 10 calculates the attitude by rotating the previous attitude by a unit time's worth of the current angular velocity. The previous attitude is represented by the controller attitude data 108 stored in the main memory, and the current angular velocity is represented by the first angular velocity data 95 stored in the main memory. Therefore, the CPU 10 reads out the controller attitude data 108 and the first angular velocity data 95 from the main memory to calculate the attitude of the controller 5. The data representing "the attitude based on the angular velocity" calculated as described above is stored in the main memory.

Where the attitude is calculated from the angular velocity, it is preferred that an initial attitude is set. That is, where the attitude of the controller 5 is calculated from the angular velocity, the CPU 10 initially calculates the initial attitude of the controller 5. The initial attitude of the controller 5 may be calculated based on the acceleration data, or the player may be prompted to perform a predetermined operation with the controller 5 in a particular attitude so that the particular attitude at the point in time when the predetermined operation is performed is used as the initial attitude. While it is preferred to calculate the initial attitude in a case in which the attitude of the controller 5 is calculated as an absolute attitude with respect to a predetermined direction in the space, the initial attitude may not be calculated in a case in which the attitude of the controller 5 is calculated as a relative attitude with respect to the attitude of the controller 5 at the start of the game, for example.

Next, the CPU 10 corrects the attitude of the controller 5 calculated based on the angular velocity by using the first acceleration data 94. Specifically, the CPU 10 first reads out the first acceleration data 94 from the main memory and calculates the attitude of the controller 5 based on the first acceleration data 94. Here, in a state in which the controller 5 is substantially stationary, the acceleration acting upon the controller 5 means the gravitational acceleration. Therefore, in this state, the direction of the gravitational acceleration (the direction of gravity) can be calculated by using the first acceleration data 94 outputted from the acceleration sensor 37, and it is therefore possible to calculate the direction (attitude) of the controller with respect to the direction of gravity based on the first acceleration data 94. The data representing "the attitude based on the acceleration" calculated as described above is stored in the main memory.

After calculating the attitude based on the acceleration, the CPU 10 then corrects the attitude based on the angular velocity by using the attitude based on the acceleration. Specifically, the CPU 10 reads out data representing the attitude based on the angular velocity and data representing the attitude based on the acceleration from the main memory, and makes a correction such that the attitude based on the angular velocity data is brought closer to the attitude based on the acceleration data at a predetermined rate. The predetermined rate may be a predetermined fixed value, and may be set in accordance with the acceleration represented by the first acceleration data 94, etc. With the attitude based on the acceleration, the attitude cannot be calculated for the rotation direction about the direction of gravity, and therefore the CPU 10 may not make a correction for the rotation direction. In the present embodiment, data representing the corrected attitude obtained as described above is stored in the main memory.

After the attitude based on the angular velocity is corrected as described above, the CPU 10 further corrects the corrected attitude using the marker coordinate data 96. First, the CPU 10 calculates the attitude of the controller 5 based on the marker coordinate data 96 (the attitude based on marker coordinates). Since the marker coordinate data 96 represents positions of the markers 6R and 6L within the captured image, the attitude of the controller 5 can be calculated for the roll direction (the rotation direction about the Z axis) can be calculated from these positions. That is, the attitude of the controller 5 for the roll direction can be calculated from the gradient of the straight line connecting between the position of the marker 6R and the position of the marker 6L within the captured image. In a case in which the position of the controller 5 with respect to the marker device 6 can be identified (e.g., a case in which it can be assumed that the controller 5 is located in front of the marker device 6), the attitude of the controller 5 for the pitch direction and that for the yaw direction can be calculated from the position of the marker device 6 within the captured image. For example, when the positions of the markers 6R and 6L move to the left within the captured image, it can be determined that the controller 5 has changed its orientation (attitude) to the right. Thus, the attitude of the controller 5 for the pitch direction and that for the yaw direction can be calculated from the positions of the marker 6R and the marker 6L. As described above, it is possible to calculate the attitude of the controller 5 based on the marker coordinate data 96.

After the attitude based on marker coordinates is calculated, the CPU 10 next corrects the corrected attitude (the attitude which has been corrected by the attitude based on the acceleration) by the attitude based on marker coordinates. That is, the CPU 10 makes a correction such that the corrected attitude is brought closer to the attitude based on marker coordinates at a predetermined rate. The predetermined rate may be a predetermined fixed value. The correction by the attitude based on marker coordinates may be made only for any one or two of the roll direction, the pitch direction and the yaw direction. For example, where the marker coordinate data 96 is used, since it is possible to calculate the attitude with high precision for the roll direction, the CPU 10 may make the correction using the attitude based on the marker coordinate data 96 only for the roll direction. If the image-capturing element 40 of the controller 5 does not capture the image of the marker device 6 or the marker section 55, it is not possible to calculate the attitude based on the marker coordinate data 96, and therefore the correction process using the marker coordinate data 96 may not be performed in such a case.

In the above description, the CPU 10 corrects the first attitude of the controller 5 calculated based on the first angular velocity data 95 using the first acceleration data 94 and the marker coordinate data 96. Here, with the method using the angular velocity, among the methods for calculating the attitude of the controller 5, it is possible to calculate the attitude no matter how the controller 5 is moving. On the other hand, with the method using the angular velocity, since the attitude is calculated by cumulatively adding the successively-detected angular velocities, accumulation of errors, or the like, may lead to poor precision, and a so-called "temperature drift" problem may deteriorate the precision of the gyrosensor. With the method using the acceleration, errors do not accumulate, but it is not possible to calculate the attitude with high precision in a state in which the controller 5 is being moved violently (since the direction of gravity cannot be detected accurately). With the method using marker coordinates, the attitude can be calculated with high precision (particularly for the roll direction), but it is not possible to calculate the attitude in a state in which it is not possible to capture an image of the marker section 55. As opposed to this, the attitude of the controller 5 can be calculated more accurately in the present embodiment since three different methods with different characteristics are used as described above. In other embodiments, the attitude may be calculated by using any one or two of the three methods described above. Where the lighting of the markers is controlled in the process of step S1 or S22, it is preferred that the CPU 10 calculates the attitude of the controller 5 using at least marker coordinates.

The process of step S24 is performed, following step S23. In step S24, the CPU 10 calculates the attitude of the terminal device 7. That is, since the terminal operation data 97 obtained from the terminal device 7 includes the second acceleration data 101, the second angular velocity data 102, and the azimuthal direction data 103, the CPU 10 calculates the attitude of the terminal device 7 based on these data. Here, the CPU 10 can know the amount of rotation per unit time (the amount of change of the attitude) of the terminal device 7 from the second angular velocity data 102. In a state in which the terminal device 7 is substantially stationary, the acceleration acting upon the terminal device 7 means the gravitational acceleration, and it is therefore possible to know, from the second acceleration data 101, the direction of gravity acting upon the terminal device 7 (i.e., the attitude of the terminal device 7 with respect to the direction of gravity). It is possible to know, from the azimuthal direction data 103, a predetermined azimuthal direction with respect to the terminal device 7 (i.e., the attitude of the terminal device 7 with respect to a predetermined azimuthal direction). Even in a case in which there is a magnetic field other than the geomagnetic field, it is possible to know the amount of rotation of the terminal device 7. Therefore, the CPU 10 can calculate the attitude of the terminal device 7 based on the second acceleration data 101, the second angular velocity data 102 and the azimuthal direction data 103. While the attitude of the terminal device 7 is calculated based on the three data in the present embodiment, the attitude may be calculated based on one or two of the three data in other embodiments.

While the specific method for calculating the attitude of the terminal device 7 may be any method, it is for example a method in which the attitude calculated based on the angular velocity represented by the second angular velocity data 102 is corrected using the second acceleration data 101 and the azimuthal direction data 103. Specifically, the CPU 10 first calculates the attitude of the terminal device 7 based on the second angular velocity data 102. The method for calculating the attitude based on angular velocity may be similar to the method of step S23. Next, the CPU 10 corrects the attitude calculated based on the angular velocity by the attitude calculated based on the second acceleration data 101 and/or the attitude calculated based on the azimuthal direction data 103 at an appropriate point in time (e.g., when the terminal device 7 is close to being stationary). The method for correcting the attitude based on the angular velocity by the attitude based on the acceleration may be similar to the method for calculating the attitude of the controller 5 described above. In a case in which the attitude based on the angular velocity is corrected by the attitude based on the azimuthal direction data, the CPU 10 may bring the attitude based on the angular velocity closer to the attitude based on the azimuthal direction data at a predetermined rate. As described above, the CPU 10 can accurately calculate the attitude of the terminal device 7.

Since the controller 5 includes the image capturing/processing section 35 which is an infrared detector, the game device 3 can obtain the marker coordinate data 96. Therefore, for the controller 5, the game device 3 can know, from the marker coordinate data 96, the absolute attitude in the real space (the attitude of the controller 5 in the coordinate system set in the real space). On the other hand, the terminal device 7 does not include an infrared detector such as the image capturing/processing section 35. Therefore, the game device 3 cannot know, only from the second acceleration data 101 and the second angular velocity data 102, the absolute attitude in the real space for the rotation direction about the direction of gravity. In view of this, the present embodiment employs a configuration in which the terminal device 7 includes the magnetic sensor 72, and the game device 3 obtains the azimuthal direction data 103. Then, for the rotation direction about the direction of gravity, the game device 3 can calculate the absolute attitude in real space from the azimuthal direction data 103, and it is possible to more accurately calculate the attitude of the terminal device 7.

As a specific process of step S24, the CPU 10 reads out the second acceleration data 101, the second angular velocity data 102, and the azimuthal direction data 103 from the main memory, and calculates the attitude of the terminal device 7 based on these data. Then, the calculated data representing the attitude of the terminal device 7 is stored in the main memory as the terminal attitude data 109. The process of step S25 is performed, following step S24.

In step S25, the CPU 10 performs a recognition process for a camera image. That is, the CPU 10 performs a predetermined recognition process on the camera image data 104. The recognition process may be any process as long as it detects any feature from the camera image to output the results of the detection. For example, where the face of the player is included in the camera image, it may be a process of recognizing the face. Specifically, it may be a process of detecting parts of the face (eyes, nose, mouth, etc.) or a process of detecting the expression of the face. The data representing the results of the recognition process is stored in the main memory as the image recognition data 110. The process of step S26 is performed, following step S25.

In step S26, the CPU 10 performs a recognition process for microphone sounds. That is, the CPU 10 performs a predetermined recognition process on the microphone sound data 105. The recognition process may be any process as long as it detects any feature from the microphone sound to output the results of the detection. For example, it may be a process of detecting an instruction of the player from the microphone sounds or a process of simply detecting the sound volume of the microphone sounds. The data representing the results of the recognition process is stored in the main memory as the sound recognition data 111. The process of step S27 is performed, following step S26.

In step S27, the CPU 10 performs the game process in accordance with a game input. Herein, the game input may be any data as long as it is data transmitted from the controller 5 or the terminal device 7, or data obtained from such data. Specifically, the game input may be any of various data included in the controller operation data 92 and the terminal operation data 97, as well as data obtained from such data (the controller attitude data 108, the terminal attitude data 109, the image recognition data 110, and the sound recognition data 111). The content of the game process in step S27 may be any content, and it may be, for example, a process of controlling the action of an object (character) appearing in the game, a process of controlling a virtual camera, or a process of moving a cursor displayed on the screen. It may also be a process of using the camera image (or a portion thereof) as a game image, a process of using the microphone sound as a game sound, etc. Examples of the game process will be described later. In step S27, data representing the results of the game control process are stored in the main memory, such as, for example, data of various parameters set for the character (object) appearing in the game, data of parameters regarding the virtual camera provided in the game space, and score data. After step S27, the CPU 10 ends the game control process of step S4.

Referring back to FIG. 22, in step S5, a television game image to be displayed on the television 2 is generated by the CPU 10 and the GPU 11b. That is, the CPU 10 and the GPU 11b read out data representing the results of the game control process of step S4 from the main memory and read out data necessary for generating a game image from the VRAM 11d to generate a game image. The game image may be any image as long as it represents the results of the game control process of step S4, and it may be generated by any method. For example, the game image generation method may be a method in which a virtual camera is provided in the virtual game space, and a three-dimensional CG image is generated by calculating the game space as seen from the virtual camera, or a method in which a two-dimensional image is generated (without using a virtual camera). The generated television game image is stored in the VRAM 11d. The process of step S6 is performed, following step S5.

In step S6, a terminal game image to be displayed on the terminal device 7 is generated by the CPU 10 and the GPU 11b. As with the television game image, the terminal game image may be any image as long as it represents the results of the game control process of step S4, and it may be generated by any method. The terminal game image may be generated by a method similar to that for the television game image or may be generated by a different method. The generated terminal game image is stored in the VRAM 11d. Depending on the content of the game, the television game image and the terminal game image may be the same, in which case it is not necessary to perform the process of generating a game image in step S6. The process of step S7 is performed, following step S6.

In step S7, a television game sound to be outputted to the speaker 2a of the television 2 is generated. That is, the CPU 10 has the DSP 11c generate a game sound in accordance with the results of the game control process of step S4. The generated game sound may be, for example, a sound effect of the game, the voice of a character appearing in the game, BGM, etc. The process of step S8 is performed, following step S7.

In step S8, a terminal game sound to be outputted to the speaker 77 of the terminal device 7 is generated. That is, the CPU 10 has the DSP 11c generate a game sound in accordance with the results of the game control process of step S4. The terminal game sound may be the same as, or different from, the television game sound. They may be partially different from each other, e.g. differing from each other with the sound effect but being the same with the BGM. In a case in which the television game sound and the terminal game sound are the same, the game sound generating process may not be performed in step S8. The process of step S9 is performed, following step S8.

In step S9, the CPU 10 outputs a game image and a game sound to the television 2. Specifically, the CPU 10 sends the data of the television game image stored in the VRAM 11d and the data of the television game sound generated by the DSP lic in step 37 to the AV-IC 15. In response to this, the AV-IC 15 outputs the image and sound data to the television 2 via the AV connector 16. Thus, the television game image is displayed on the television 2, and the television game sound is outputted from the speaker 2a. The process of step S10 is performed, following step S9.

In step S10, the CPU 10 transmits a game image and a game sound to the terminal device 7. Specifically, the image data which is a terminal game image stored in the VRAM 11d and the sound data generated by the DSP 11c in step S8 are sent by the CPU 10 to the codec LSI 27, and are subjected to a predetermined compression process by the codec LSI 27. Moreover, the image and sound data which have been subjected to the compression process are transmitted by the terminal communication module 28 to the terminal device 7 via the antenna 29. The terminal device 7 receives the image and sound data transmitted from the game device 3 by the wireless module 70, and the data are subjected to a predetermined expansion process by the codec LSI 76. The image data which has been subjected to the expansion process is outputted to the LCD 51, and the sound data which has been subjected to the expansion process is outputted to the sound IC 68. Thus, the terminal game image is displayed on the LCD 51, and the terminal game sound is outputted from the speaker 77. The process of step S11 is performed, following step S10.

In step S11, the CPU 10 determines whether the game should be ended. The determination of step S11 is made based on, for example, whether the game is over, the user has given an instruction to quit the game, etc. If the determination result of step S11 is negative, the process of step S2 is performed again. On the other hand, if the determination result of step S11 is affirmative, the CPU 10 ends the game process shown in FIG. 22. The series of processes through steps S2 to S11 is repeatedly performed until it is determined in step S11 that the game should be ended. The game end process may include, for example, processes for saving game data to a memory card and the like.

As described above, in the present embodiment, the terminal device 7 includes the touch panel 52, and an inertia sensor such as the acceleration sensor 73 and/or the gyrosensor 74, and the outputs of the touch panel 52 and the inertia sensor are transmitted as operation data to the game device 3, and used as game inputs (steps S3 and S4). Moreover, the terminal device 7 includes a display device (the LCD 51), and game images obtained by the game process is displayed on the LCD 51 (steps S6 and S10). Therefore, the user can perform an operation of directly touching on the game image using the touch panel 52, and an operation of moving the LCD 51 itself on which the game image is displayed (since the movement of the terminal device 7 is detected by the inertia sensor). With these operations, the user can play a game with such gameplay as if the user were directly operating the game image, and it is therefore possible to provide a game with novel gameplay such as the first and second game examples to be described later, for example.

Moreover, in the present embodiment, the terminal device 7 includes the analog stick 53 and the operation button 54 which can be operated while holding the terminal device 7, and the game device 3 can use, as game inputs, operations performed on the analog stick 53 and the operation button 54 (steps S3 and S4). Therefore, even where the game image is directly operated as described above, the user can perform a more detailed game operation through the button operation and the stick operation.

Moreover, in the present embodiment, the terminal device 7 includes the camera 56 and the microphone 79, and data of the camera image captured by the camera 56 and data of the microphone sounds detected by the microphone 79 are transmitted to the game device 3 (step S3). Therefore, with the game device 3, since the camera image and/or microphone sounds can be used as game inputs, the user can perform game operations through an operation of capturing an image with the camera 56 or an operation of inputting sounds to the microphone 79. Since these operations can be performed while holding the terminal device 7, the user can perform a greater variety of game operations by performing such operations when directly operating the game image as described above.

In the present embodiment, since a game image is displayed on the LCD 51 which is the terminal device 7 of a portable type (steps S6 and S10), the user can freely position or place the terminal device 7. Therefore, where the controller 5 is operated while being pointed toward the marker, the user can play a game while pointing the controller 5 toward an arbitrary direction by placing the terminal device 7 at an arbitrary position, thus improving the degree of freedom in the operation of the controller 5. Since the terminal device 7 can be placed at an arbitrary position, it is possible to provide a more realistic game by placing the terminal device 7 at a position suitable for the content of the game, as in the fifth game example to be described below, for example.

According to the present embodiment, since the game device 3 obtains operation data, etc., from the controller 5 and the terminal device 7 (steps S2 and S3), the user can use one or both of the controller 5 and the terminal device 7 to provide operation inputs. Therefore, in the game system 1, a game can be played with multiple users in which the devices are used by a plurality of users (e.g., one user using controller 5 and another user using terminal device 7), or a game can be played with a single user using the two devices.

According to the present embodiment, the game device 3 generates two types of game images (steps S5 and S6), and the game images are displayed on the television 2 and the terminal device 7 (steps S9 and S10). Thus, as the two types of game images are displayed on different devices, it is possible to provide game images that are easier for the user to view, and it is possible to improve the playability of the game. For example, where a game is played by two players, a game image from a viewpoint that is easier for one user to view may be displayed on the television 2 while a game image from a viewpoint that is easier for the other user to view is displayed on the terminal device 7, as in the third or fourth game example to be described below, in which case each player can play the game with a viewpoint that is easier for the player to view. Even if the game is played by one player, for example, if two types of game images are displayed from two different viewpoints, as in the first, second and fifth game examples to be described below, the player can more easily grasp the state of the game space, and it is therefore possible to improve the playability of the game.

[6. Game Examples]

Next, specific examples of games to be played on the game system 1 will be described. The game examples described below may not use some of the components of the devices in the game system 1 and may not perform some of the series of processes shown in FIGS. 22 and 23. That is, the game system 1 need not include all the components described above, and the game device 3 may not perform some of the series of processes shown in FIGS. 22 and 23.

The first game example is a game in which an object (a shuriken, or a throwing star) is thrown in the game space by operating the terminal device 7. The player can specify the direction in which a shuriken is thrown through an operation of changing the attitude of the terminal device 7 and an operation of drawing a line on the touch panel 52.

Figure 24:
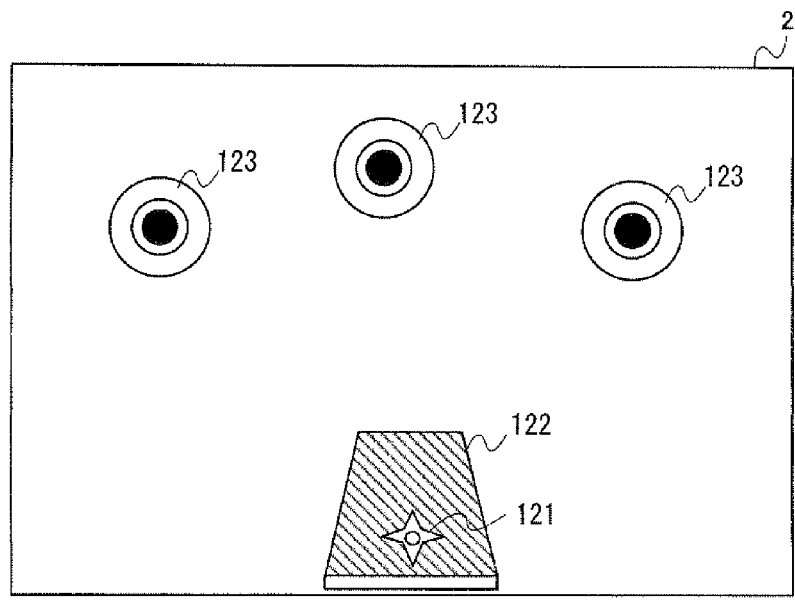
FIG. 24 is a diagram showing the screen of a television 2 and the terminal device 7 in a first game example.
Figure 24:
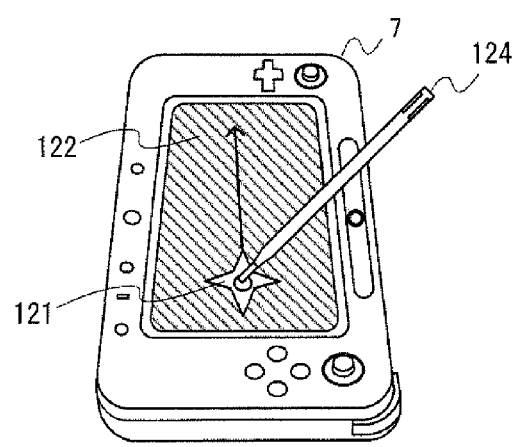

FIG. 24 is a diagram showing the screen of the television 2 and the terminal device 7 in the first game example. In FIG. 24, a game image representing the game space is displayed on the television 2 and the LCD 51 of the terminal device 7. A shuriken 121, a control surface 122 and a target 123 are displayed on the television 2. The control surface 122 (and the shuriken 121) are displayed on the LCD 51. In the first game example, the player plays the game by throwing the shuriken 121 at the target 123 through an operation using the terminal device 7.

When throwing the shuriken 121, the player first changes the attitude of the control surface 122 provided in the virtual game space to an intended attitude by changing or varying the attitude of the terminal device 7. That is, the CPU 10 calculates the attitude of the terminal device 7 based on the outputs of the inertia sensor (the acceleration sensor 73 and/or the gyrosensor 74) and/or the magnetic sensor 72 (step S24), and changes the attitude of the control surface 122 based on the calculated attitude (step S27). In the first game example, the attitude of the control surface 122 in the virtual game space is controlled so as to be an attitude in accordance with the attitude of the terminal device 7 in real space. That is, the player can change the attitude of the control surface 122 in the game space by changing the attitude of the terminal device 7 (the control surface 122 displayed on the terminal device 7). In the first game example, the position of the control surface 122 is fixed at a predetermined position in the game space.

Next, the player performs an operation of drawing or forming a line on the touch panel 52 using a stylus 124, finger or the like (see arrow shown in FIG. 24). Here, in the first game example, the control surface 122 is displayed on the LCD 51 of the terminal device 7 so that the input surface of the touch panel 52 and the control surface 122 correspond to each other. Therefore, based on the line drawn on the touch panel 52, it is possible to calculate the direction on the control surface 122 (the direction represented by the line). The shuriken 121 is thrown in a direction thus determined. As described above, the CPU 10 performs a process of calculating the direction on the control surface 122 from the touch position data 100 of the touch panel 52, and moving the shuriken 121 in the calculated direction (step S27). The CPU 10 may control the speed of the shuriken 121 in accordance with the length of the line or the speed at which the line is drawn, for example.

As described above, in the first game example, the game device 3 can move the control surface 122 in accordance with the movement (attitude) of the terminal device 7 by using the output of the inertia sensor as a game input, and identify the direction on the control surface 122 by using the output of the touch panel 52 as a game input. Thus, the player can move the game image displayed on the terminal device 7 (the image of the control surface 122) and perform a touch operation on the game image, and can therefore play a game with such novel gameplay as if the player were directly operating the game image.

In the first game example, it is possible to easily specify a direction in a three-dimensional space by using sensor outputs of the inertia sensor and the touch panel 52 as a game input. That is, the player can easily specify a direction with such an intuitive operation as if the player were actually inputting a direction in the space, by actually adjusting the attitude of the terminal device 7 with one hand while inputting a direction with a line on the touch panel 52 with the other hand. Moreover, since the player can perform the operation on the attitude of the terminal device 7 and the input operation on the touch panel 52 simultaneously in parallel to each other, it is possible to quickly perform the operation of specifying a direction in a three-dimensional space.

In the first game example, the control surface 122 is displayed across the entire screen of the terminal device 7 so as to facilitate the touch input operation on the control surface 122. On the other hand, the television 2 displays an image of the game space including the entire control surface 122 and the target 123 (see FIG. 24) so that it is easy to grasp the attitude of the control surface 122 and aim at the target 123. That is, in step S27, the first virtual camera for generating the television game image is set so that the entire control surface 122 and the target 123 are included in the range of viewing field, whereas the second virtual camera for generating the terminal game image is set so that the screen of the LCD 51 (the input surface of the touch panel 52) and the control surface 122 coincide with each other on the screen. Therefore, in the first game example, images of the game space as seen from different viewpoints are displayed on the television 2 and on the terminal device 7, thereby facilitating the game operation.

The game using sensor outputs of the inertia sensor and the touch panel 52 as a game input is not limited to the first game example described above, and may be any of various game examples. As is the first game example, the second game example is a game in which an object (cannonball) is thrown in the game space by operating the terminal device 7. The player can specify the direction in which the cannonball is thrown through an operation of changing the attitude of the terminal device 7 and an operation of specifying a position on the touch panel 52.

Figure 25:
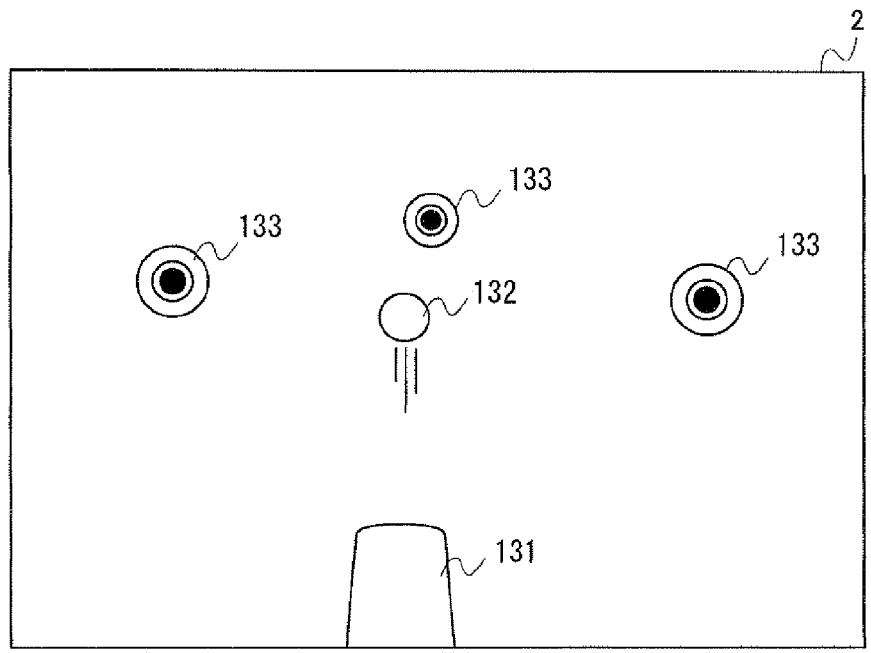
FIG. 25 is a diagram showing the screen of the television 2 and the terminal device 7 in a second game example.
Figure 25:
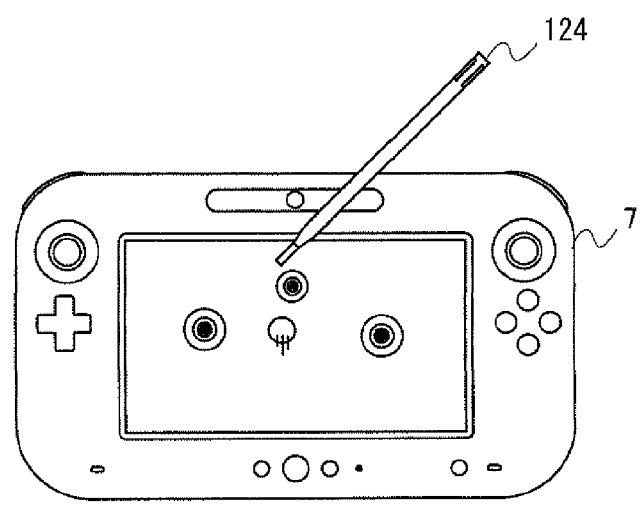

FIG. 25 is a diagram showing the screen of the television 2 and the terminal device 7 in the second game example. In FIG. 25, a cannon 131, a cannonball 132 and a target 133 are displayed on the television 2. The cannonball 132 and the target 133 are displayed on the terminal device 7. The terminal game image displayed on the terminal device 7 is an image of the game space as seen from the position of the cannon 131.

In the second game example, the player can change the range of display to be displayed on the terminal device 7 as the terminal game image by changing or varying the attitude of the terminal device 7. That is, the CPU 10 calculates the attitude of the terminal device 7 based on the outputs of the inertia sensors (the acceleration sensor 73 and/or the gyrosensor 74) and/or the magnetic sensor 72 (step S24), and controls the position and the attitude of the second virtual camera for generating the terminal game image based on the calculated attitude (step S27). Specifically, the second virtual camera is placed at the position of the cannon 131 and the orientation (attitude) thereof is controlled in accordance with the attitude of the terminal device 7. Thus, the player can change the range of the game space to be displayed on the terminal device 7 by changing the attitude of the terminal device 7.

In the second game example, the player specifies the direction in which the cannonball 132 is to be thrown by an operation of inputting a point on the touch panel 52 (a touch operation). Specifically, as the process of step S27, the CPU 10 calculates the position (control position) in the game space corresponding to the touched position, and calculates, as the throwing direction, the direction from a predetermined position in the game space (e.g. the position of the cannon 131) to the control position. Then, the CPU 10 performs a process of moving the cannonball 132 in the throwing direction. Thus, while the player performs an operation of drawing a line on the touch panel 52 in the first game example, the player performs an operation of specifying a point on the touch panel 52 in the second game example. The control position can be calculated by setting a control surface similar to that of the first game example (however, the control surface is not displayed in the second game example). That is, the position on the control surface corresponding to the touch position can be calculated as the control position by placing the control surface in accordance with the attitude of the second virtual camera so as to correspond to the display range of the terminal device 7 (specifically, the control surface rotates about the position of the cannon 131 in accordance with the change in the attitude of the terminal device 7).

In the second game example, the game device 3 can change the display range of the terminal game image in accordance with the movement (attitude) of the terminal device 7 by using the output of the inertia sensor as a game input, and can specify a direction in the game space (the direction in which the cannonball 132 is thrown) by using the touch input specifying a position within the display range as a game input. Thus, also in the second game example, as in the first game example, the player can move the game image displayed on the terminal device 7 or perform a touch operation on the game image, and can therefore play a game with such novel gameplay as if the player were directly operating the game image.

Also in the second game example, as in the first game example, the player can easily specify a direction with such an intuitive operation as if the player were actually inputting a direction in the space, by actually adjusting the attitude of the terminal device 7 with one hand while performing a touch input on the touch panel 52 with the other hand. Moreover, since the player can perform an operation on the attitude of the terminal device 7 and an input operation on the touch panel 52 simultaneously in parallel to each other, it is possible to quickly perform the operation of specifying a direction in a three-dimensional space.

In the second game example, while the image displayed on the television 2 may be an image from the same viewpoint as the terminal device 7, the game device 3 displays an image from a different viewpoint in FIG. 25. That is, while the second virtual camera for generating the terminal game image is set at the position of the cannon 131, the first virtual camera for generating the television game image is set at a position behind the cannon 131. Here, for example, if a range that cannot be seen on the screen of the terminal device 7 is displayed on the television 2, it is possible to realize such gameplay that the player aims at the target 133, which cannot be seen on the screen of the terminal device 7, while looking at the screen of the television 2. Thus, by having different display ranges for the television 2 and for the terminal device 7, it is possible not only to make it easier to grasp the state of the game space but also to further improve the playability of the game.

As described above, according to the present embodiment, since the terminal device 7 including the touch panel 52 and the inertia sensor can be used as a controller device, it is possible to realize a game with such gameplay as if the player were directly operating the game image, as in the first and second game examples.

Figure 26:
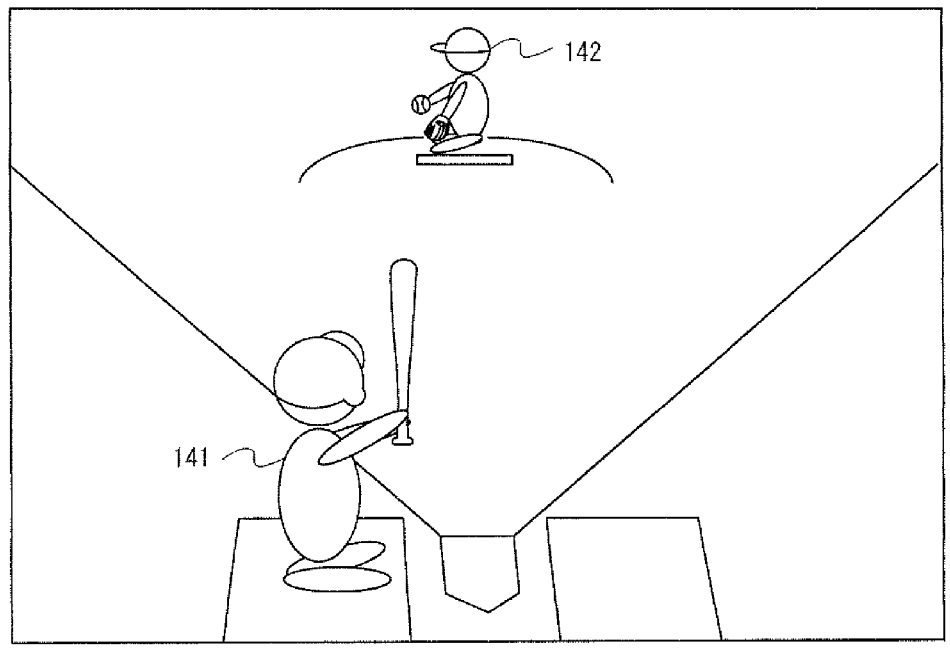
FIG. 26 is a diagram showing an example of a television game image displayed on the television 2 in a third game example.
Figure 27:
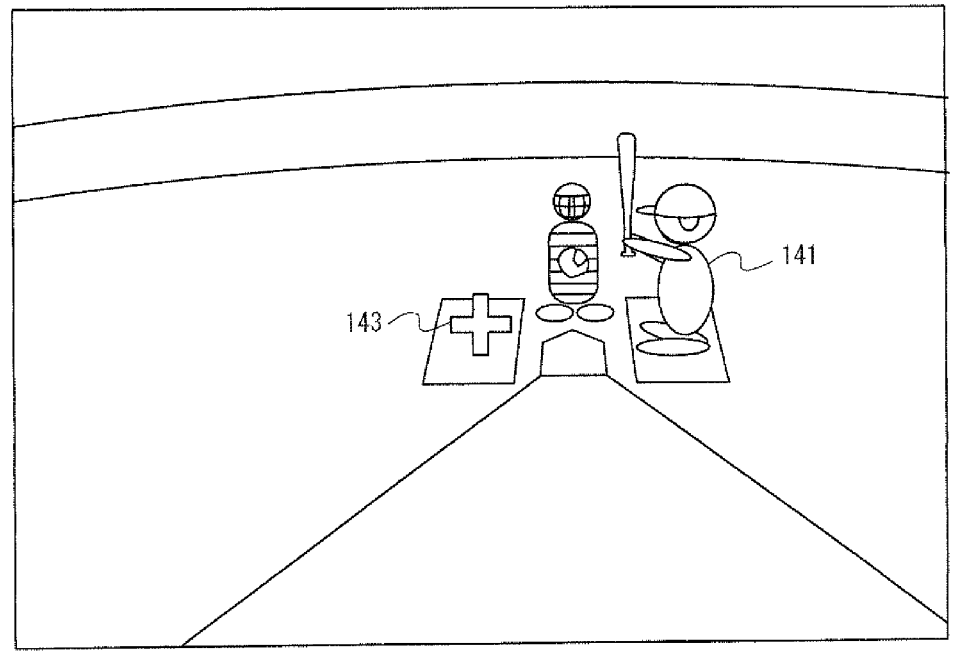
FIG. 27 is a diagram showing an example of a terminal game image displayed on the terminal device 7 in a third game example.

Referring now to FIGS. 26 and 27, the third game example will be described. The third game example is a baseball game in which two players compete with each other. That is, the first player uses the controller 5 to control a batter, while the second player uses the terminal device 7 to control a pitcher. The television 2 and the terminal device 7 display game images which are easy for the respective players to perform operations with.

FIG. 26 is a diagram showing an example of a television game image displayed on the television 2 in the third game example. The television game image shown in FIG. 26 is an image primarily for the first player. That is, the television game image represents the game space showing a pitcher (pitcher object) 142 which is the object to be controlled by the second player as seen from the side of a batter (batter object) 141 which is the object to be controlled by the first player. The first virtual camera for generating the television game image is placed at a position behind the batter 141 so as to be directed from the batter 141 toward the pitcher 142.

On the other hand, FIG. 27 is a diagram showing an example of a terminal game image displayed on the terminal device 7 in the third game example. The terminal game image shown in FIG. 27 is an image primarily for the second player. That is, the terminal game image represents the game space showing the batter 141 which is the object to be controlled by the first player as seen from the side of the pitcher 142 which is the object to be controlled by the second player. Specifically, in step S27, the CPU 10 controls the second virtual camera used for generating the terminal game image based on the attitude of the terminal device 7. The attitude of the second virtual camera is calculated so as to correspond to the attitude of the terminal device 7, as in the second game example described above. The position of the second virtual camera is fixed at a predetermined position. The terminal game image includes a cursor 143 for indicating the direction in which the pitcher 142 is throwing the ball.

The method by which the batter 141 is controlled by the first player, and the method by which the pitcher 142 is controlled by the second player may be any method. For example, the CPU 10 may detect a swing operation on the controller 5 based on output data of the inertia sensor of the controller 5, and have the batter 141 swing the bat in response to the swing operation. For example, the CPU 10 may move the cursor 143 in accordance with an operation on the analog stick 53, and have the pitcher 142 throw the ball to a position indicated by the cursor 143 when a predetermined one of the operation buttons 54 is pressed. The cursor 143 may be moved in accordance with the attitude of the terminal device 7, instead of an operation on the analog stick 53.

As described above, in the third game example, game images are generated from different viewpoints for the television 2 and for the terminal device 7, thus providing game images that are easy to view and easy to operate with for the respective players.

In the third game example, two virtual cameras are set in a single game space so as to display two types of game images of the game space as seen from the virtual cameras (FIGS. 26 and 27). Therefore, for the two types of game images generated in the third game example, most of the game processes performed on the game space (e.g., controlling an object in the game space) are common, and the game images can be generated simply by performing the drawing process twice on a common game space, thus providing an advantage that the process efficiency is higher than when the game processes are performed separately.

In the third game example, since the cursor 143 representing the pitching direction is displayed only on the side of the terminal device 7, the first player cannot see the position indicated by the cursor 143. Therefore, the game does not have such a problem that the first player gets to know the pitching direction to the disadvantage of the second player. Thus, in the present embodiment, if there is a problem in the game for one player if the other player sees a game image, the game image can be displayed on the terminal device 7. Thus, it is possible to prevent a problem of, for example, detracting from the strategic aspect of the game. In other embodiments, the game device 3 may display the terminal game image on the television 2 along with the television game image depending on the content of the game (e.g., where no such problem as described above occurs even if the terminal game image is seen by the first player).

Figure 28:
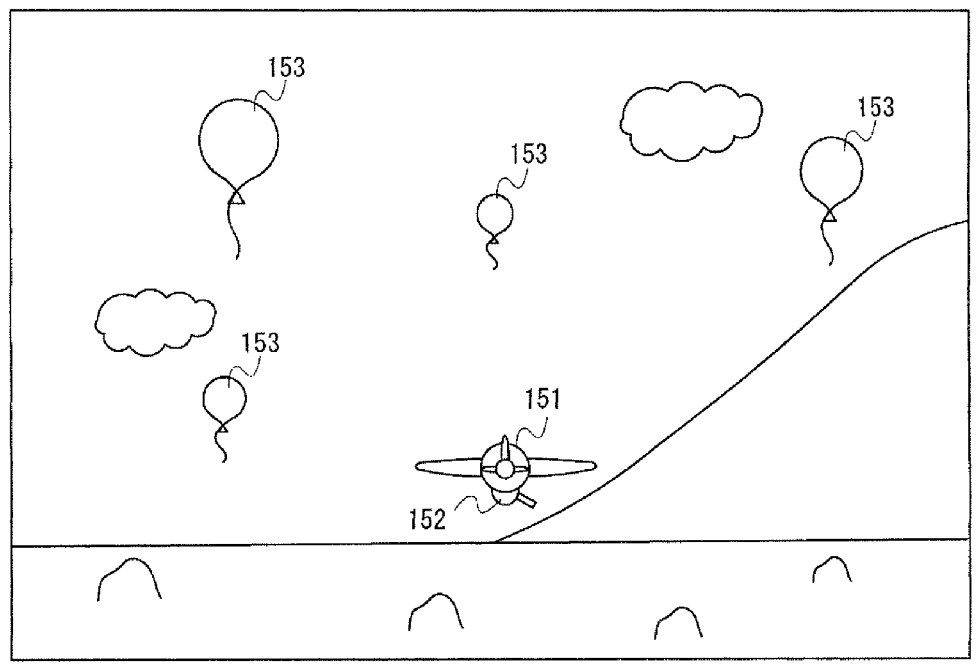
FIG. 28 is a diagram showing an example of a television game image displayed on the television 2 in a fourth game example.
Figure 29:
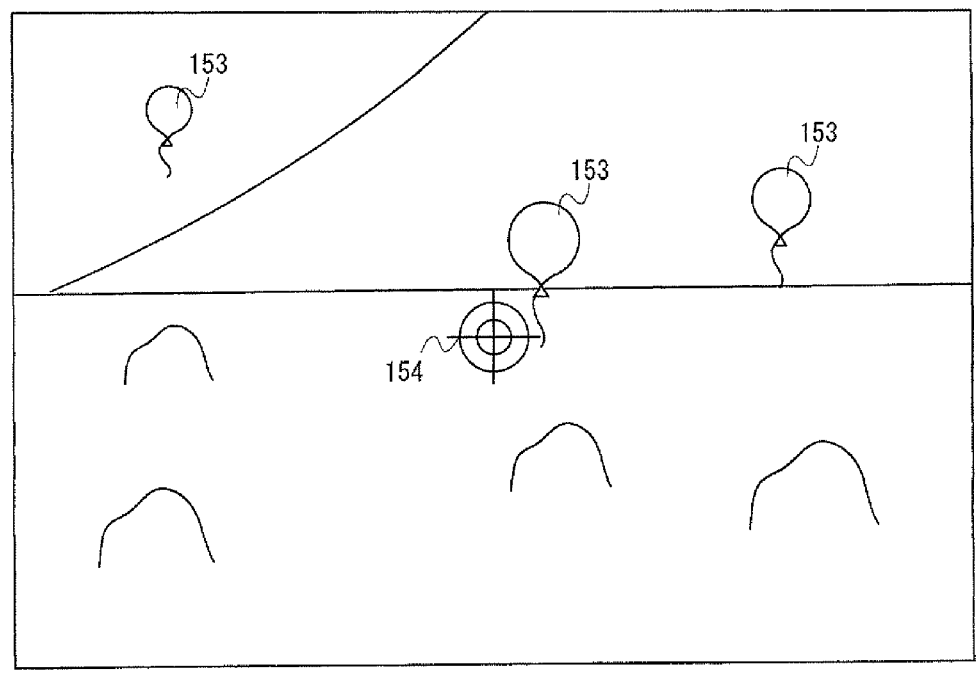
FIG. 29 is a diagram showing an example of a terminal game image displayed on the terminal device 7 in the fourth game example.

Referring now to FIGS. 28 and 29, the fourth game example will be described. The fourth game example is a shooting game in which two players cooperate with each other. That is, the first player uses the controller 5 to perform an operation of moving an airplane, and the second player uses the terminal device 7 to perform an operation of controlling the cannon-firing direction of the airplane. In the fourth game example, as in the third game example, game images that are easy for the respective players to perform game operations with are displayed on the television 2 and on the terminal device 7.

FIG. 28 is a diagram showing an example of a television game image displayed on the television 2 in the fourth game example. FIG. 29 is a diagram showing an example of a terminal game image displayed on the terminal device 7 in the fourth game example. As shown in FIG. 28, an airplane (airplane object) 151 and a target (balloon object) 153 appear in the virtual game space in the fourth game example. The airplane 151 has a cannon (cannon object) 152.

As shown in FIG. 28, an image of the game space including the airplane 151 is displayed as the television game image. The first virtual camera for generating the television game image is set so as to produce an image of the game space showing the airplane 151 as seen from behind. That is, the first virtual camera is placed behind the airplane 151 at such an attitude that the airplane 151 is included in the image-capturing range (range of viewing field). The first virtual camera is controlled so as to be moved in accordance with the movement of the airplane 151. That is, in the process of step 327, the CPU 10 controls the movement of the airplane 151 based on the controller operation data, and also controls the position and the attitude of the first virtual camera. Thus, the position and the attitude of the first virtual camera are controlled in accordance with the operation of the first player.

On the other hand, as shown in FIG. 29, an image of the game space as seen from the airplane 151 (more specifically, the cannon 152) is displayed as the terminal game image. Therefore, the second virtual camera for generating the terminal game image is placed at the position of the airplane 151 (more specifically, the position of the cannon 152). In the process of step S27, based on the controller operation data, the CPU 10 controls the movement of the airplane 151 and also controls the position of the second virtual camera. The second virtual camera may be placed at a position around the airplane 151 or the cannon 152 (e.g., a position slightly behind the cannon 152). As described above, the position the second virtual camera is controlled by the operation of the first player (operating the movement of the airplane 151). Therefore, in the fourth game example, the first virtual camera and the second virtual camera move in cooperation with each other.

An image of the game space as seen in the firing direction of the cannon 152 is displayed as the terminal game image. Here, the firing direction of the cannon 152 is controlled so as to correspond to the attitude of the terminal device 7. That is, in the present embodiment, the attitude of the second virtual camera is controlled so that the line-of-sight direction of the second virtual camera coincides with the firing direction of the cannon 152. In the process of step S27, the CPU 10 controls the orientation of the cannon 152 and the attitude of the second virtual camera in accordance with the attitude of the terminal device 7 calculated in step S24. Thus, the attitude of the second virtual camera is controlled by the operation of the second player. The second player can change the firing direction of the cannon 152 by changing the attitude of the terminal device 7.

When firing a cannonball from the cannon 152, the second player presses a predetermined button of the terminal device 7. When the predetermined button is pressed, a cannonball is fired in accordance with the orientation of the cannon 152. In the terminal game image, a sight 154 is displayed at the center of the screen of the LCD 51, and the cannonball is fired in the direction indicated by the sight 154.

As described above, in the fourth game example, the first player operates the airplane 151 (so that it moves in the direction of an intended target 153, for example) while looking primarily at the television game image (FIG. 28) representing the game space viewing in the traveling direction of the airplane 151. On the other hand, the second player operates the cannon 152 while looking primarily at the terminal game image (FIG. 29) representing the game space viewing in the firing direction of the cannon 152. Thus, in the fourth game example, in a game in which two players cooperate with each other, game images that are easy to view and easy to operate with for the respective players are displayed on the television 2 and on the terminal device 7.

In the fourth game example, the positions of the first virtual camera and the second virtual camera are controlled by the operation of the first player, and the attitude of the second virtual camera is controlled by the operation of the second player. That is, in the present embodiment, the position or the attitude of a virtual camera changes in accordance with the game operation by each player, thereby changing the display range of the game space to be displayed on each display device. Since the display range of the game space to be displayed on the display device changes in accordance with the operation of each player, each player can realize that one's game operation is sufficiently reflected in the progress of the game, and can thus enjoy the game sufficiently.

In the fourth game example, a game image as seen from behind the airplane 151 is displayed on the television 2, and a game image as seen from the position of the cannon of the airplane 151 is displayed on the terminal device 7. Here, in other game examples, the game device 3 may display a game image as seen from behind the airplane 151 on the terminal device 7, and a game image as seen from the position of the cannon 152 of the airplane 151 on the television 2. Then, the roles of the players are switched around from the fourth game example so that the first player uses the controller 5 to operate the cannon 152 while the second player uses the terminal device 7 to operate the airplane 151.

Figure 30:
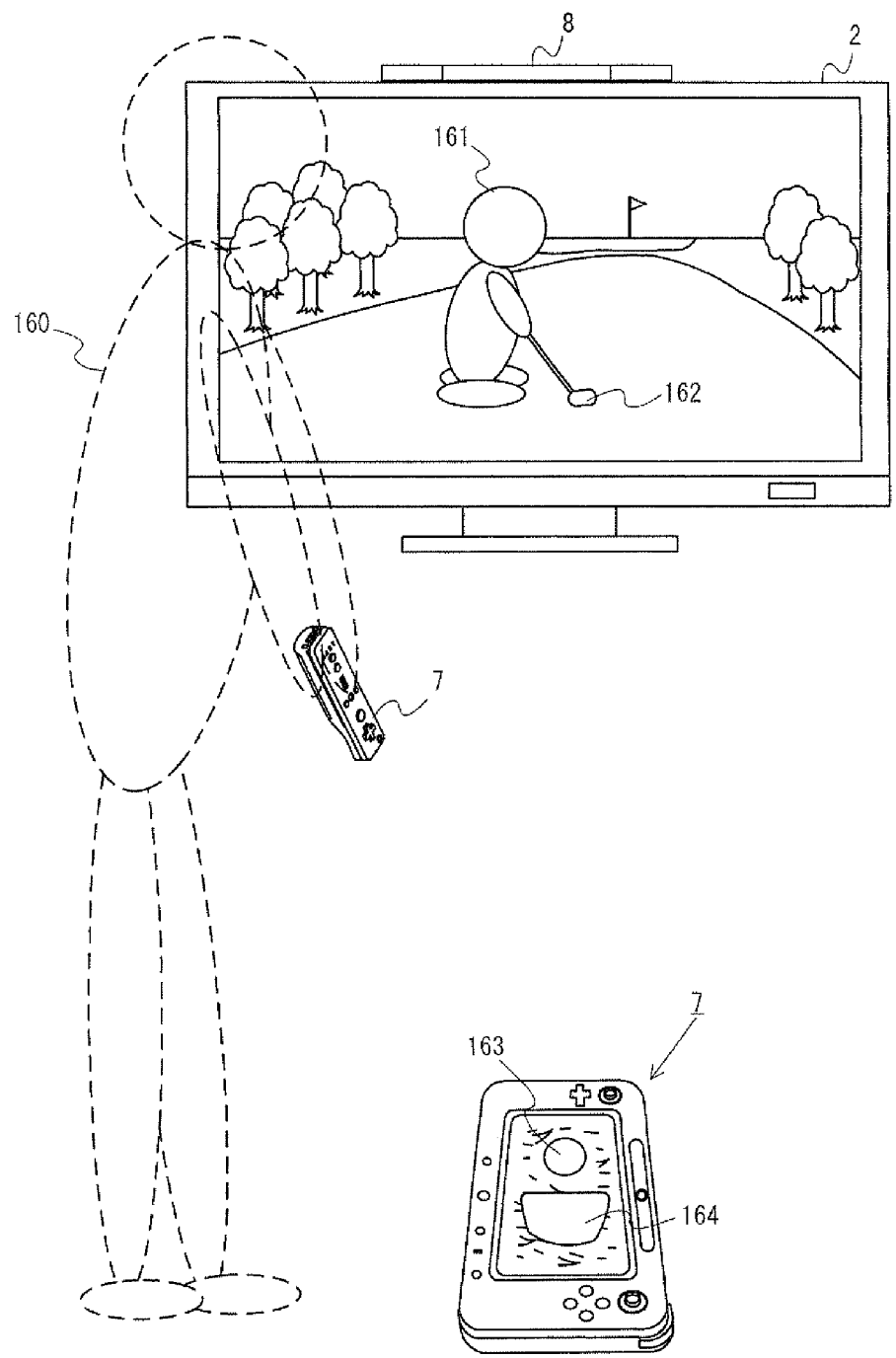
FIG. 30 is a diagram showing how the game system 1 is used in a fifth game example.

Referring now to FIG. 30, the fifth game example will be described. The fifth game example is a game in which a player uses the controller 5 to perform an operation, and the terminal device 7 is used as a display device, not as a controller device. Specifically, the fifth game example is a golf game, wherein the game device 3 has a player character in the virtual game space take a golf swing in accordance with the player performing an operation (swing operation) of swinging the controller 5 as if it were a golf club.

FIG. 30 is a diagram showing how the game system 1 is used in the fifth game example. In FIG. 30, an image of the game space including (an object of) a player character 161 and (an object of) a golf club 162 is displayed on the screen of the television 2. Note that (an object of) a ball 163 placed in the game space is also displayed on the television 2 though it is not shown in FIG. 30 as being hidden behind the golf club 162. On the other hand, as shown in FIG. 30, the terminal device 7 is placed on the floor surface in front of the television 2 so that the screen of the LCD 51 is facing vertically upward. An image representing the ball 163, an image representing a part of the golf club 162 (specifically, a head 162a of the golf club), and an image representing the ground of the game space are displayed on the terminal device 7. The terminal game image is an image of the vicinity of the ball as seen from above.

When playing the game, a player 160 stands near the terminal device 7, and performs a swing operation of swinging the controller 5 as if it were a golf club. Then, in step S27, the CPU 10 controls the position and the attitude of the golf club 162 in the game space in accordance with the attitude of the controller 5 calculated in the process of step S23. Specifically, the golf club 162 is controlled so that the golf club 162 in the game space hits the ball 163 when the tip direction of the controller 5 (the Z-axis positive direction shown in FIG. 3) is pointing toward the image of the ball 163 displayed on the LCD 51.

When the tip direction of the controller 5 is pointing toward the LCD 51, an image (head image) 164 representing a part of the golf club 162 is displayed on the LCD 51 (see FIG. 30). For the terminal game image, the image of the ball 163 may be shown in the actual size, and the orientation of the head image 164 may be shown to rotate in accordance with the rotation of the controller 5 about the Z axis, in order to enhance the reality. The terminal game image may be generated using a virtual camera provided in the game space, or generated using pre-prepared image data. When it is generated using pre-prepared image data, detailed and realistic images can be generated with low computational load without constructing the terrain model of a golf course in detail.

As a result of the player 160 performing the swing operation so as to swing the golf club 162, if the golf club 162 hits the ball 163, the ball 163 travels (flies). That is, the CPU 10 determines in step S27 whether the golf club 162 and the ball 163 have contacted each other, and moves the ball 163 when there has been a contact. Here, the television game image is generated so that the ball 163 after the travel is included therein. That is, the CPU 10 controls the position and the attitude of the first virtual camera for generating the television game image so that the traveling ball is included in the image-capturing range thereof. On the other hand, on the terminal device 7, when the golf club 162 hits the ball 163, the image of the ball 163 is moved and immediately disappears to the outside of the screen. Thus, in the fifth game example, the travel of the ball is displayed primarily on the television 2, and the player 160 can check, on the television game image, the destination of the ball hit by the swing operation.

As described above, in the fifth game example, the player 160 can swing the golf club 162 by swinging the controller 5 (have the player character 161 swing the golf club 162). Here, in the fifth game example, the golf club 162 in the game space is controlled to hit the ball 163 when the tip direction of the controller 5 is pointing toward the image of the ball 163 displayed on the LCD 51. Therefore, the player can perform the swing operation and thereby feel as if the player were taking a swing with an actual golf club, thus making the swing operation feel more realistic.

Moreover, in the fifth game example, the head image 164 is displayed on the LCD 51 when the tip direction of the controller 5 is pointing toward the terminal device 7. Therefore, as the player points the tip direction of the controller 5 toward the terminal device 7, the player can feel that the attitude of the golf club 162 in the virtual space corresponds to the attitude of the controller 5 in the real space, thus making the swing operation feel more realistic.

As described above, in the fifth game example, where the terminal device 7 is used as a display device, it is possible to make the operation using the controller 5 feel more realistic by locating the terminal device 7 at an appropriate position.

In the fifth game example, the terminal device 7 is placed on the floor surface, and an image representing the game space showing only the vicinity of the ball 163 is displayed on the terminal device 7. Therefore, the position/attitude of the entire golf club 162 in the game space cannot be displayed on the terminal device 7, and how the ball 163 travels after the swing operation cannot be displayed on the terminal device 7. In view of this, in the fifth game example, the entire golf club 162 is displayed on the television 2 before the ball 163 travels, and how the ball 163 travels is displayed on the television 2 after the ball 163 starts traveling. Thus, in the fifth game example, it is possible to provide the player with a realistic operation, and game images that are easy to view can be presented to the player by using two screens of the television 2 and the terminal device 7.

In the fifth game example, the marker section 55 of the terminal device 7 is used for calculating the attitude of the controller 5. That is, the CPU 10 lights the marker section 55 (does not light the marker device 6) in the initialization process of step S1, and the CPU 10 calculates the attitude of the controller 5 based on the marker coordinate data 96 in step S23. Then, it is possible to accurately determine whether the tip direction of the controller 5 is in an attitude pointing toward the marker section 55. Note that while steps S21 and S22 do not have to be performed in the fifth game example, a marker or markers to be lit may be changed in the middle of the game Mother game examples by performing the process of steps S21 and S22. For example, the CPU 10 may determine in step S21 whether the tip direction of the controller 5 is pointing in the direction of gravity based on the first acceleration data 94, and in step S22, the CPU 10 may light the marker section 55 if it is pointing in the direction of gravity and light the marker device 6 if it is not pointing in the direction of gravity. Then, where the tip direction of the controller 5 is pointing in the direction of gravity, the attitude of the controller 5 can be calculated with high precision by obtaining marker coordinate data of the marker section 55, and where the tip direction of the controller 5 is pointing toward the television 2, the attitude of the controller 5 can be calculated with high precision by obtaining marker coordinate data of the marker device 6.

As described above in the fifth game example, in the game systems, the terminal device 7 can be placed at an arbitrary position and used as a display device. Then, when the marker coordinate data is used as a game input, the controller 5 can be used while pointing in an arbitrary direction by setting the terminal device 7 at an intended position, in addition to using the controller while pointing toward the television 2. That is, according to the present embodiment, since the orientation in which the controller 5 is used is not limited to any particular orientation, it is possible to improve the degree of freedom in operations to be performed on the controller 5.

[7. Other Operation Examples of Game System]

In the game system 1, it is possible to perform operations for playing various games as described above. While the terminal device 7 can be used as a portable display or a second display, it may also be used as a controller for making a touch input or a motion-based input, and it is therefore possible to realize a wide variety of games with the game system 1. Operations as follows can also be performed, including applications other than games.

(Operation Example where Player Plays Game Only Using Terminal Device 7)

In the present embodiment, the terminal device 7 can function as a display device and can also function as a controller device. Therefore, one can use the terminal device 7 like a portable game device by using the terminal device 7 as a display and as an operation input device and without using the television 2 and the controller 5.

Specifically, according to the game process shown in FIG. 22, the CPU 10 obtains the terminal operation data 97 from the terminal device 7 in step S3, and performs a game process using only the terminal operation data 97 as a game input (without using the controller operation data) in step S4. Then, a game image is generated in step S6, and the game image is transmitted to the terminal device 7 in step S10. Note that steps S2, S5 and S9 may not be performed. Thus, a game process is performed in accordance with an operation on the terminal device 7, and a game image representing the game process results is displayed on the terminal device 7. Then, the terminal device 7 can be used as a portable game device (though the game process is actually performed by the game device). Therefore, according to the present embodiment, the user can play a game using the terminal device 7 even in a case where a game image cannot be displayed on the television 2 for reasons such as the television 2 being used (e.g., someone else watching a TV broadcast).

In addition to the game image, the CPU 10 may transmit an image of the menu screen described above to be displayed after power-up to the terminal device 7 so that the image is displayed thereon. This is convenient because the player can play a game without using the television 2 from the beginning.

Moreover, in the above description, the display device on which the game image is displayed can be changed from the terminal device 7 to the television 2 in the middle of the game. Specifically, the CPU 10 can further perform step S9 to output the game image to the television 2. The image to be outputted to the television 2 in step S9 is the same as the game image to be transmitted to the terminal device 7 in step S10. Then, by switching the input of the television 2 so that the input from the game device 3 is displayed thereon, the same game image as that on the terminal device 7 is displayed on the television 2. Thus, the display device on which the game image is displayed can be changed to the television 2. After the game image is displayed on the television 2, the display of the screen of the terminal device 7 may be turned OFF.

The game system 1 may be such that the infrared remote controller signal for the television 2 can be outputted from an infrared emitter (e.g., the marker device 6, the marker section 55 or the infrared communication module 72). Then, the game device 3 can perform an operation on the television 2 by outputting the infrared remote controller signal from the infrared emitter in accordance with an operation on the terminal device 7. In such a case, since the user can operate the television 2 by using the terminal device 7 without operating the remote controller of the television 2, it is convenient when, for example, switching the input of the television 2 from one to another as described above.

(Operation Example where System Communicates with Another Device Via Network)

Figure 31:
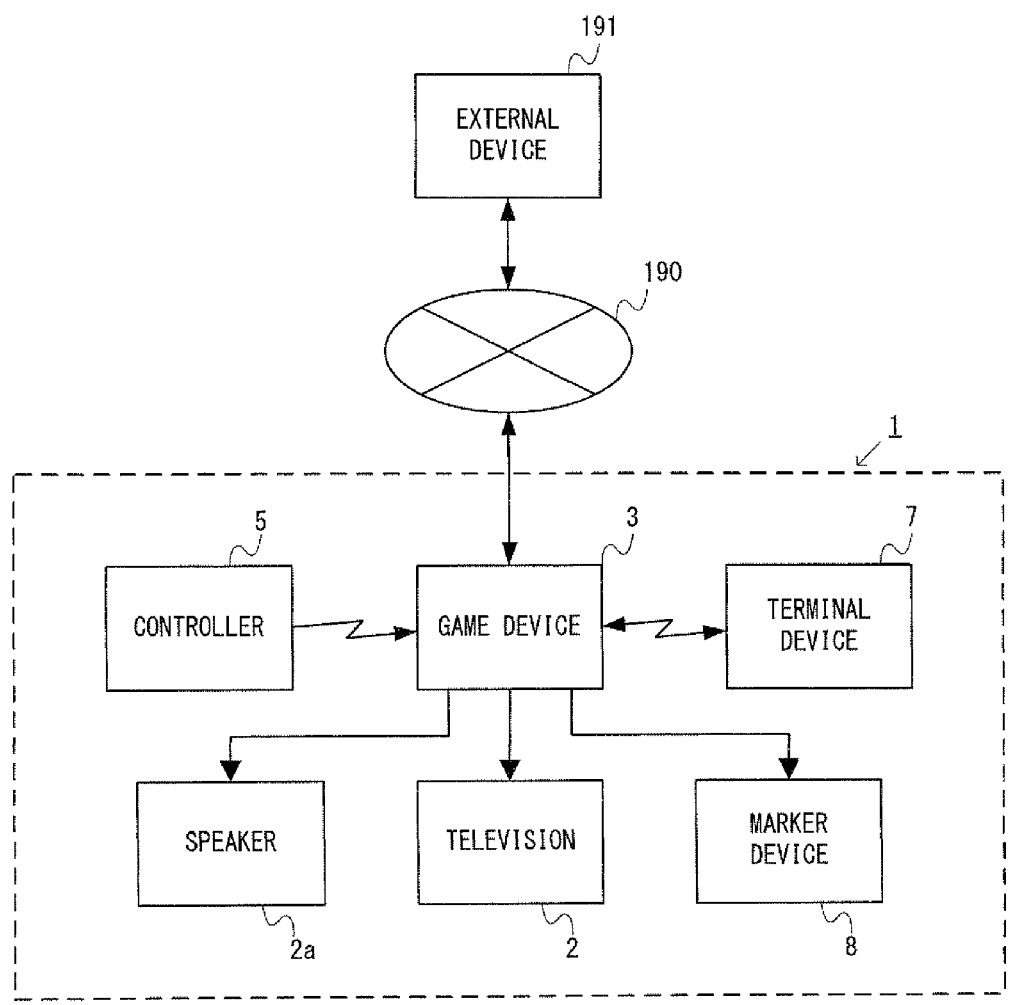
FIG. 31 is a diagram showing how devices included in the game system 1 connected with one another in a case in which the game system 1 is connected to an external device via a network.

Since the game device 3 has a network connection function as described above, the game system 1 can be used in a case in which it communicates with an external device via a network. FIG. 31 is a diagram showing how devices included in the game system 1 are connected with one another in a case in which the game system 1 is connected to an external device via a network. As shown in FIG. 31, the game device 3 can communicate with an external device 191 via a network 190.

Where the external device 191 and the game device 3 can communicate with each other as described above, the game system 1 can communicate with the external device 191 using the terminal device 7 as an interface. For example, the game system 1 can be used as a video telephone by exchanging images and sounds between the external device 191 and the terminal device 7. Specifically, the game device 3 receives the images and sounds from the external device 191 (the images and the sounds of the other person) via the network 190, and transmits the received images and sounds to the terminal device 7. Then, the terminal device 7 displays the images from the external device 191 on the LCD 51 and outputs from the speaker 77 the sounds from the external device 191. The game device 3 receives from the terminal device 7 the camera images captured by the camera 56 and the microphone sounds detected by the microphone 79, and transmits the camera images and the microphone sounds to the external device 191 via the network 190. The game system 1 can be used as a video telephone as the game device 3 repeats the exchange of the images and the sounds described above with the external device 191.

Since the terminal device 7 is portable in the present embodiment, the user can use the terminal device 7 at an arbitrary position or direct the camera 56 in an arbitrary direction. In the present embodiment, since the terminal device 7 includes the touch panel 52, the game device 3 can transmit the input information made on the touch panel 52 (the touch position data 100) to the external device 191. For example, the game system 1 can be used as a so-called e-learning system when outputting from the terminal device 7 the images and sounds from the external device 191, and transmitting characters, etc., the user has written on the touch panel 52 to the external device 191.

(Operation Example where System Cooperates with TV Broadcasting)

The game system 1 can also operate in cooperation with TV broadcasting when a TV broadcast is being watched on the television 2. That is, when a TV program is being watched on the television 2, the game system 1 can output on the terminal device 7 information regarding the TV program, etc. An operation example in which the game system 1 operates in cooperation with TV broadcasting will now be described.

In the operation example described above, the game device 3 can communicate with a server via a network (in other words, the external device 191 shown in FIG. 31 is the server). The server stores, for each channel of TV broadcasting, various information relating to TV broadcasting (TV information). The TV information may be program-related information such as subtitles and cast information, EPG (Electronic Program Guide) information, or information to be broadcast as a data broadcast. The TV information may be images, sounds, text, or information of a combination thereof. The number of servers does not need to be one, a server may be provided for each channel or each program of TV broadcasting, and the game device 3 may be able to communicate with the servers.

Where video/sound of a TV broadcast is being outputted from the television 2, the game device 3 prompts the user to input the channel of the TV broadcast being watched by using the terminal device 7. Then, a request is given via the network to the server to transmit TV information corresponding to the inputted channel. In response to this, the server transmits data of TV information corresponding to the channel. When receiving data transmitted from the server, the game device 3 outputs the received data to the terminal device 7. The terminal device 7 displays image and text data of that data on the LCD 51, and outputs sound data from the speaker. As described above, the user can enjoy information relating to the TV program being watched currently, etc., using the terminal device 7.

As described above, the game system 1 can communicate with an external device (server) via a network so that information linked to TV broadcasting can be presented to the user by the terminal device 7. Particularly, this gives great convenience since the terminal device 7 is portable in the present embodiment, and the user can use the terminal device 7 at an arbitrary position.

As described above, in the present embodiment, the user can use the terminal device 7 in various applications/forms, in addition to game applications.

[8. Variations]

The above embodiment is an example of systems and methods that can be carried out, and the systems and methods may also be carried out with, for example, the following configurations in other embodiments.

(Variation Using Plurality of Terminal Devices)

While the game system 1 includes only one terminal device in the above embodiment, the game system 1 may include a plurality of terminal devices. That is, the game device 3 may be able to wirelessly communicate with each of a plurality of terminal devices, wherein the game device 3 transmits game image data, game sound data and control data to each terminal device, and receives operation data, camera image data and microphone sound data from each terminal device. When the game device 3 wirelessly communicates with the plurality of terminal devices, the game device 3 can realize the wireless communication with the terminal devices by time division multiple access or frequency division multiple access.

In a case in which there are a plurality of terminal devices as described above, a greater variety of games can be played using the game system. For example, where the game system 1 includes two terminal devices, the game system 1 has three display devices, and the game system 1 can therefore generate game images for three players and display the game images on the respective display devices. Where the game system 1 includes two terminal devices, two players can simultaneously play a game in which a controller and a terminal device are used as a set (e.g., the fifth game example). Moreover, where the game process of step S27 is performed based on marker coordinate data outputted from two controllers, two players can each perform a game operation while pointing the controller toward the marker (the marker device 6 or the marker section 55). That is, one player can perform a game operation while pointing the controller toward the marker device 6, and the other player can perform a game operation while pointing the controller toward the marker section 55.

(Variation Regarding Function of Terminal Device)

In the above embodiment, the terminal device 7 functions as a so-called thin client terminal, and does not perform the game process. Here, in other embodiments, some of a series of game processes performed by the game device 3 in the above embodiment may be performed by other devices such as the terminal device 7. For example, some processes (e.g., the process of generating the terminal game image) may be performed by the terminal device 7. That is, the terminal device may serve as a portable game device which performs game operations based on operations performed on operation sections so as to produce game images based on the game processes and display the produced game images on a display section. For example, in a game system including a plurality of information processing devices (game devices) that can communicate with each other, the game processes may be divided among the plurality of information processing devices.

(Variation Regarding Configuration of Terminal Device)

The terminal device of the above embodiment is an example, the shape of each operation button of the terminal device, the shape of the housing 50, and number and the positions of the components, etc., are merely illustrative, and the present invention can be realized with other shapes, numbers, and positions. For example, the terminal device may have the following configuration. Variations of the terminal device will now be described with reference to FIGS. 32 to 35.

Figure 32:
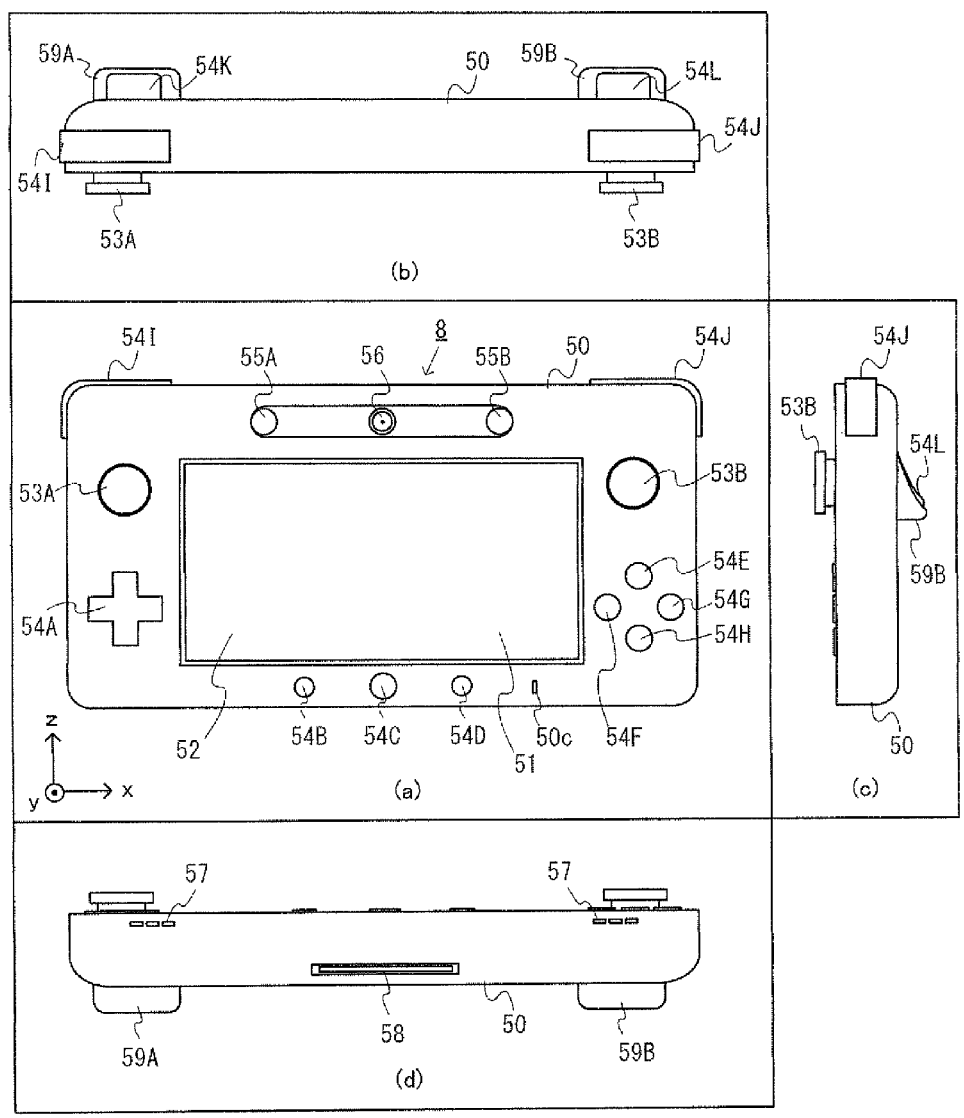
FIG. 32 is a diagram showing an external configuration of a terminal device according to a variation of the present embodiment.
Figure 33:
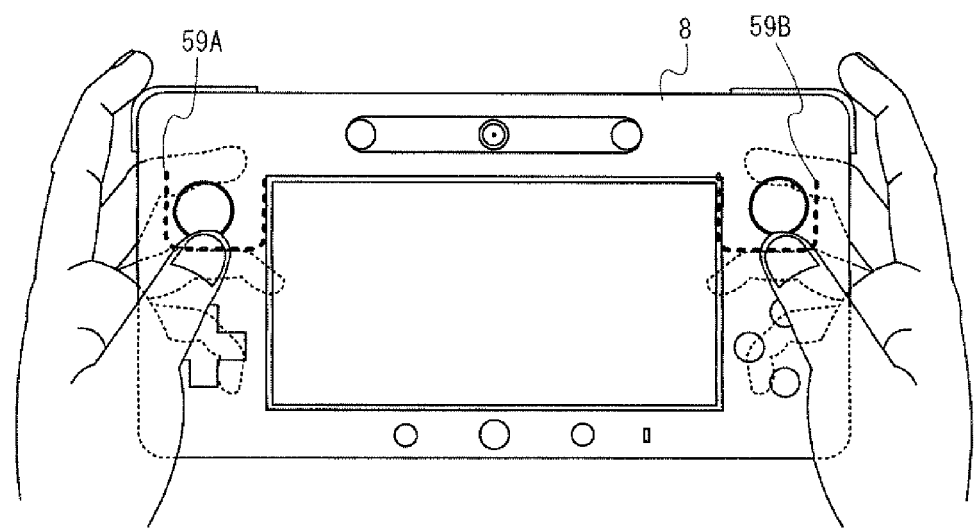
FIG. 33 is a diagram showing the terminal device shown in FIG. 32 being held by the user.

FIG. 32 is a diagram showing an external configuration of a terminal device according to a variation of the above embodiment. FIG. 32(a) is a front view of the terminal device, FIG. 32(b) is a top view thereof, FIG. 32(c) is a right side view thereof, and FIG. 32(d) is a bottom view thereof. FIG. 33 is a diagram showing the terminal device shown in FIG. 32 being held by the user. In FIGS. 32 and 33, like elements to those of the terminal device 7 of the above embodiment will be denoted by like reference numerals to those used in FIG. 8, but do not need to be the same elements.

As shown in FIG. 32, a terminal device 8 includes a housing 50 generally in a horizontally-elongated rectangular plate shape. The housing 50 is sized so that it can be held by the user. Thus, the user can hold and move the terminal device 8, and can change the position in which the terminal device 8 is placed.

The terminal device 8 includes the LCD 51 on the surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. While FIG. 9 shows an example in which the user holds the terminal device 8 in a landscape position (in a horizontally-oriented direction) by holding left and right opposing end portions of the housing 50 with respect to the LCD 51, the user can hold the terminal device 8 in a portrait position (in a vertically-oriented direction).

As shown in FIG. 32(a), the terminal device 8 includes the touch panel 52 on the screen of the LCD 51 as an operation mechanism (operation section). In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In this variation, a touch panel having the same resolution (detection precision) as the resolution of the LCD 51 is used as the touch panel 52. However, the resolution of the touch panel 52 does not always need to coincide with the resolution of the LCD 51. While a touch pen is usually used for making inputs on the touch panel 52, the present invention is not limited to using a touch pen, and an input may be made on the touch panel 52 with a finger of the user. The housing 50 may be provided with a hole for accommodating a stylus used for performing operations on the touch panel 52. Thus, since the terminal device 8 includes the touch panel 52, the user can operate the touch panel 52 while moving the terminal device 8. That is, the user can move the screen of the LCD 51 while directly (by means of the touch panel 52) making an input on the screen.

As shown in FIG. 32, the terminal device 8 includes two analog sticks 53A and 53B and a plurality of buttons 54A to 54L, as operation mechanisms (operation section). The analog sticks 53A and 53B are each a direction-specifying device. The analog sticks 53A and 53B are each configured so that the stick portion operated with a finger of the user can be slid or tilted in any direction (at any angle in the up, down, left, right and diagonal directions) with respect to the surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 33, the analog sticks 53A and 53B are provided at such positions that the user can operate them while holding the left and right portions of the terminal device 8, and therefore the user can easily operate the analog sticks 53A and 53B even when holding and moving the terminal device 8.

The buttons 54A to 54L are each an operation mechanism for making predetermined inputs. As will be discussed below, the buttons 54A to 54I are provided at such positions that the user can operate them while holding the left and right portions of the terminal device 8 (see FIG. 33). Therefore, the user can easily operate these operation mechanisms even when holding and moving the terminal device 8.

As shown in FIG. 32(a), the cross button (direction-input button) 54A and the buttons 54B to 54H, of the operation buttons 54A to 54L, are provided on the front surface of the housing 50. That is, these buttons 54A to 54H are provided at positions at which they can be operated by the thumbs of the user (see FIG. 33).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 8, the four buttons 54E to 54H can also serve as buttons with which the user specifies the up, down, left and right directions.

As shown in FIGS. 32(a), 32(b) and 32(c), the first L button 54I and the first R button 54J are provided in upper corner portions of the housing 50 (the upper left portion and the upper right portion). Specifically, the first L button 54I is provided at the left end of the upper side surface of the plate-like housing 50 so that it is exposed on the upper and left side surfaces. The first R button 54J is provided at the right side end of the upper side surface of the housing 50 so that it is exposed on the upper and right side surfaces. Thus, the first L button 54I is provided at such a position that it can be operated with the left index finger of the user, and the first R button 54J is provided at such a position that it can be operated with the right index finger of the user (see FIG. 33).

As shown in FIGS. 32(b) and 32(c), a second L button 54K and a second R button 54L are provided on leg portions 59A and 59B protruding from the back surface of the plate-like housing 50 (i.e., the surface opposite to the front surface where the LCD 51 is provided). As with the eaves portion 59 of the above embodiment, the leg portions 59A and 59B are provided so as to extend across areas on the reverse side including positions generally corresponding to the operation sections (the analog sticks 53A and 53B) which are provided respectively on the left side and on the right side of the display section. The second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to generally correspond to the left analog stick 53A provided on the front surface, and the second R button 54L is provided on the reverse side so as to generally correspond to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 33). The second L button 54K and the second R button 54L are provided on the diagonally-upwardly-facing surfaces of the leg portions 59A and 59B, and have diagonally-upwardly-facing button surfaces, as shown in FIG. 32(c). It is believed that the middle fingers will generally move in the up/down direction when the user holds the terminal device 8, and it will be easier for the user to press the second L button 54K and the second R button 54L if the button surfaces are facing upward. The provision of the leg portions on the back surface of the housing 50 makes it easier for the user to hold the housing 50, and the provision of the buttons on the leg portions makes it easier for the user to perform input operations while holding the housing 50.

With the terminal device 8 shown in FIG. 32, since the second L button 54K and the second R button 54L are provided on the back surface, when the terminal device 8 is put down with the screen of the LCD 51 (the front surface of the housing 50) facing up, the screen may not lie completely horizontal. Therefore, in other embodiments, three or more leg portions may be provided on the back surface of the housing 50. Then, it can be put down on the floor surface (or other horizontal surface) with the leg portions in contact with the floor surface with the screen of the LCD 51 facing up, and it is therefore possible to put down the terminal device 8 so that the screen lies horizontal. A detachable leg portion may be added so that the terminal device 8 can be put down horizontally.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown in the figures, the terminal device 8 may include a power button for turning ON/OFF the power of the terminal device 8. The terminal device 8 may include a button for turning ON/OFF the display of the screen of the LCD 51, a button for performing a connection setting (pairing) with the game device 3, and a button for adjusting the volume of the speaker (the speaker 77 shown in FIG. 10).

As shown in FIG. 32(a), the terminal device 8 includes a marker section including the marker 55A and the marker 55B (the marker section 55 shown in FIG. 10) on the front surface of the housing 50. The marker section 55 is provided on the upper side of the LCD 51. The marker 55A and the marker 55B are each formed by one or more infrared LEDs, as are the markers 6R and 6L of the marker device 6. The marker section 55 is used for the game device 3 to calculate the movement, etc., of the controller 5, as is the marker device 6 described above. The game device 3 can control the lighting of the infrared LEDs of the marker section 55.

The terminal device 8 includes the camera 56 as an image-capturing mechanism. The camera 56 includes an image-capturing element (e.g., a COD image sensor, a CMOS image sensor, or the like) having a predetermined resolution, and a lens. As shown in FIG. 32, the camera 56 is provided on the front surface of the housing 50 in this variation. Therefore, the camera 56 can capture an image of the face of the user holding the terminal device 8, and can capture an image of the user playing a game while looking at the LCD 51, for example.

The terminal device 8 includes a microphone (the microphone 79 shown in FIG. 10) as a sound input mechanism. The microphone hole 50c is provided on the front surface of the housing 50. The microphone 79 is provided inside the housing 50 behind the microphone hole 50c. The microphone detects sounds around the terminal device 8 such as the voice of the user.

The terminal device 8 includes a speaker (the speaker 77 shown in FIG. 10) as a sound output mechanism. As shown in FIG. 32(d), the speaker holes 57 are provided on the lower side surface of the housing 50. The output sounds from the speaker 77 is outputted from the speaker holes 57. In this variation, the terminal device 8 includes two speakers, and a speaker holes 57 are provided at the respective positions of each of the left speaker and the right speaker.

The terminal device 8 includes the extension connector 58 via which another device can be connected to the terminal device 8. In this variation, the extension connector 58 is provided on the lower side surface of the housing 50 as shown in FIG. 32(d). The other device connected to the extension connector 58 may be any device, and may be, for example, a game-specific controller (gun-shaped controller, etc.) or an input device such as a keyboard. The extension connector 58 may be omitted if there is no need to connect other devices to terminal device 8.

With the terminal device 8 shown in FIG. 32, the shape of each operation button, the shape of the housing 50, the number and the positions of the components, etc., are merely illustrative, and the present invention can be realized with other shapes, numbers, and positions.

As described above, in the variation described above, the two leg portions 59A and 59B are provided, as projecting portions, at positions in the left and right opposing portions on the back surface of the housing 50. Then, as in the above embodiment, the user can easily hold the terminal device 8 by holding the terminal device 8 while the bottom surfaces of the projecting portions are resting on the ring fingers or the middle fingers (see FIG. 33). Since the second L button 54K and the second R button 54L are provided on the upper surfaces of the projecting portions, as in the above embodiment, the user can easily operate these buttons in such a state as described above.

Preferably, the projecting portion is provided so as to project at least at left and right positions on the back side of the housing above the center of the housing, as in the embodiment and the variation described above. Then, when the user holds the left and right opposing sides of the housing, the user can easily hold the terminal device by holding it so as to allow the projecting portion to rest on the fingers. Since the projecting portion is provided in the upper portion, the user can support the housing also with the palms (see FIG. 10, etc.), thus firmly holding the terminal device.

The projecting portion does not need to be provided above the center of the housing. For example, in a case in which operation sections are provided on the left side and on the right side of the display section, the projecting portion may be provided at a position at which it can rest on any fingers other than the thumbs while the user is holding the housing in such a manner that the user can operate the operation sections with the thumbs of both hands. Also in this case, the user can easily hold the terminal device by holding it so as to allow the projecting portion to rest on the fingers.

Figure 34:
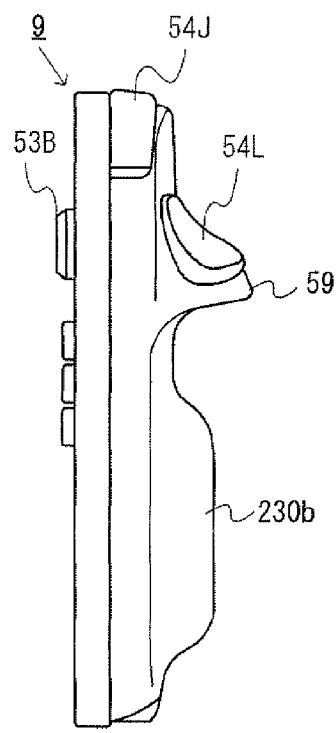
FIG. 34 is a diagram showing an external configuration of the terminal device according to another variation of the present embodiment.
Figure 35:
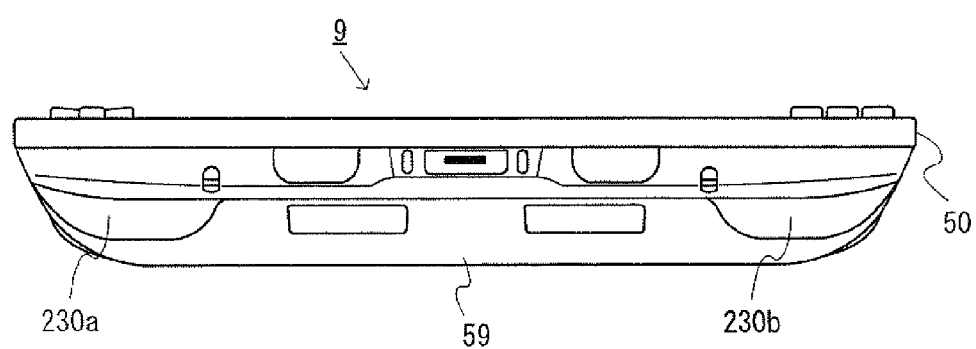
FIG. 35 is a diagram showing an external configuration of the terminal device according to another variation of the present embodiment.

FIGS. 34 and 35 are diagrams showing an external configuration of a terminal device according to another variation of the above embodiment. FIG. 34 is a right side view of the terminal device, and FIG. 35 is a bottom view thereof. A terminal device 9 shown in FIGS. 34 and 35 is similar to the terminal device 7 of the above embodiment except for the provision of protruding portions 230a and 230b. The configuration of the terminal device 9 of this variation will now be described focusing on differences from the above embodiment.

The protruding portions 230a and 230b have a protruding cross section, and are provided respectively in the left and right portions on the back side of the housing 50. Herein, the protruding portion 230a is provided in the left portion (the left portion as viewed from the front surface side) of the housing 50, and the protruding portion 230b is provided in the right portion (the right portion as viewed from the front surface side) of the housing 50. As shown in FIG. 35, the protruding portions 230a and 230b are provided along the left and right opposing sides (the opposing end portions) of the housing 50. The protruding portions 230a and 230b are provided below the projecting portion (the eaves portion 59). The protruding portions 230a and 230b are spaced apart from the projecting portion. That is, portions of the housing 50 between the protruding portions 230a and 230b and the projecting portion are thinner than the protruding portions and the projecting portion. The projecting portion of each of the protruding portions 230a and 230b extends in the up/down direction, and the cross section thereof in the direction perpendicular to the up/down direction has a protruding shape.

In this variation, the user can more firmly hold the terminal device 9 by holding it so as to wrap around the protruding portions 230a and 230b with the little fingers (and the ring fingers). That is, the protruding portions 230a and 230b serve as grip portions. While the protruding portion (grip portion) may be of any shape, it is preferably formed so as to extend in the up/down direction, thereby making it easier to hold the terminal device 9. While the height of the protruding portions 230a and 230b may be any height, it may be formed to be lower than the projecting portion. Then, when the terminal device 9 is put down with the screen of the LCD 51 facing up, the lower portion of the screen will be lower than the upper portion of the screen, and it is therefore possible to put down the terminal device 9 in such a manner that it is easy to view. Since the protruding portions 230*a* and 230*b* are spaced apart from the projecting portion, the user can hold the terminal device 9 with fingers abutting against the bottom surface of the projecting portion, and the protruding portions 230*a* and 230*b* do not interfere with the fingers. As described above, according to the variation described above, with the provision of the protruding portions below the projecting portion, the user can more firmly hold the terminal device. In other embodiments, no projecting portion may be provided on the back surface of the housing 50, and even in that case, the user can firmly hold the housing 50 with the protruding portions (grip portions). An anti-slip material may be used on the surface of the protruding portions (grip portions) in order to further improve the grip function. Also in the absence of the protruding portions, an anti-slip material may be used on the housing back surface.

(Variation Regarding Devices to which Present Configuration is Applied)

Although the above embodiment is directed to an example of a terminal device that is used in combination with a home-console type game device, the configuration of the controller device described herein is applicable to any device which is held by the user. For example, the controller device may be implemented as any information terminal such as a portable game device, a mobile telephone, a smart phone, an electronic book reader, etc.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

As described above, the present invention is applicable to, for example, a controller device (terminal device) used in a game system, etc., with the aim of, for example, allowing it to be easily held by the user.

While the invention has been described in detail, the foregoing description is in all aspects illustrative and not restrictive. It is understood that numerous other modifications and variations can be devised without departing from the scope of the invention.

What is claimed is:

1. A controller device operable by a user, comprising:
a generally plate-shaped housing;
a display provided on a front side of the housing; and
a projecting portion provided so as to project at least at left and right positions on a back side of the housing above a center of the housing,
wherein a first engagement hole configured to engage with an additional device separate from the controller device is provided on a bottom surface of the projecting portion.

2. The controller device according to claim 1, further comprising a first operation section and a second operation section provided respectively on opposite sides of the display above a center of the housing.

3. The controller device according to claim 2, wherein the projecting portion is provided so as to extend across an area on the back side including positions corresponding to the first operation section and the second operation section on the front side.

4. The controller device according to claim 3, further comprising:
a third operation section provided below the first operation section on a front side surface of the housing; and
a fourth operation section provided below the second operation section on the front side surface of the housing.

5. The controller device according to claim 1, further comprising a third operation section and a fourth operation section provided respectively in left and right portions of the housing on an upper surface of the projecting portion.

6. The controller device according to claim 1, wherein the projecting portion is eaves-shaped and extends in a left/right direction.

7. The controller device according to claim 1, wherein a second engagement hole configured to engage with the additional device is provided on a lower surface of the housing.

8. The controller device according to claim 1, further comprising protruding portions having a protruding cross section and provided in left and right portions on a back surface of the housing below the projecting portion.

9. The controller device according to claim 8, wherein the projecting portion and the protruding portions are spaced apart from each other.

10. The controller device according to claim 1, further comprising grip portions provided in left and right portions on a back surface of the housing.

11. The controller device according to claim 1, further comprising a third operation section and a fourth operation section provided in left and right portions on an upper surface of the housing.

12. The controller device according to claim 1, further comprising a touch panel provided on a screen of the display.

13. The controller device according to claim 1, further comprising an inertia sensor inside the housing.

14. The controller device according to claim 1, further comprising:
   a communication circuit for wirelessly transmitting operation data representing an operation performed on the controller device itself to a game device, and receiving image data transmitted from the game device; and
   a display controller for displaying the received image data on the display.

15. The controller device according to claim 1, further comprising:
   a game processor for performing a game process based on an operation performed on the controller device itself; and
   a display controller for producing a game image based on the game process and displaying the game image on the display.

16. The controller device according to claim 1, wherein the display includes a screen of 5 inches or larger.

17. The controller device according to claim 1, further comprising:
   an infrared marker provided on the front side of the housing.

18. A controller device comprising:
   a generally plate-shaped housing;
   a display provided on a front side of the housing;
   a first operation section and a second operation section provided respectively on opposite sides of the display; and
   a projecting portion provided on a back side of the housing at a position at which the projecting portion can rest on fingers other than thumbs while a user is holding the housing in such a manner that the user can respectively operate the first operation section and the second operation section with the thumb of a corresponding hand,
   wherein a first engagement hole configured to engage with an device separate from the controller device is provided on a bottom surface of the projecting portion.

19. The controller device according to claim 18, wherein the projecting portion is provided so as to extend across an area on the back side including positions corresponding to the first operation section and the second operation section on the front side.

20. The controller device according to claim 18, further comprising a third operation section and a fourth operation section provided respectively in left and right portions of the housing on an upper surface of the projecting portion.

21. The controller device according to claim 18, wherein the projecting portion is eaves-shaped and extends in a left/right direction.

22. The controller device according to claim 18, wherein a second engagement hole configured to engage with, the additional device is provided on a lower surface of the housing.

23. The controller device according to claim 18, further comprising protruding portions having a protruding cross section and provided in left and right portions on a back surface of the housing below the projecting portion.

24. The controller device according to claim 23, wherein the projecting portion and the protruding portions are spaced apart from each other.

25. The controller device according to claim 18, further comprising grip portions provided in left and right portions on a back surface of the housing.

26. The controller device according to claim 18,. further comprising:
   a third operation section provided below the first operation section on a front side surface of the housing; and
   a fourth operation section provided below the second operation section on the front side surface of the housing.

27. The controller device according to claim 18, further comprising a third operation section and a fourth operation section provided in left and right portions on an upper surface of the housing.

28. The controller device according claim 18, further comprising a touch panel provided on a screen of the display.

29. The controller device according to claim 18, further comprising an inertia sensor inside the housing.

30. The controller device according to claim 18, further comprising:
   a communication circuit for wirelessly transmitting operation data representing an operation performed on the controller device itself to a game device, and receiving image data transmitted from the game device; and
   a display controller for displaying the received image data on the display.

31. The controller device according to claim 18, further comprising:
   a game processor for performing a game process based on an operation performed on the controller device itself; and
   a display controller for producing a game image based on the game process and displaying the game image on the display.

32. The controller device according to claim 18, wherein the display includes a screen of 5 inches or larger.

33. The controller device according to claim 18, further comprising:
   an infrared marker provided on the front side of the housing.

34. A tablet-shaped information processing device comprising:
   a generally plate-shaped housing;
   a display provided on a front side of the housing; and
   a projecting portion provided so as to project at least at left and right positions on a back side of the housing above a center of the housing,
   wherein a first engagement hole configured to engage with an additional device separate from the controller device is provided on a bottom surface of the projecting portion.

35. The controller device according to claim 34, further comprising:
   an infrared marker provided on the front side of the housing.

* * * * *